US012679481B2

(12) United States Patent
Hammond et al.

(10) Patent No.: US 12,679,481 B2
(45) Date of Patent: Jul. 14, 2026

(54) GOLF COURSE AUTONOMOUS MOBILE ROBOT

(71) Applicant: Textron Inc., Providence, RI (US)

(72) Inventors: Donny Lee Hammond, Augusta, GA (US); Ricky Veldee Kemp, Augusta, GA (US); Charles Daniel Dauchess, North Augusta, SC (US); Samuel Smith, Martinez, GA (US)

(73) Assignee: TEXTRON INC., Providence, RI (US)

( * ) Notice: Subject to any disclaimer, the term of this patent is extended or adjusted under 35 U.S.C. 154(b) by 9 days.

(21) Appl. No.: 19/009,515

(22) Filed: Jan. 3, 2025

(65) Prior Publication Data

US 2026/0192872 A1 Jul. 9, 2026

(51) Int. Cl.
| | |
|---|---|
| *B62D 51/00* | (2006.01) |
| *B60R 16/023* | (2006.01) |
| *B60R 16/033* | (2006.01) |
| *B62D 27/06* | (2006.01) |
| *B62D 33/02* | (2006.01) |
| *G05D 1/224* | (2024.01) |
| *G05D 107/20* | (2024.01) |
| *H04N 7/18* | (2006.01) |

(52) U.S. Cl.
CPC ........ *B62D 51/001* (2013.01); *B60R 16/0231* (2013.01); *B60R 16/033* (2013.01); *B62D 27/065* (2013.01); *B62D 33/02* (2013.01); *G05D 1/2247* (2024.01); *G05D 2107/24* (2024.01); *H04N 7/183* (2013.01)

(58) Field of Classification Search
None
See application file for complete search history.

(56) References Cited

U.S. PATENT DOCUMENTS

| | | | |
|---|---|---|---|
| 4,307,891 A | | 12/1981 | Doornick et al. |
| 5,575,140 A | * | 11/1996 | Bermes ................ A01D 34/001 |
| | | | 56/2 |

(Continued)

FOREIGN PATENT DOCUMENTS

| | | |
|---|---|---|
| JP | 2013-206237 A | 10/2013 |
| WO | WO-2007/062858 A1 | 6/2007 |

OTHER PUBLICATIONS

Robotics Tomorrow; Nvidia Brings Advanced Autonomy to Mobile Robots With Isaac AMR dated Jul. 20, 2023; https://www.roboticstomorrow.com/article/2023/07/nvidia-brings-advanced-autonomy-to-mobile-robots-with-isaac-amr/20801; last accessed Mar. 20, 2026.

(Continued)

*Primary Examiner* — Jonathan M Dager
(74) *Attorney, Agent, or Firm* — Foley & Lardner LLP

(57) ABSTRACT

A mobile robot includes a chassis, a tractive element coupled to the chassis, a driveline coupled to the chassis and configured to drive the tractive element to propel the mobile robot, a control system communicably coupled to the driveline, and a platform assembly removably coupled to the chassis. The platform assembly defines an occupant riding area. The mobile robot also includes a controller removably coupled to the platform assembly and communicably coupled to the control system. The controller is configured to receive an input from a user of the controller, and transmit the input to the control system. The control system is configured to operate the driveline based on the input.

16 Claims, 64 Drawing Sheets

(56) References Cited

U.S. PATENT DOCUMENTS

| | | | | |
|---|---|---|---|---|
| 6,493,613 | B2 | 12/2002 | Peless et al. | |
| 6,578,925 | B1 | 6/2003 | Baker et al. | |
| 6,969,079 | B2 * | 11/2005 | Kamen | B62K 11/007 |
| | | | | 280/492 |
| 7,019,794 | B2 * | 3/2006 | Norvell | G06F 1/1601 |
| | | | | 297/217.3 |
| 7,407,175 | B2 * | 8/2008 | Kamen | B62D 53/02 |
| | | | | 280/492 |
| 7,555,363 | B2 | 6/2009 | Augenbraun et al. | |
| 8,682,487 | B2 | 3/2014 | Kurth et al. | |
| 9,603,300 | B2 | 3/2017 | Pettersson | |
| 9,891,629 | B2 * | 2/2018 | Murray | A01D 34/008 |
| 10,080,321 | B2 | 9/2018 | Blackwell et al. | |
| 10,113,280 | B2 * | 10/2018 | Letsky | G05D 1/0231 |
| 10,149,468 | B2 * | 12/2018 | Crinklaw | G05D 1/0274 |
| 10,180,329 | B2 | 1/2019 | Doane et al. | |
| 10,233,753 | B2 * | 3/2019 | Hanski | E21B 44/00 |
| 10,244,675 | B2 * | 4/2019 | LaRowe | A01C 21/007 |
| 10,295,998 | B2 * | 5/2019 | Yokoyama | G05D 1/00 |
| 10,296,003 | B2 * | 5/2019 | Goldfain | G05D 1/0061 |
| 10,976,735 | B2 * | 4/2021 | Idbrant | G05D 1/0055 |
| D921,056 | S * | 6/2021 | Vallat | A01M 21/02 |
| | | | | D15/24 |
| 11,140,889 | B2 * | 10/2021 | Crinklaw | G05D 1/0022 |
| 11,500,379 | B2 * | 11/2022 | Posselius | G05D 1/0088 |
| 11,582,903 | B1 * | 2/2023 | Brown | B60W 40/02 |
| 11,974,514 | B2 * | 5/2024 | Horsch | A01B 51/026 |
| 12,064,880 | B2 | 8/2024 | Hamilton et al. | |
| 12,349,622 | B2 * | 7/2025 | Di Biase | A01D 34/6806 |
| 2007/0034392 | A1 * | 2/2007 | Pohlman | A01G 20/15 |
| | | | | 172/20 |
| 2010/0106344 | A1 * | 4/2010 | Edwards | G05D 1/0274 |
| | | | | 701/2 |
| 2015/0045992 | A1 * | 2/2015 | Ashby | E02F 3/3414 |
| | | | | 701/2 |
| 2015/0105965 | A1 * | 4/2015 | Blackwell | B62D 63/025 |
| | | | | 701/28 |
| 2017/0010619 | A1 * | 1/2017 | Foster | B60T 7/00 |
| 2017/0227969 | A1 | 8/2017 | Murray et al. | |
| 2017/0355259 | A1 | 12/2017 | Borud et al. | |

| | | | | |
|---|---|---|---|---|
| 2018/0024549 | A1 * | 1/2018 | Hurd | A01B 69/008 |
| | | | | 701/2 |
| 2018/0255705 | A1 | 9/2018 | Keski-Luopa et al. | |
| 2018/0321682 | A1 * | 11/2018 | Matsumoto | G05D 1/0278 |
| 2019/0232992 | A1 * | 8/2019 | Bondaryk | B62B 5/0069 |
| 2019/0248007 | A1 | 8/2019 | Duffy et al. | |
| 2020/0064841 | A1 | 2/2020 | Perrone | |
| 2020/0245550 | A1 | 8/2020 | Smith et al. | |
| 2020/0375093 | A1 * | 12/2020 | Matus | G05D 1/0225 |
| 2021/0070339 | A1 * | 3/2021 | Delgatty | B60N 3/104 |
| 2021/0387688 | A1 * | 12/2021 | Seguin | B62J 7/08 |
| 2023/0042867 | A1 * | 2/2023 | Degnan | A01D 34/863 |
| 2023/0337568 | A1 | 10/2023 | Bucher et al. | |
| 2023/0409030 | A1 | 12/2023 | Doane et al. | |
| 2024/0291686 | A1 | 8/2024 | Baum et al. | |
| 2024/0350879 | A1 | 10/2024 | Zdunich | |
| 2025/0017171 | A1 | 1/2025 | Schwenker et al. | |
| 2025/0093875 | A1 * | 3/2025 | Radhakrishnan | B60K 35/00 |
| 2025/0100450 | A1 * | 3/2025 | Fujii | A01B 69/001 |
| 2025/0108703 | A1 * | 4/2025 | Amitani | B60L 58/14 |
| 2025/0120330 | A1 * | 4/2025 | Murata | A01B 69/008 |
| 2025/0121897 | A1 * | 4/2025 | Wall | B62D 55/065 |
| 2025/0212714 | A1 * | 7/2025 | Kurata | G01C 21/20 |
| 2025/0229158 | A1 | 7/2025 | Ozawa | |
| 2025/0250778 | A1 * | 8/2025 | Fukuda | E02F 9/265 |
| 2025/0295059 | A1 * | 9/2025 | Wanta | A01D 34/008 |
| 2025/0295060 | A1 * | 9/2025 | Wanta | G01C 21/34 |
| 2025/0334972 | A1 | 10/2025 | Cha et al. | |
| 2025/0346169 | A1 | 11/2025 | Rosencrance et al. | |
| 2025/0348078 | A1 | 11/2025 | Ritelli et al. | |
| 2026/0002344 | A1 | 1/2026 | Fukuda | |
| 2026/0026423 | A1 * | 1/2026 | Nesbitt | A01B 79/005 |
| 2026/0028795 | A1 * | 1/2026 | Fukuda | E02F 3/96 |
| 2026/0048509 | A1 | 2/2026 | Porter et al. | |

OTHER PUBLICATIONS

SMP Robotics; Security patrol robot with PTZ camera; https://smprobotics.com/products_autonomous_ugv/security-patrol-robot/; last accessed Mar. 20, 2026.

* cited by examiner

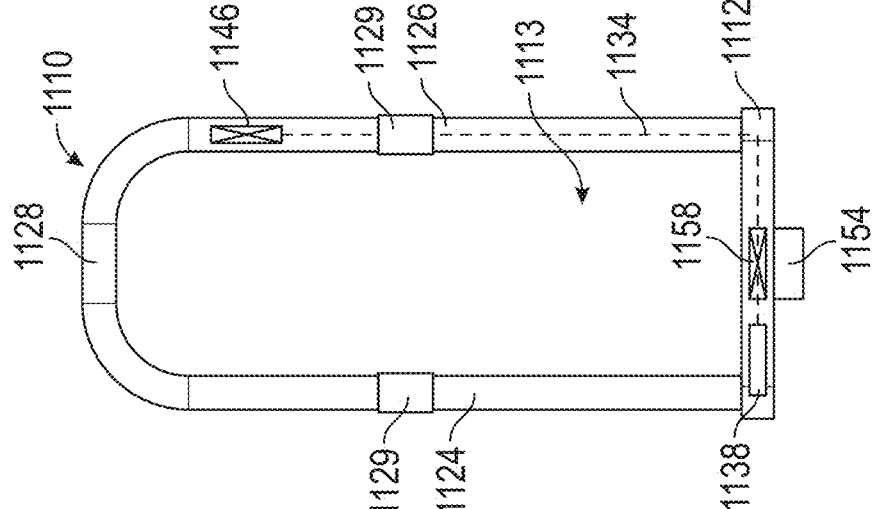
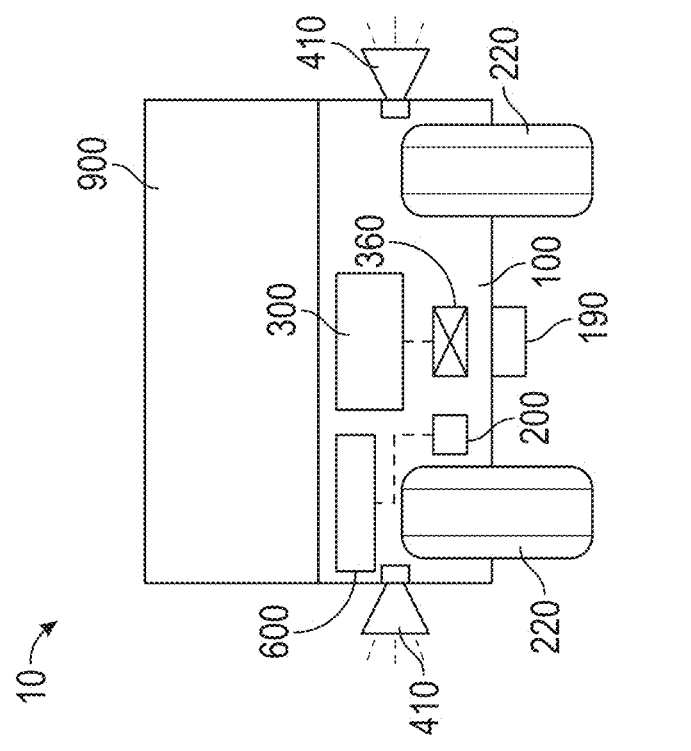
FIG. 39

1414

1418 — Detect one or more attachments

1422 — Generate an operating range in accordance with the one or more attachments 1426 — Generate task options based on each of the attachments 1430 — Provide the task options to one or more user interfaces 1434 — Receive an input from the one or more user interfaces 1438 — Generate a task based on the input and the operating range 1442 — Implement the task

2100

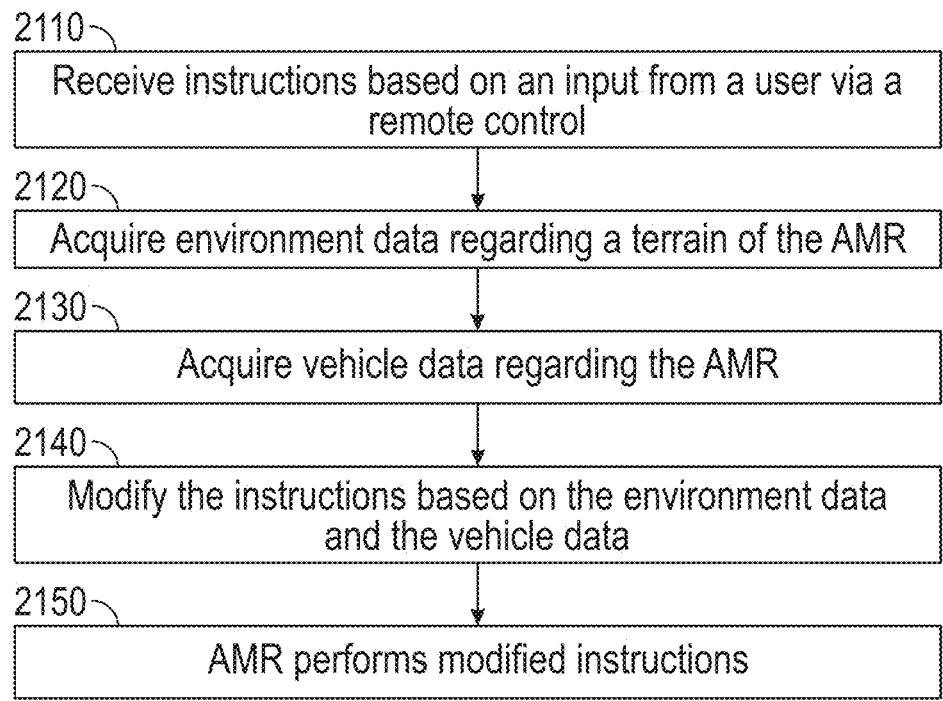

2110
Receive instructions based on an input from a user via a remote control

2120
Acquire environment data regarding a terrain of the AMR

2130
Acquire vehicle data regarding the AMR

2140
Modify the instructions based on the environment data and the vehicle data

2150
AMR performs modified instructions

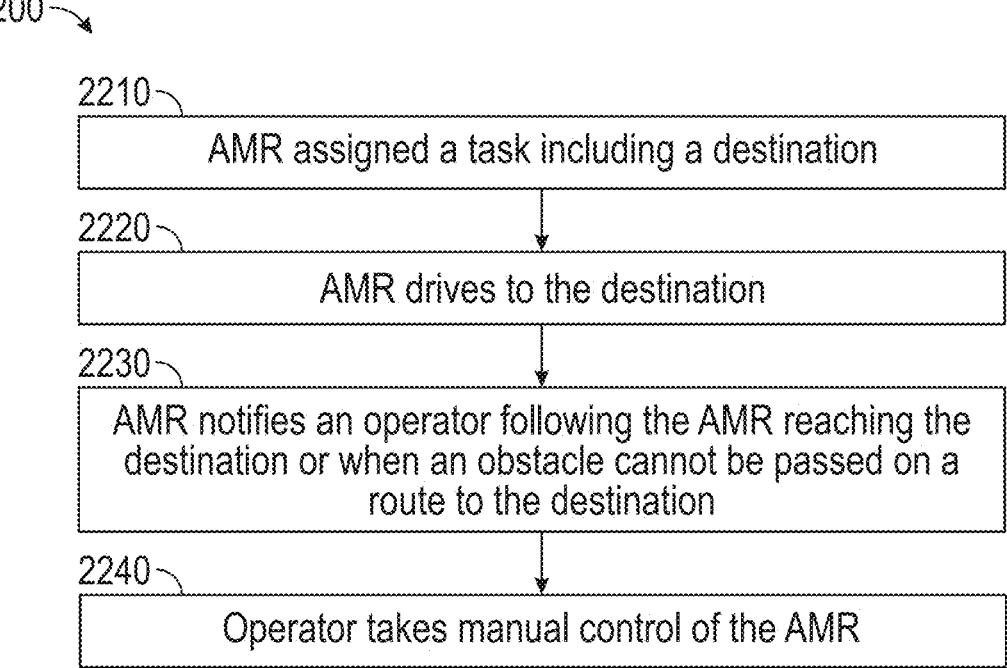

2210
AMR assigned a task including a destination

2220
AMR drives to the destination

2230
AMR notifies an operator following the AMR reaching the destination or when an obstacle cannot be passed on a route to the destination 2240
Operator takes manual control of the AMR

3305
Identify task(s) associated with attachment

3310
Determine respective task to be completed

3315
Determine destination corresponding to respective task

3320
Determine route from current location to destination

3325
Operate prime mover to move to destination

3330
Operate attachment to complete respective task

3400

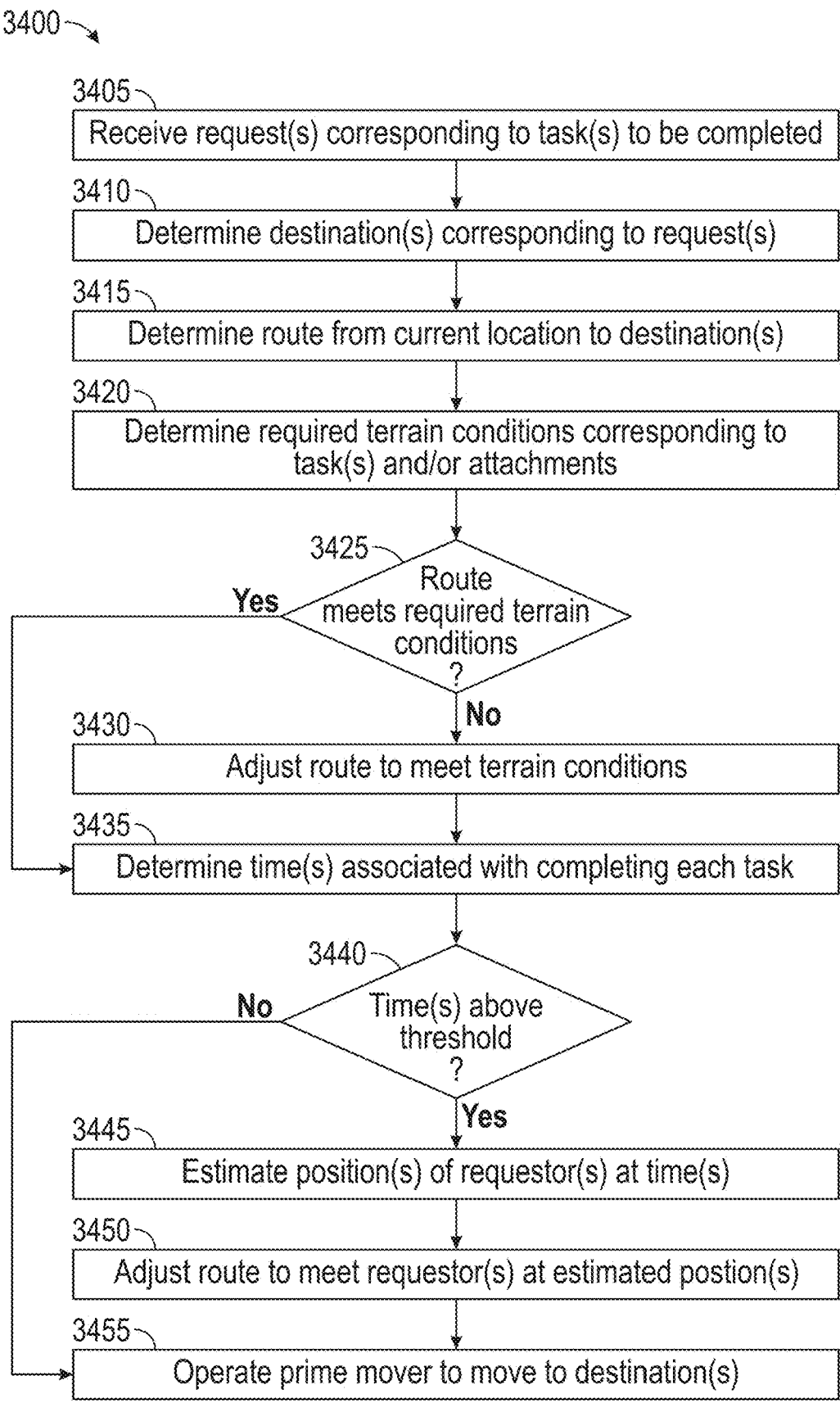

3405
Receive request(s) corresponding to task(s) to be completed

3410
Determine destination(s) corresponding to request(s)

3415
Determine route from current location to destination(s)

3420
Determine required terrain conditions corresponding to task(s) and/or attachments 3425
Route meets required terrain conditions ?

Yes

No

3430
Adjust route to meet terrain conditions

3435
Determine time(s) associated with completing each task

3440
Time(s) above threshold ?

No

Yes

3445
Estimate position(s) of requestor(s) at time(s)

3450
Adjust route to meet requestor(s) at estimated postion(s)

3455
Operate prime mover to move to destination(s)

GOLF COURSE AUTONOMOUS MOBILE ROBOT

BACKGROUND

Golf course personnel at golf courses typically use utility task vehicles, haulers, and various other manually operated equipment and tools to perform golf course maintenance (e.g., rack sand traps, lay sod, apply fertilizers, etc.) and to provide services to golfers around the golf course (e.g., deliver food, drinks, balls, apparel, etc.). This can often lead to golf course personnel having to make numerous trips back and forth for supplies and equipment based on the tasks being performed or requested. Further, with high turnover, it can be difficult to maintain properly skilled grounds crew personnel and the requisite number of personnel on staff to service a golf course and its members/golfers.

SUMMARY

One embodiment relates to a mobile robot. The mobile robot includes a chassis, a tractive element coupled to the chassis, a driveline coupled to the chassis and configured to drive the tractive element to propel the mobile robot, a control system communicably coupled to the driveline, and a platform assembly removably coupled to the chassis. The platform assembly defines an occupant riding area. The mobile robot also includes a controller removably coupled to the platform assembly and communicably coupled to the control system. The controller is configured to receive an input from a user of the controller, and transmit the input to the control system. The control system is configured to operate the driveline based on the input.

Another embodiment relates to a mobile robot. The mobile robot includes a chassis, a tractive element coupled to the chassis, a driveline coupled to the chassis and configured to drive the tractive element to propel the mobile robot, a battery supported by the chassis, an attachment power interface coupled to the chassis and the battery, a hitch receiver coupled to the chassis, and a platform assembly coupled to the chassis and defining a user riding area. The platform includes a platform, a frame assembly coupled to and extending from the platform, and a controller mount coupled to the frame assembly. The controller mount is configured to removably couple the controller to the platform assembly. The platform assembly also includes a protrusion coupled to the platform and configured to slidably engage with the hitch receiver to releasably couple the platform assembly to the chassis, and an electrical connector configured to engage with the attachment power interface to facilitate power transfer from the battery to the platform assembly. The mobile robot further includes a controller removably coupled to the platform assembly and configured to, the controller configured to receive an input from a user of the controller, and control the driveline based on the input. The mobile robot also includes a control system communicably coupled to the driveline, the control system configured to acquire a plurality of signals regarding operation of the mobile robot, transmit the plurality of signals to the controller, receive the input from the controller; and implement an action associated with the input.

Still another embodiment relates to a burden bot. The burden bot includes a chassis, at least one storage structure coupled to the chassis, a platform removably coupled to the chassis, the platform defining a user riding area, a driveline coupled to the chassis and configured to drive a tractive element to propel the burden bot, and a control system coupled to the chassis. The control system is configured to implement an action of the burden bot. The burden bot also includes a transmitter wirelessly communicably coupled to the control system. The transmitter is configured to receive an input associated with the action from a user and transmit the input to the control system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 39 is a rear view of the AMR and the platform assembly of FIG. 38 according to an exemplary embodiment.

FIG. 65 is a flow diagram of a method for operating an AMR in a semi-autonomous mode, according to an exemplary embodiment.

FIG. 66 is a flow diagram of a method for changing operating modes an AMR, according to an exemplary embodiment.

FIG. 70 is a method for assigning and completing a task for the AMR of FIG. 1, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

AMR

Figure 10:
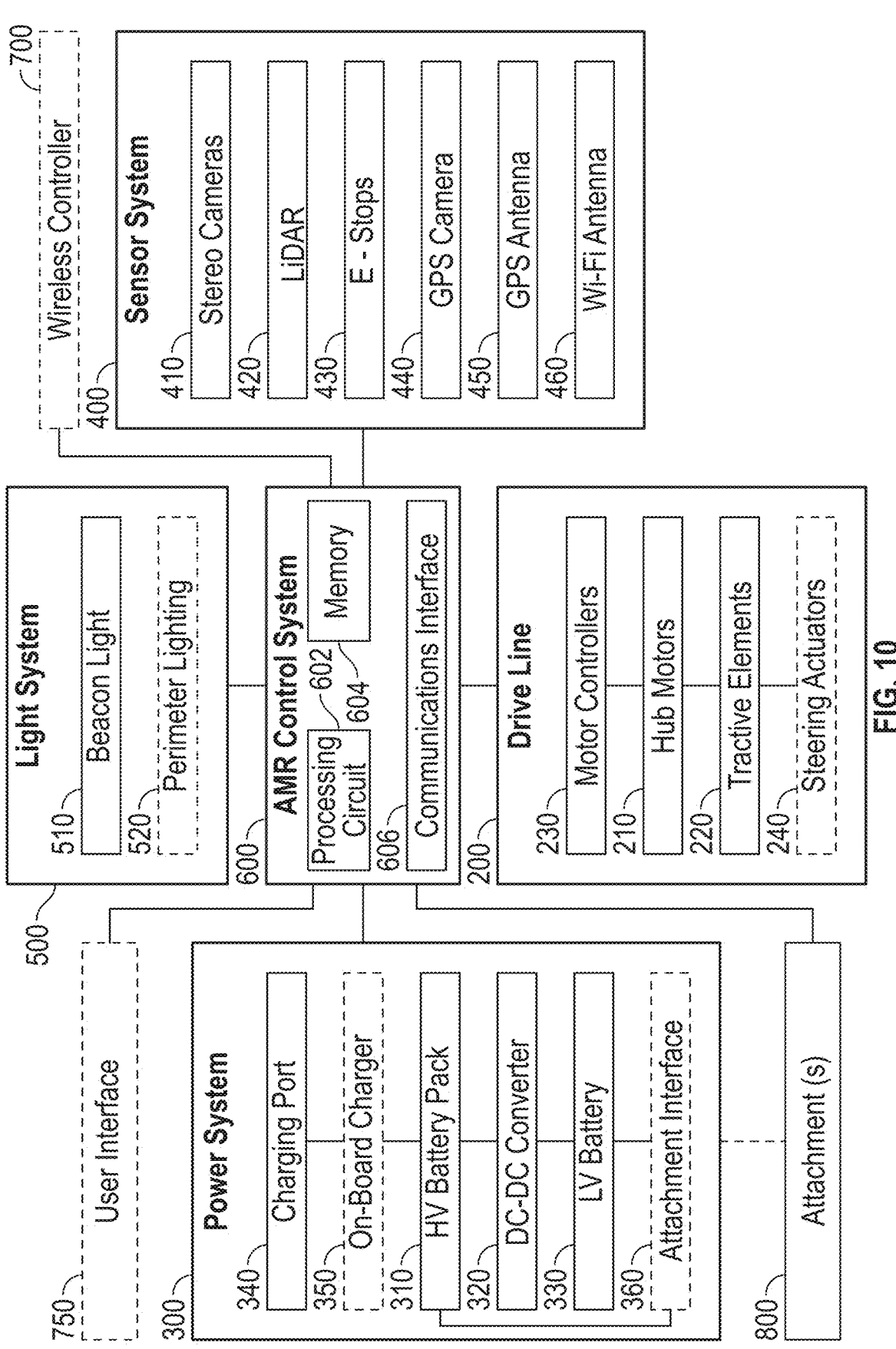
FIG. 10 is a schematic block diagram of the AMR of FIG. 1, according to an exemplary embodiment.

As shown in FIGS. 1-10, a machine or vehicle, shown as AMR 10, includes a chassis, shown as frame assembly 100; a drivetrain, shown as driveline 200, coupled to the frame assembly 100; a power plant, shown as power system 300; a sensor array, shown as sensor system 400; a light assembly, shown as light system 500; and a control system, shown as AMR control system 600, coupled to the driveline 200, the power system 300, the sensor system 400, and the light system 500. As shown in FIG. 10, in some embodiments, the AMR 10 includes a remote control device, shown as wireless controller 700, a user input/output device, shown as user interface 750, and/or one or more implements or attachments, shown as attachments 800. In some embodiments, the AMR 10 includes more or fewer components.

According to an exemplary embodiment, the AMR 10 is an autonomous, semi-autonomous, and/or operator-controlled machine that has a wide range of capabilities depending upon the tasks assigned thereto and/or the attachments 800 coupled therewith, as described in more detail herein. In some embodiments, the AMR 10 is configured to be used on a golf course. In such embodiments, the AMR 10 may be configured to function as a hauler or burden carrier, a golf ball picker, a bunker rake, a tow vehicle, a dew sweeper, a turf sprayer, a turf mower, a food and/or refreshment delivery machine, and/or another type of chore product that may be used on a golf course. While the present application is described mainly in the context of a golf course, it should be understood that the AMR 10 could be used in many other applications depending on the attachments 800 used therewith and/or the locations deployed. For example, the AMR 10 may be used in warehouses, at resorts or hotels, at airports, etc.

Frame Assembly

Figure 5:
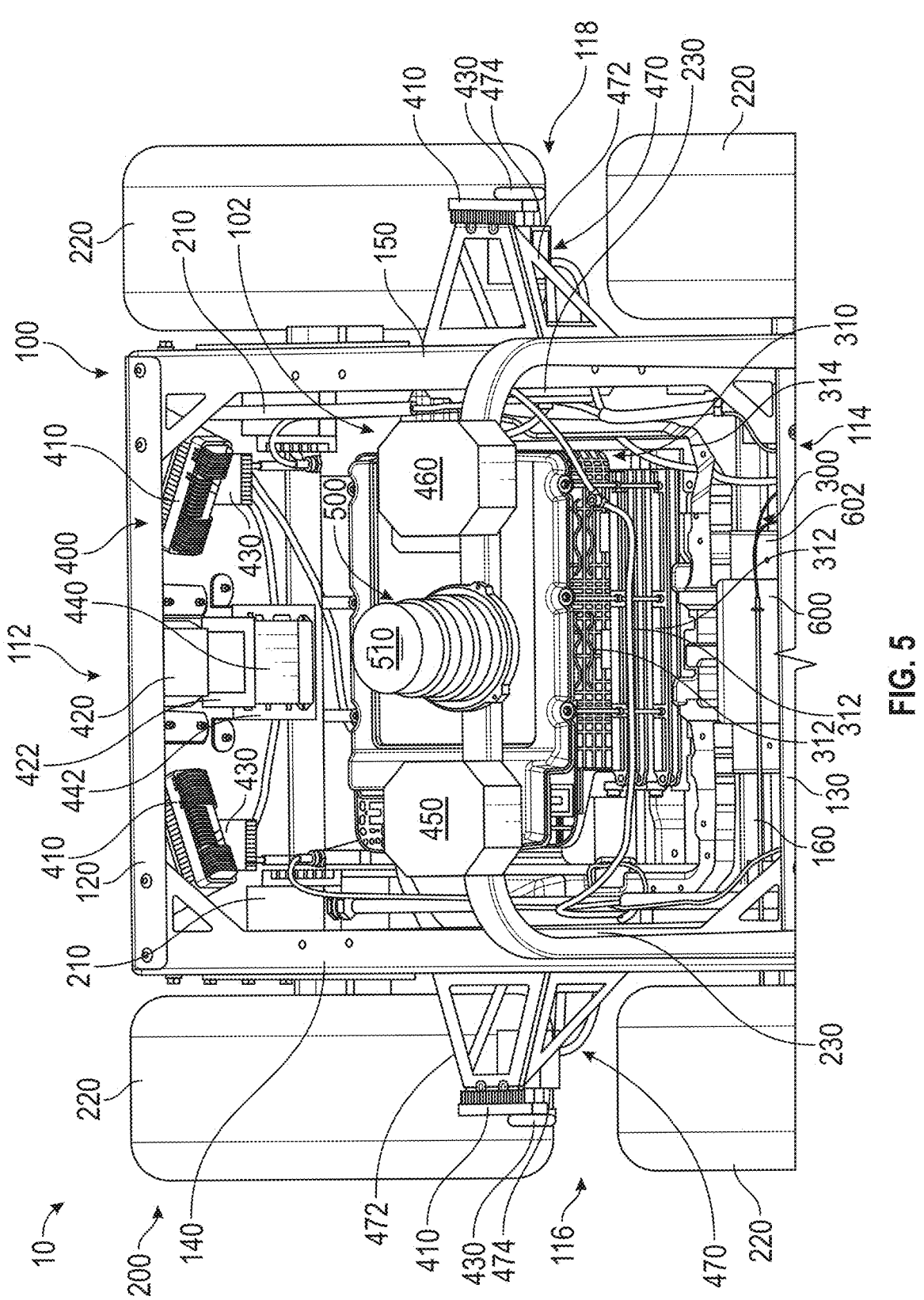
FIG. 5 is a rear perspective view of the AMR of FIG. 1, according to an exemplary embodiment.
Figure 6:
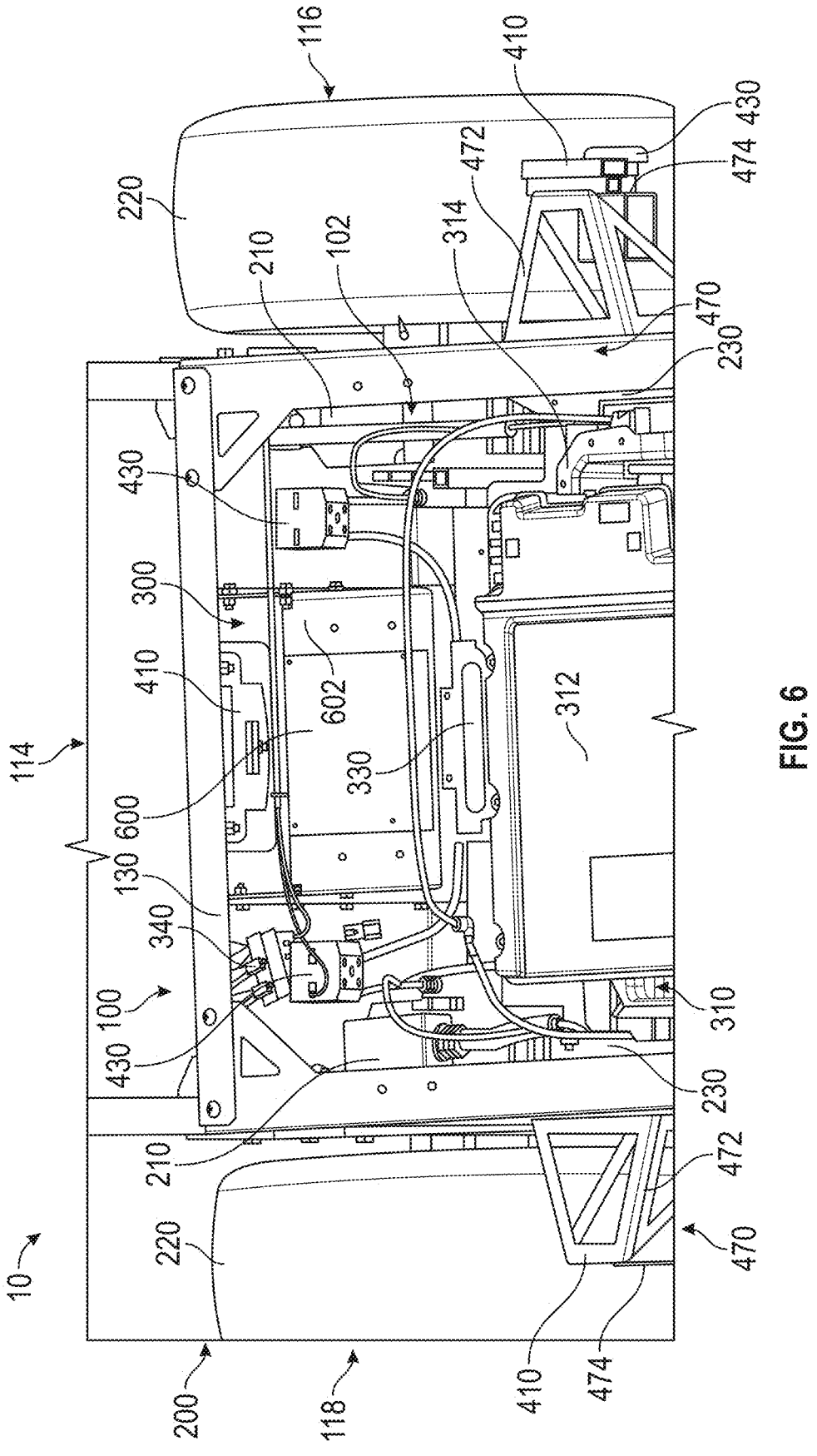
FIG. 6 is a front perspective view of the AMR of FIG. 1, according to an exemplary embodiment.
Figure 7:
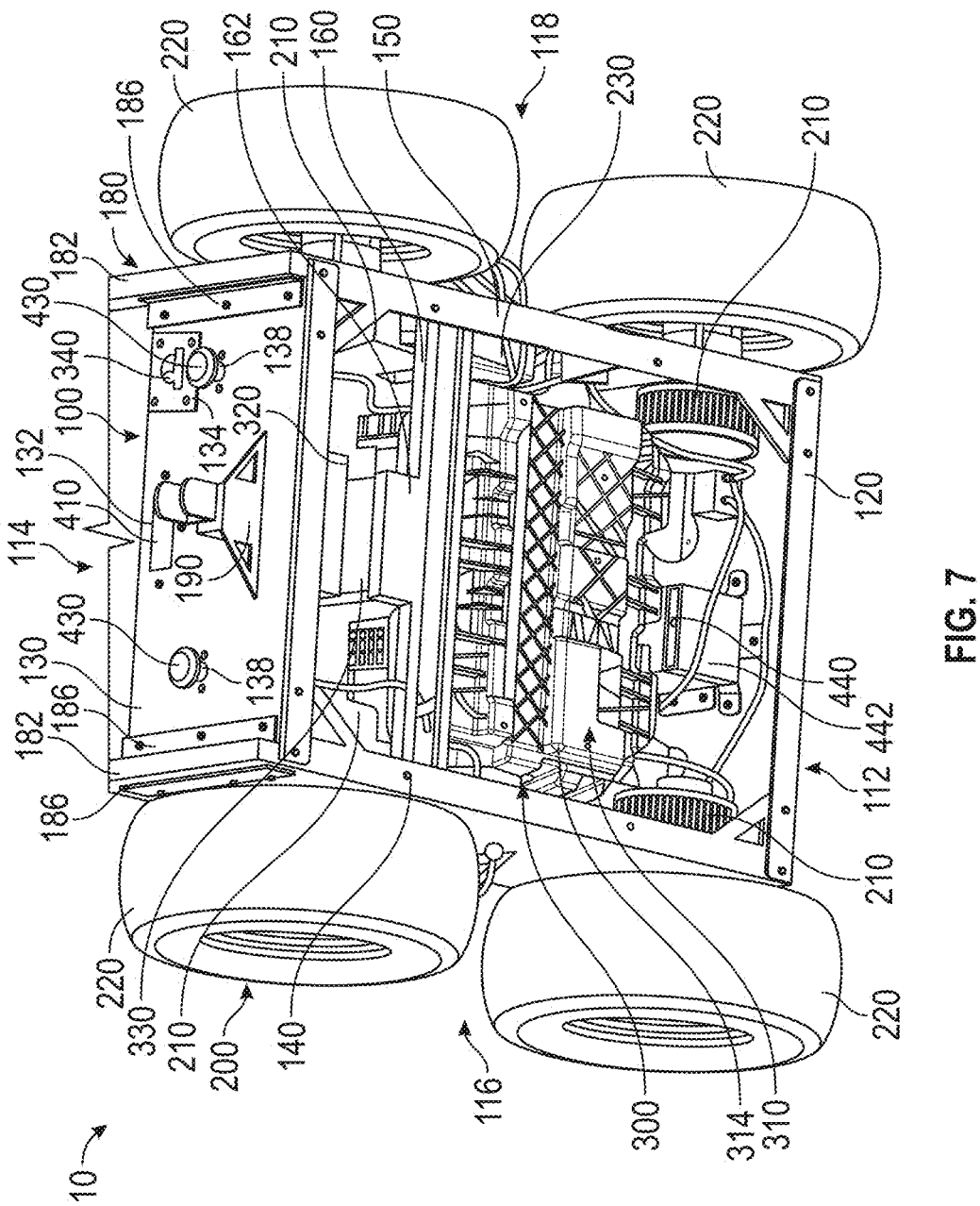
FIG. 7 is a bottom perspective view of the AMR of FIG. 1, according to an exemplary embodiment.
Figure 8:
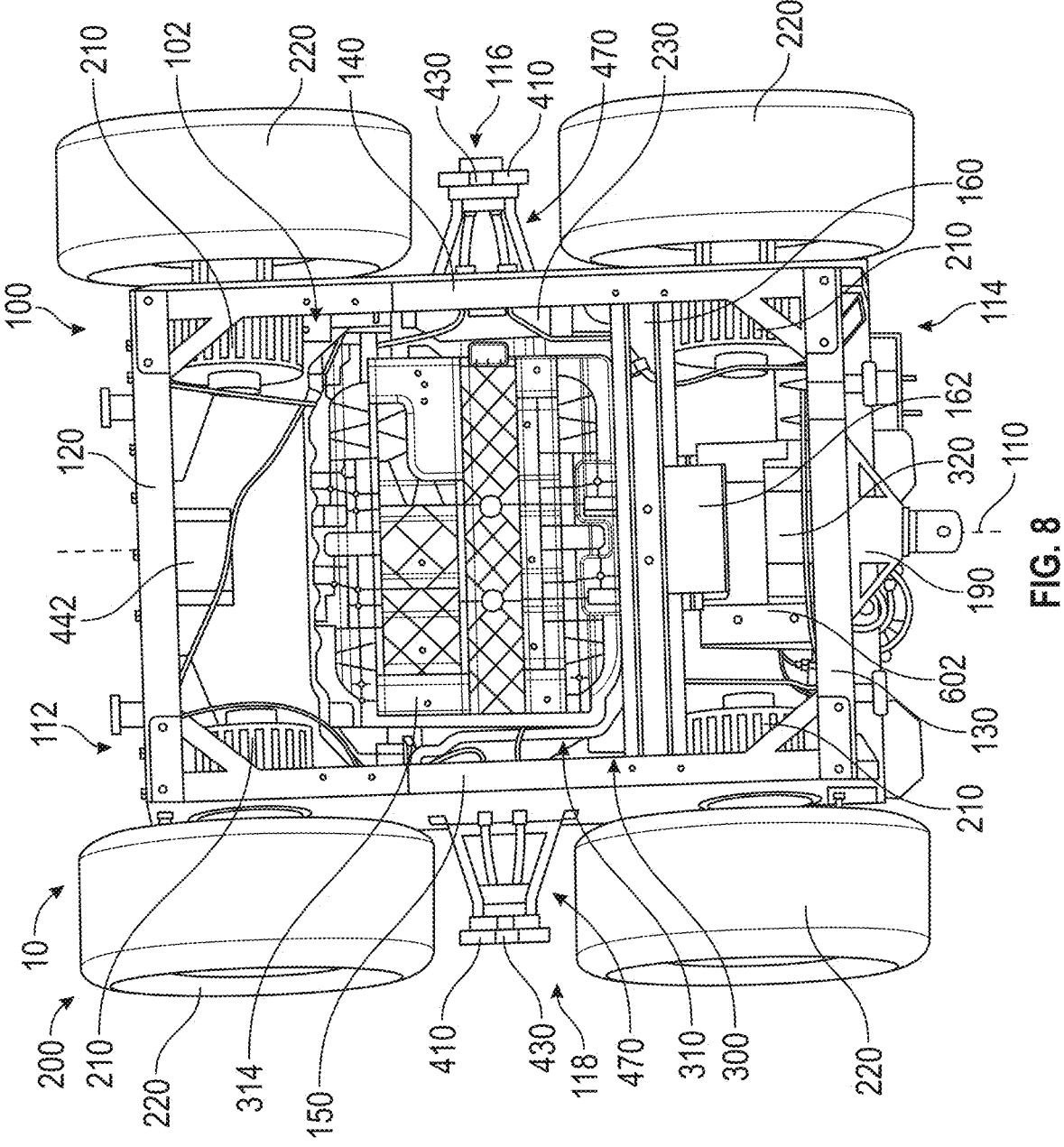
FIG. 8 is a bottom view of the AMR of FIG. 1, according to an exemplary embodiment.
Figure 9:
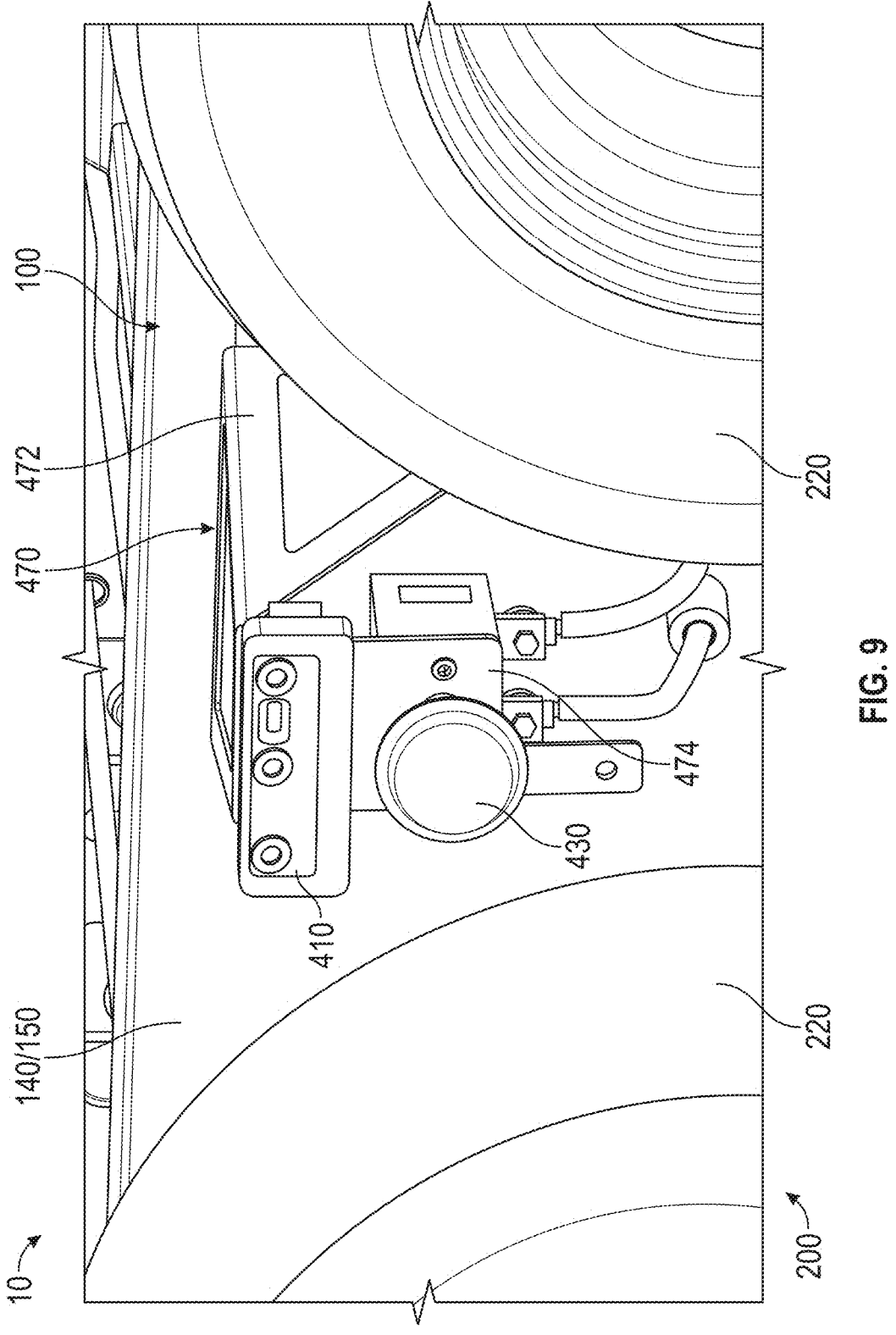
FIG. 9 is a detailed side view of the AMR of FIG. 1, according to an exemplary embodiment.

As shown in FIGS. 1-8, the frame assembly 100 defines an axis, shown as longitudinal axis 110, and has a first end, shown as front end 112, an opposing second end, shown as rear end 114, a first side, shown as left side 116, and an opposing second side, shown as right side 118. As shown in FIGS. 1-9, the frame assembly 100 includes a first frame portion or member, shown as front panel 120, positioned at the front end 112; a second frame portion or member, shown as rear panel 130, positioned at the rear end 114, a third frame portion of member, shown as left side panel 140, extending between the front panel 120 and the rear panel 130 at the left side 116; a fourth frame member or portion, shown as right side panel 150, extending between the front panel 120 and the rear panel 130 at the right side 118; and a fifth frame member or portion, shown as cross-member 160, extending between the left side panel 140 and the right side panel 150. According to the exemplary embodiment shown in FIGS. 4, 5, 7, and 8, the cross-member 160 is positioned closer to the rear end 114 than the front end 112. In some embodiments, the frame assembly 100 includes a plurality of the cross-members 160 spaced along the longitudinal axis 110. As shown in FIGS. 7 and 8, the cross-member 160 includes an extension, shown as battery support 162, extending rearward therefrom towards the rear end 114 of the frame assembly 100.

Figure 1:
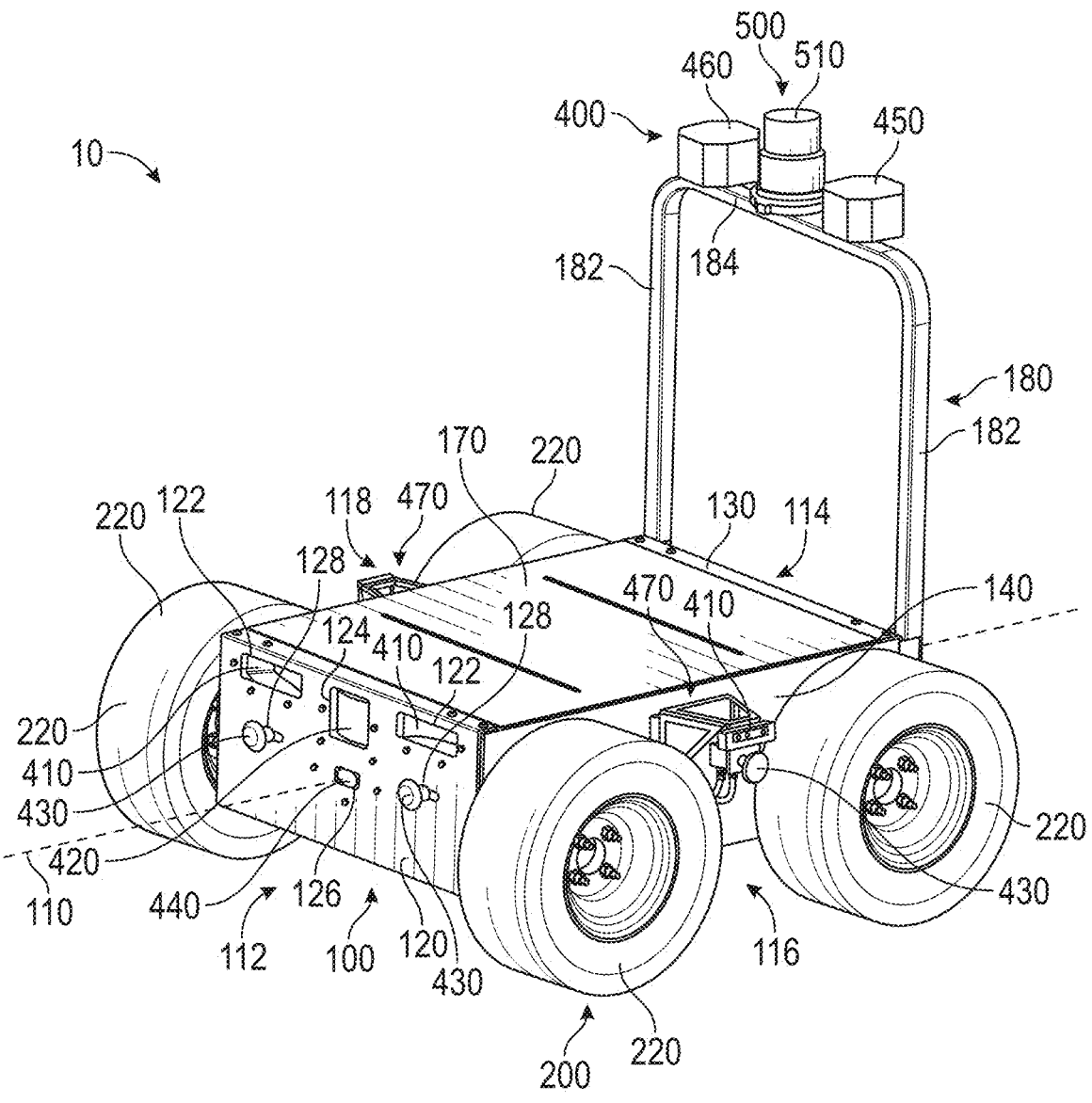
FIG. 1 is a front perspective view of an autonomous mobile robot ("AMR"), according to an exemplary embodiment.

As shown in FIGS. 2-8, the front panel 120, the rear panel 130, the left side panel 140, and the right side panel 150 cooperatively define an interior chamber, shown as inner cavity 102. As shown in FIG. 1, the frame assembly 100 includes a seventh frame member or portion, shown as upper panel 170, extending between upper or top ends of the rear panel 130, the left side panel 140, and the right side panel 150, thereby enclosing the top of the inner cavity 102. In some embodiments, the frame assembly 100 includes an eight frame member or portion (e.g., a lower panel) extending between lower or bottom ends of the rear panel 130, the left side panel 140, and the right side panel 150, thereby enclosing the bottom of the inner cavity 102.

Figure 2:
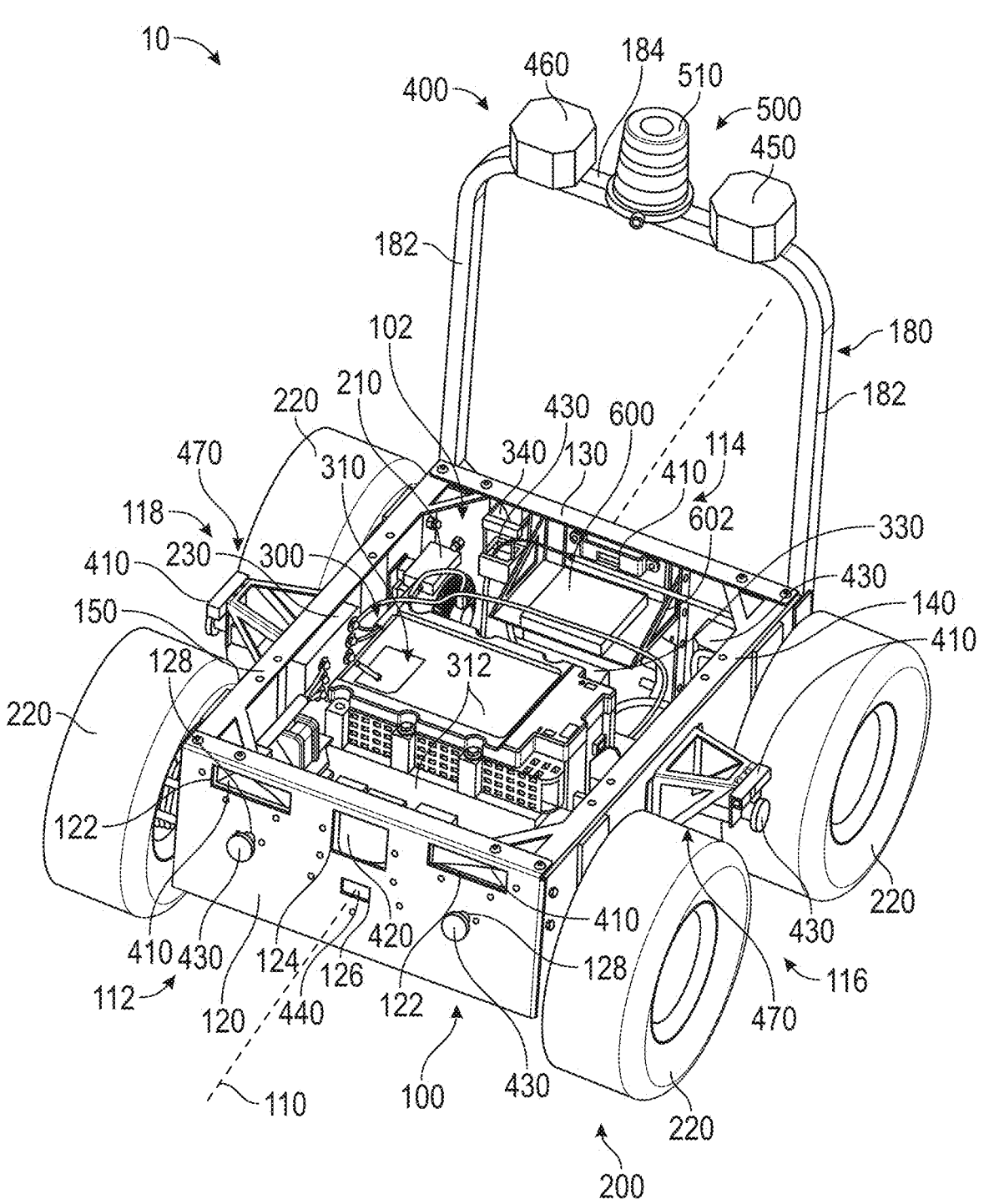
FIG. 2 is another front perspective view of the AMR of FIG. 1, according to an exemplary embodiment.

As shown in FIGS. 1 and 2, the front panel 120 defines a pair of first apertures, shown as stereo camera apertures 122, positioned on opposing sides of the longitudinal axis 110 and positioned proximate the upper corners of the front panel 120; a second aperture, shown as LiDAR aperture 124, positioned proximate the top end of the front panel 120 and centered along the longitudinal axis 110; a third aperture, shown as global positioning system ("GPS") camera aperture 126, vertically centered on the front panel 120 and centered along the longitudinal axis 110 beneath the LiDAR aperture 124; a pair of fourth apertures, shown as e-stop apertures 128, positioned on opposing sides of the longitudinal axis 110, vertically centered on the front panel 120, and positioned beneath the stereo camera apertures 122. In other embodiments, the stereo camera apertures 122, the LiDAR aperture 124, the GPS camera aperture 126, and/or the e-stop apertures 128 are otherwise positioned about the front panel 120.

Figure 3:
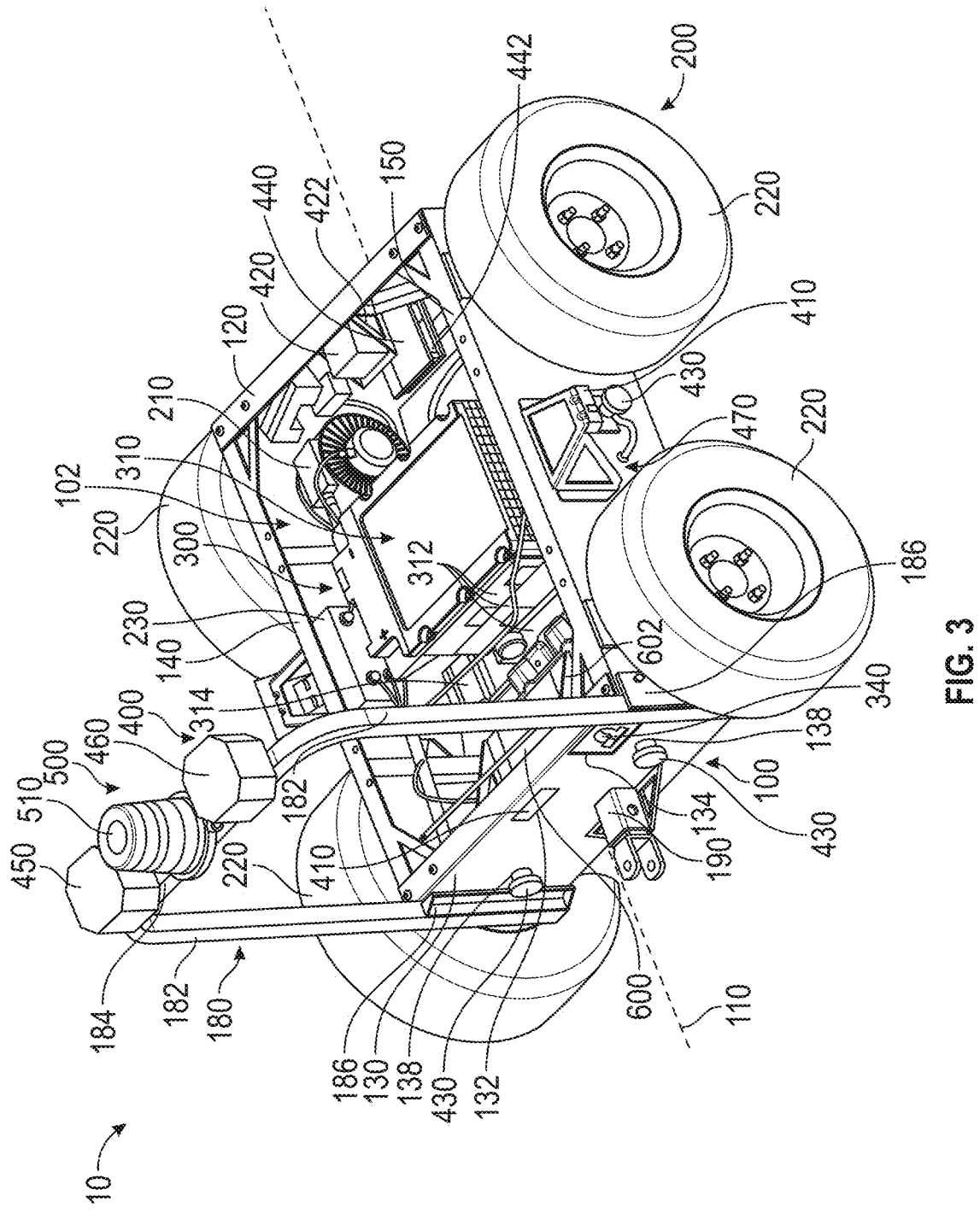
FIG. 3 is rear perspective view of the AMR of FIG. 1, according to an exemplary embodiment.

As shown in FIGS. 3 and 7, the rear panel 130 defines a first apertures, shown as stereo camera aperture 132, positioned proximate the top end of the rear panel 130 and centered along the longitudinal axis 110; a second aperture, shown as charging port aperture 134, positioned proximate an upper corner of the rear panel 130; and a pair of third apertures, shown as e-stop apertures 138, positioned on opposing sides of the longitudinal axis 110 and vertically centered on the rear panel 130. In other embodiments, the stereo camera aperture 132, the charging port aperture 134, and/or the e-stop apertures 138 are otherwise positioned about the rear panel 130.

Figure 4:
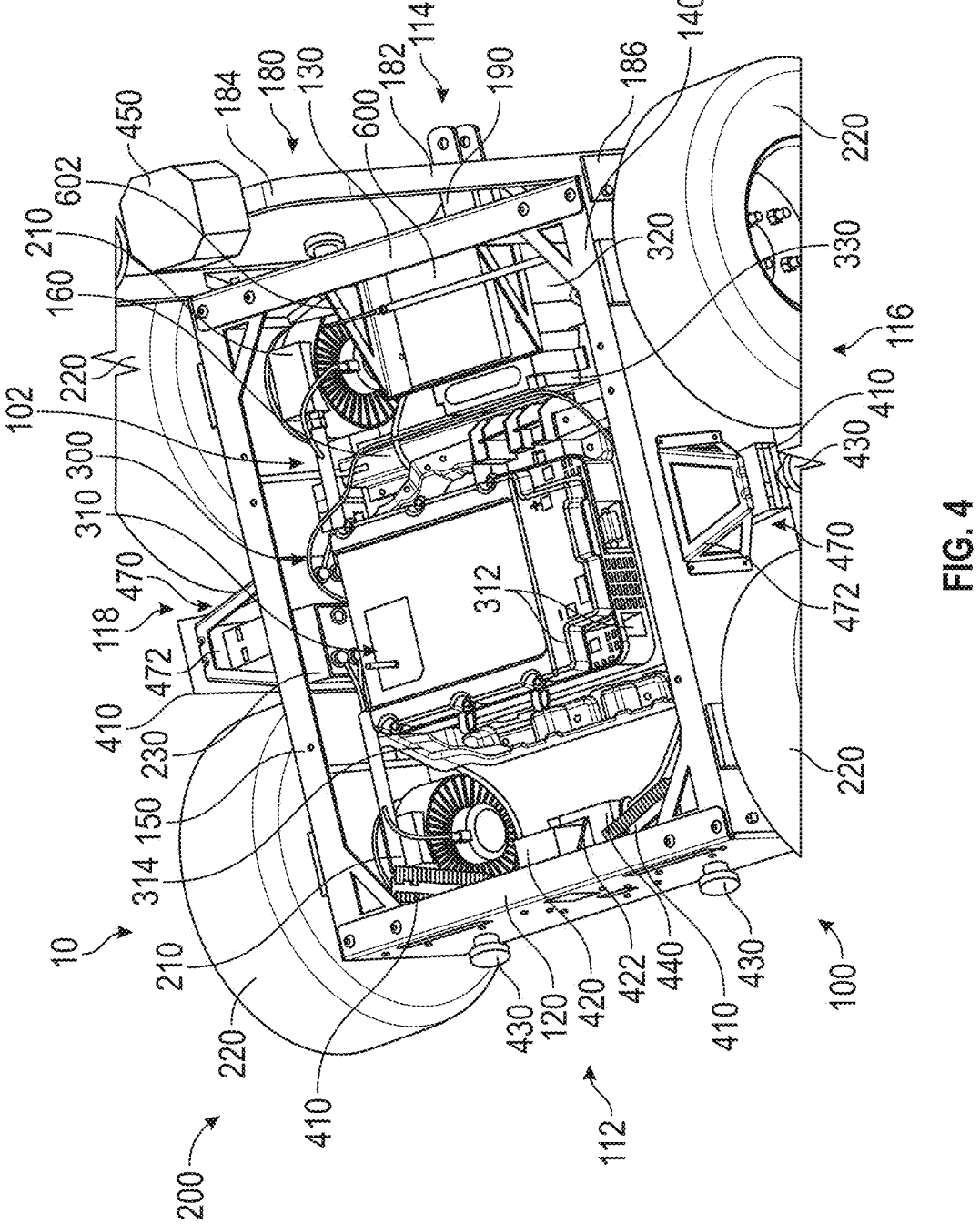
FIG. 4 is a top perspective view of the AMR of FIG. 1, according to an exemplary embodiment.

As shown in FIGS. 1-4 and 7, the frame assembly 100 includes a support bar, shown as hoop bar 180, coupled to the rear end 114 thereof. The hoop bar 180 includes a pair of vertical members, shown as vertical posts 182, and a horizontal member, shown as crossbar 184, coupled to upper ends of the vertical posts 182 such that the hoop bar 180 has a generally "U-shaped" construction. In some embodiments, the vertical posts 182 and the crossbar 184 are integrally formed (e.g., welded together; a single, bent bar, etc.). In some embodiments, the vertical posts 182 and the crossbar 184 are independent components that are fastened together. In some embodiments, the crossbar 184 includes two, separate crossbar portions where each portion is coupled to or integrally formed with a respective one of the vertical posts 182. As shown in FIGS. 3, 4, and 7, the hoop bar 180 include a plurality of mounting brackets, shown as hoop bar brackets 186, configured to facilitate releasably coupling lower ends of the vertical posts 182 to (a) the rear panel 130 and/or (b) the left side panel 140 and the right side panel 150.

As shown in FIGS. 3, 4, 7, and 8, the frame assembly 100 includes an attachment coupling interface, shown as hitch receiver 190, coupled to the rear panel 130, positioned beneath the stereo camera aperture 132, and centered along the longitudinal axis 110. In some embodiments, another hitch receiver 190 is additionally or alternatively coupled to the front panel 120 (e.g., beneath the GPS camera aperture 126). As described in greater detail herein, the hitch receiver 190 may be configured to receive various different types of hitches (e.g., a ball hitch, a pintle hitch, a hook hitch, to facilitate towing one or more implements or attachments) and/or receive various different types of the attachments 800 (e.g., to facilitate coupling the attachments 800 to the frame assembly 100). In some embodiments, the hitch receiver 190 is a two inch by two inch hitch receiver. In some embodiments, the hitch receiver 190 is a one inch by one inch hitch receiver. In some embodiments, the attachment coupling interface is another type of coupling interface other than a hitch receiver.

Driveline

According to an exemplary embodiment, the driveline 200 is configured to propel (e.g., drive, steer, etc.) the AMR 10. As shown in FIGS. 2-8 and 10, the driveline 200 includes a plurality of primary driver, shown as hub motors 210, disposed within the inner cavity 102 of the frame assembly 100 and coupled to the left side panel 140 and the right side panel 150. More specifically, the driveline 200 includes a first pair of the hub motors 210 coupled to the left side panel 140 proximate opposing ends thereof and a second pair of hub motors 210 coupled to the right side panel 150 proximate opposing ends thereof. As shown in FIGS. 1-10, the driveline 200 includes a plurality of tractive elements, shown as wheels 220, positioned externally of the frame assembly 100. Each of the wheels 220 is coupled to and driven by a respective one of the hub motors 210. In some embodiments, each of the wheels 220 is not driven. By way of example, the driveline 200 may only include rear hub motors such that the front wheels are not driven. By way of example, the driveline 200 may only include front hub motors such that the rear wheels are not driven. In some embodiments, the driveline 200 includes more than four hub motors 210 and four wheels 220 (e.g., six, eight, etc.). According to an exemplary embodiment, the wheels 220 include tires that are or are similar in size and design to golf cart tires. Such implementation of golf cart tires on the AMR 10 may significantly improve driving on a golf course and substantially prevent any turf damage to the golf course. In other embodiments, the wheels 220 are replaced with track elements.

As shown in FIGS. 2-8 and 10, the driveline 200 includes a plurality of motor controllers, shown as motor controllers 230, disposed within the inner cavity 102 of the frame assembly 100. A first motor controller 230 is (a) coupled to the left side panel 140 between the hub motors 210 coupled thereto and (b) electrically coupled to each of the hub motors 210 coupled to the left side panel 140 to provide power thereto and control operation thereof. A second motor controller 230 is (a) coupled to the right side panel 150 between the hub motors 210 coupled thereto and (b) electrically coupled to each of the hub motors 210 coupled to the right side panel 150 to provide power thereto and control operation thereof. According to an exemplary embodiment, the motor controllers 230 are configured to control the hub motors 210 to provide skid steer operations for the AMR 10 (e.g., based on commands from the AMR control system 600). In some embodiments, the front wheels 220 and/or rear wheels 220 are steerable. In such embodiments, as shown in FIG. 10, the driveline 200 includes one or more steering actuators, shown as steering actuators 240, to selectively pivot and steer the front wheels 220 and/or the rear wheels 220 (e.g., based on commands from the AMR control system 600). In some embodiments, the hub motors 210 are controlled to provide regenerative braking operations, and the electricity generated thereby may be provided to the power system 300 for storage and/or distribution to other electrical systems of the AMR 10. In some embodiments, one or more of the hub motors 210 (e.g., at least two, all four, etc.) includes internal locking mechanisms to provide park brake operations.

Power System

According to an exemplary embodiment, the power system 300 is configured to electrically power the various systems of the AMR 10 (e.g., the driveline 200, the sensor system, 400, the light system 500, the AMR control system 600, the wireless controller 700, the user interface 750, etc.). As shown in FIGS. 2-8 and 10, the power system 300 includes a first battery, shown as high voltage ("HV") battery pack 310; a first converter, shown as direct current ("DC")-DC converter 320; a second battery, shown as low voltage ("LV") battery 330, coupled to the HV battery pack 310 through the DC-DC converter 320; and a charging interface, shown as charging port 340, coupled to the HV battery pack 310.

As shown in FIGS. 2-8, the HV battery pack 310 is disposed within the inner cavity 102 of the frame assembly 100 and includes one or more battery modules, shown as battery modules 312, and a support tray, shown as battery tub 314. As shown in FIGS. 4, 5, 7, and 8, the battery tub 314 extends between the left side panel 140, the right side panel 150, and the cross-member 160 and supported thereby. As shown in FIGS. 2-6, the battery tub 314 defines a recess configured to receive and support the battery modules 312 within the inner cavity 102.

According to an exemplary embodiment, the HV battery pack 310 is modular such that the number of battery modules 312 can be selected or adjusted based on the planned needs or implementation of the AMR 10 (e.g., based on cost, based on the type of use of the AMR 10, based on the type of the attachment 800 coupled to the AMR 10, etc.). Specifically, as shown in FIGS. 2-5, the HV battery pack 310 includes three of the battery modules 312 arranged in a stacked arrangement. In other embodiments, the HV battery pack 310 includes fewer than three battery modules 312 (e.g., one or two). In still other embodiments, the HV battery pack 310 includes more than three battery modules 312.

As shown in FIGS. 7 and 8, the DC-DC converter 320 is disposed within the inner cavity 102 of the frame assembly 100 and is coupled to the rear panel 130 of the frame assembly 100 (e.g., via a mounting bracket, along a bottom lip of the rear panel 130, etc.). In other embodiments, the DC-DC converter 320 is otherwise positioned (e.g., along the cross-member 160, within the battery tub 314, etc.). As shown in FIGS. 2, 4, 6, and 7, the LV battery 330 is disposed within the inner cavity 102 of the frame assembly 100. As shown in FIG. 7, the LV battery 330 is coupled to and supported by the battery support 162 of the cross-member 160 such that the LV battery 330 is positioned between the HV battery pack 310 and the DC-DC converter 320. In other embodiments, the LV battery 330 is otherwise positioned (e.g., within the battery tub 314, to the rear panel 130, etc.). As used herein, "low voltage" may refer to voltages of 24 volts ("V") or less (e.g., 5 V, 12 V, 24 V, etc.), whereas "high voltage" may refer to voltages greater than 24 V (e.g., 48 V, 120 V, 240 V, etc.).

According to an exemplary embodiment, the HV battery pack 310 is configured to provide HV power to the motor controllers 230 to power and drive the hub motors 210. The HV battery pack 310 may also be configured to provide HV power to other components of the AMR 10 and/or the attachments 800 coupled to the AMR 10 that require HV power for the operation thereof. Additionally, the HV battery pack 310 is configured to provide HV power to the DC-DC converter 320 and the DC-DC converter 320 is configured to provide LV power to the LV battery 330. The LV battery 330 may be configured to provide LV power to other components of the AMR 10 (e.g., the sensor system 400, the light system 500, the AMR control system 600, the wireless controller 700, the user interface 750, etc.) and/or the attachments 800 coupled to the AMR 10 that require LV power for the operation thereof.

As shown in FIGS. 3 and 7, the charging port 340 is coupled to the rear panel 130 and interfaces with the charging port aperture 134 thereof. According to an exemplary embodiment, the charging port 340 is configured to receive a charging plug of an external charging system to charge the HV battery pack 310. In some embodiments, as shown in FIG. 10, the power system 300 includes a second converter, shown as onboard charger 350, positioned between the charging port 340 and the HV battery pack 310. In such embodiments, the charging port 340 may be configured to receive alternating current ("AC") power from the external charging system and the onboard charger 350 is configured to convert the AC power to DC power for storage in the HV battery pack 310. In other embodiments, the power system 300 does not include the onboard charger 350. In such embodiments, the external charging system may include an off-board charger configured to convert AC power to DC power and provide the DC power to the charging port 340.

In some embodiments, as shown in FIG. 10, the power system includes an export power and/or data interface, shown as attachment interface 360. In such embodiments, the attachment interface 360 may be configured to receive HV power from the HV battery pack 310 and/or LV power from the LV battery 330 to facilitate powering HV attachments, LV attachments, and/or HV and/or LV components thereof (e.g., motors, pumps, lights, sensors, user interfaces, displays, etc.). In some embodiments, the attachment interface 360 is integrated into the hitch receiver 190 such that data, HV power, and/or LV power can be transferred between the AMR 10 and a respective attachment 800 in engagement therewith. In some embodiments, the attachment interface 360 is separate from the hitch receiver 190. By way of example, the rear panel 130 may include a data port/interface, a power port/interface, and/or a combined data/power port/interface that a cable or connector of the attachment 800 can be connected to. By way of another example, the attachment interface 360 may include a data cable, a power cable, and/or a combined data/power cable that may extend from the frame assembly 100 to one or more interfaces on the attachment 800. By way of yet another example, the attachment interface 360 may be integrated into the charging port 340 such that data and/or power can be transferred between the attachment 800 and the AMR 10 through a connector cable of the attachment 800.

Sensor System

The sensor system 400 may include various sensors positioned about the AMR 10 to acquire information or data regarding operation of the AMR 10 and/or the location thereof. By way of example, the sensor system 400 may include an accelerometer, a gyroscope, a compass, a position sensor (e.g., a GPS sensor, etc.), an inertial measurement unit ("IMU"), wheel sensors, an audio sensor or microphone, a camera (e.g., an IR camera, a RGB camera, etc.), an optical sensor, a proximity detection sensor, a Doppler/radar sensor, a sonar sensor, an ultrasonic sensor, a LiDAR sensor, ambient condition sensors (e.g., temperature sensors, humidity sensors, light sensors, etc.), and/or other sensors to facilitate acquiring information or data regarding operation of the AMR 10 and/or the location thereof. According to an exemplary embodiment, one or more of the sensors of the sensor system 400 are configured to facilitate detecting and obtaining telemetry data including position of the AMR 10, whether the AMR 10 is moving, travel direction of the AMR 10, slope of the AMR 10, speed of the AMR 10, vibrations experienced by the AMR 10, sounds proximate the AMR 10, and/or other vehicle telemetry data.

As shown in FIGS. 1-10, the sensor system 400 includes a plurality of first sensors, shown as stereo cameras 410, one or more second sensors, shown as LiDAR 420, a plurality of third sensors (e.g., emergency stop buttons/interfaces), shown as e-stops 430, one or more fourth sensors, shown as GPS camera 440, a fifth sensor or first communications interface (e.g., a long-range communications interface), shown as GPS antenna 450, and a sixth sensor or second communications interface (e.g., a short-range communications interface), shown as Wi-Fi antenna 460, variously positioned about the AMR 10.

According to an exemplary embodiment, the stereo cameras 410 are configured to acquire first image data (e.g., photos, videos, etc.) regarding an environment proximate the AMR 10 to facilitate (e.g., the AMR control system 600 with) monitoring the environment and making control decisions based thereon (e.g., collision avoidance, object detection, object recognition, drive direction decisions, steering decisions, speed decisions, etc.). As shown in FIGS. 1-5, a pair of front cameras of the stereo cameras 410 are disposed within the inner cavity 102 of the frame assembly 100, coupled to the front panel 120, and aligned with the stereo camera apertures 122. According to an exemplary embodiment, the pair of front cameras are oriented at outward facing angles such that the entire field of view in front of the AMR 10 is visible via the pair of front cameras. As shown in FIGS. 3, 6, and 7, a rear camera of the stereo cameras 410 is disposed within the inner cavity 102 of the frame assembly 100, coupled to the rear panel 130, and aligned with the stereo camera aperture 132. In some embodiments, the stereo cameras 410 includes a pair of rear cameras arranged along the rear panel 130 (e.g., similar to the front cameras on the front panel 120).

As shown in FIGS. 1-6, 8, and 9, (a) a first side camera of the stereo cameras 410 is positioned along the left side 116 of the frame assembly 100 between the front wheel 220 and the rear wheel 220 positioned along the left side panel 140 and (b) a second side camera of the stereo cameras 410 is positioned along the right side 118 of the frame assembly 100 between the front wheel 220 and the rear wheel 220 positioned along the right side panel 150. More specifically, the first side camera and the second side camera are supported by first sensor supports, shown as side supports 470, coupled to and extending laterally outward from (a) the left side panel 140 between the front wheel 220 and the rear wheel 220 positioned therealong and (b) the right side panel 150 between the front wheel 220 and the rear wheel 220 positioned therealong. The side supports 270 include (a) a first portion, shown as side support frame 472, having a first end coupled to and extending laterally outward from the left side panel 140 and the right side panel 150 and (b) a second portion, shown as side mounting plate 474, coupled to an opposing, second end of the side support frame 472 and to which the first side camera and the second side camera of the stereo cameras 410 are coupled.

According to an exemplary embodiment, the LiDAR 420 is configured to acquire second image data regarding the environment proximate the AMR 10 to facilitate (e.g., the AMR control system 600 with) monitoring the environment and making control decisions based thereon (e.g., collision avoidance, object detection, object recognition, drive direction decisions, steering decisions, speed decisions, etc.). As shown in FIGS. 1-5, the LiDAR 420 is disposed within the inner cavity 102 of the frame assembly 100, coupled to the front panel 120, and aligned with the LiDAR aperture 124. As shown in FIGS. 3-5, the LiDAR 420 is supported by a second sensor support, shown as LiDAR bracket 422, coupled to the interior surface of the front panel 120. In other embodiments, the LiDAR 420 is otherwise positioned (e.g., on the hoop bar 180). In some embodiments, the sensor system 400 includes a radar configured to replace or supplement the LiDAR 420.

According to an exemplary embodiment, the e-stops 430 are configured to engage with objects in the environment of the AMR 10 to facilitate (e.g., the AMR control system 600 with) monitoring the environment and making control decisions based thereon (e.g., collision avoidance, object detection, drive direction decisions, steering decisions, speed decisions, etc.). As shown in FIGS. 1, 2, 4, and 5, a pair of front e-stops of the e-stops 430 are coupled to the front panel 120 and aligned with the e-stop apertures 128 such that a portion of the front e-stops protrude longitudinally forward of the front panel 120. As shown in FIGS. 3, 6, and 7, a pair of rear e-stops of the e-stops 430 are coupled to the rear panel 130 and aligned with the e-stop apertures 138 such that a portion of the rear e-stops protrude longitudinally rearward of the rear panel 130.

As shown in FIGS. 1-6, 8, and 9, (a) a first side e-stop of the e-stops 430 is positioned along the left side 116 of the frame assembly 100 between the front wheel 220 and the rear wheel 220 positioned along the left side panel 140 and (b) a second e-stop of the e-stops 430 is positioned along the right side 118 of the frame assembly 100 between the front wheel 220 and the rear wheel 220 positioned along the right side panel 150. More specifically, the first side e-stop and the second side e-stop are coupled to and supported by the side mounting plates 474 of the side supports 470 and positioned beneath the first side camera and the second side camera of the stereo cameras 410.

In some embodiments, the frame assembly 100 includes a front bumper, a rear bumper, a left side bumper, and/or a right side bumper associated with the e-stops 430. The bumpers may be coupled to and cover the e-stops 430.

According to an exemplary embodiment, the GPS camera 440 is configured to acquire third image data (e.g., photos, video, etc.) regarding the environment proximate the AMR 10 to facilitate (e.g., the AMR control system 600 with) GPS verification and correction. As shown in FIGS. 1-5 and 7, the GPS camera 440 is disposed within the inner cavity 102 of the frame assembly 100, coupled to the front panel 120, and aligned with the GPS camera aperture 126. As shown in FIGS. 3, 5, 7, and 8, the GPS camera 440 is supported by a third sensor support, shown as GPS camera bracket 442, coupled to the interior surface of the front panel 120 beneath the LiDAR bracket 422. In other embodiments, the GPS camera 440 is otherwise positioned (e.g., on the hoop bar 180).

As shown in FIGS. 1-5, the GPS antenna 450 is positioned along the crossbar 184 of the hoop bar 180. In other embodiments (e.g., in embodiments where the AMR 10 does not include the hoop bar 180), the GPS antenna 450 is otherwise positioned (e.g., within the inner cavity 102). According to an exemplary embodiment, the GPS antenna 450 is configured to communicate with a remote GPS system to facilitate location tracking of the AMR 10. The third image data acquired by the GPS camera 440 may be analyze by the AMR control system 600 to verify that the location determined based on communication between the remote GPS system and the GPS antenna 450 is accurate and perform corrections as needed based on the third image data.

As shown in FIGS. 1-5, the GPS antenna 450 is positioned along the crossbar 184 of the hoop bar 180. In other embodiments (e.g., in embodiments where the AMR 10 does not include the hoop bar 180), the GPS antenna 450 is otherwise positioned (e.g., within the inner cavity 102). According to an exemplary embodiment, the GPS antenna 450 is configured to facilitate communications between the AMR control system 600 and a remote GPS system to facilitate location tracking of the AMR 10. The third image data acquired by the GPS camera 440 may be analyze by the AMR control system 600 to verify that the location determined based on communication between the remote GPS system and the GPS antenna 450 is accurate and perform corrections as needed based on the third image data.

As shown in FIGS. 1-3 and 5, the Wi-Fi antenna 460 is positioned along the crossbar 184 of the hoop bar 180. In other embodiments (e.g., in embodiments where the AMR 10 does not include the hoop bar 180), the Wi-Fi antenna 460 is otherwise positioned (e.g., within the inner cavity 102). According to an exemplary embodiment, the Wi-Fi antenna 460 is configured to facilitate communications between the AMR control system 600 and one or more nearby systems of the AMR 10 such as the wireless controller 700, the user interface 750, and/or the attachments 800. While described as being a Wi-Fi antenna 460, in some embodiments, the Wi-Fi antenna 460 is replaced with or supplemented by another type communications interface or antenna such as a Bluetooth antenna, a cellular antenna, a near-field communication ("NFC") antenna, a radio-frequency identification ("RFID") antenna, and/or still another type of communication interface or antenna.

Light System

As shown in FIGS. 1-3, 5, and 10, the light system 500 incudes a first light element, shown as beacon light 510, positioned along the crossbar 184 of the hoop bar 180, between the GPS antenna 450 and the Wi-Fi antenna 460. In other embodiments (e.g., in embodiments where the AMR 10 does not include the hoop bar 180), the beacon light 510 is otherwise positioned (e.g., along an exterior of the frame assembly 100, coupled to the attachment 800, etc.). According to an exemplary embodiment, the beacon light 510 is controllable (e.g., by the AMR control system 600) to provide one or more indications regarding operation of the AMR 10 to a surrounding environment (e.g., proximate personnel, golfers, etc.). By way of example, the color, flash pattern, and/or other characteristic of the beacon light 510 may be controlled to indicate direction of travel (e.g., forward, backward, etc.), indicate on/off status, indicate mode of operation (e.g., autonomous operation, locally operator controlled, remotely operator controlled, etc.), etc.

In some embodiments, as shown in FIG. 10, the light system 500 includes one or more second light elements, shown as perimeter lighting 520. The perimeter lighting 520 illuminate an area in front of, to the sides of, and/or behind the AMR 10. The direction of illumination may be fixed or may correspond with a direction of travel. The perimeter lighting 520 may function as headlights, indicator lights (e.g., turning signals, hazard lights, etc.), brake lights, spotlights, etc. The perimeter lighting 520 may include one or more lighting elements positioned along the front panel 120, the rear panel 130, the left side panel 140, and/or the right side panel 150.

AMR Control System

As shown in FIGS. 2-6, the AMR control system 600 is disposed within the inner cavity 102 of the frame assembly 100. As shown in FIGS. 2-6 and 8, the AMR control system 600 is supported by a controller support, shown as AMR control system bracket 608, coupled to the interior surface of the rear panel 130 beneath the rear camera of the stereo cameras and above the DC-DC converter 320. In other embodiments, AMR control system 600 is otherwise positioned within the inner cavity 102.

The AMR control system 600 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 10, the AMR control system 600 includes a processing circuit 602, a memory 604, and a communications interface 606. The processing circuit 602 may include an ASIC, one or more FPGAs, a DSP, circuits containing one or more processing components, circuitry for supporting a microprocessor, a group of processing components, or other suitable electronic processing components. In some embodiments, the processing circuit 602 is configured to execute computer code stored in the memory 604 to facilitate the activities described herein. The memory 604 may be any volatile or non-volatile or non-transitory computer-readable storage medium capable of storing data or computer code relating to the activities described herein. According to an exemplary embodiment, the memory 604 includes computer code modules (e.g., executable code, object code, source code, script code, machine code, etc.) configured for execution by the processing circuit 602. In some embodiments, the AMR control system 600 may represent a collection of processing devices. In such cases, the processing circuit 602 represents the collective processors of the devices, and the memory 604 represents the collective storage devices of the devices.

In one embodiment, the AMR control system 600 is configured to selectively engage, selectively disengage, control, or otherwise communicate with components of the AMR 10 (e.g., via the communications interface 606, a controller area network ("CAN") bus, etc.). According to an exemplary embodiment, the AMR control system 600 is coupled to (e.g., communicably coupled to) components of the driveline 200 (e.g., the hub motors 210, the motor controllers 230, the steering actuators 240, etc.), components of the power system 300 (e.g., the HV battery pack 310, the DC-DC converter 320, the LV battery 330, the charging port 340, the onboard charger 350, the attachment interface 360, etc.), components of the sensor system 400 (e.g., the stereo cameras 410, the LiDAR 420, the e-stops 430, the GPS camera 440, the GPS antenna 450, the Wi-Fi antenna 460, etc.), and the light system 500 (e.g., the beacon light 510, the perimeter lighting 520, etc.), the wireless controller 700, the user interface 750, and/or the attachment(s) 800. By way of example, the AMR control system 600 may send and receive signals (e.g., control signals, location signals, etc.) with the components of the driveline 200, the power system 300, the sensor system 400, the light system 500, the wireless controller 700, the user interface 750, and/or the attachment(s) 800 (via the communications interface 606 as described in greater detail herein).

Wireless Controller

According to an exemplary embodiment, the wireless controller 700 is configured to facilitate short-range wireless operation of the AMR 10 by an operator. The wireless controller 700 may send signals to and receive signals from the AMR control system 600 (e.g., via the Wi-Fi antenna 460, the communications interface 606, etc.). The wireless controller 700 may be detachably coupled to a controller dock on the AMR 10 (e.g., to the frame assembly 100, to the hoop bar 180, to the attachment 800, etc.). The controller dock may be electrically coupled to the power system 300 (e.g., the LV battery 330, the HV battery pack 310, etc.) to facilitate charging the wireless controller 700. The wireless controller 700 may include input devices (e.g., button, knobs, joysticks, levers, touch interfaces, etc.) and output devices (e.g., indicator lights, displays, etc.) configured to facilitate wireless operation of the AMR 10 by the operator. In some embodiments, the wireless controller 700 is a dedicated device associated with the AMR 10. In some embodiments, the wireless controller 700 is an operator device (e.g., the operator device 2030, a smartphone, a tablet, etc.) connectable to the AMR 10 (e.g., via the operator portal 2020).

User Interface

According to an exemplary embodiment, the user interface 750 is configured to be fixedly coupled (e.g., not readily detachable) to the AMR 10 (e.g., to the frame assembly 100, to the hoop bar 180, to the attachment 800, etc.). The user interface 750 may be electrically coupled (e.g., hardwired) to the power system 300 (e.g., the LV battery 330, the HV battery pack 310, etc.) to facilitate powering the user interface 750. The user interface 750 may include input devices (e.g., button, knobs, joysticks, levers, touch interfaces, etc.) and output devices (e.g., indicator lights, displays, etc.) configured to facilitate local operation of the AMR 10 by the operator. In some embodiments, the user interface 750 is a controller for the AMR 10 that can be used by an operator to provide commands or instructions to the AMR 10. In some embodiments, the user interface is a point-of-sale ("POS") system configured to receive order information and payments (e.g., credit card, member account information, etc.) from the operator (e.g., a golfer, a resort patron, etc.). The user interface 750 may change or be included with AMRs 10 with certain of the attachments 800 (e.g., a drink and/or food vending attachment, an equipment vending attachment, attachments that have goods for sale therein, etc.).

Auxiliary Components

In some embodiments, the AMR 10 include reflector strips positioned about the frame assembly 100. In some embodiments, the AMR 10 includes a pedestrian warning system that includes a speaker and/or a horn configured to emit an audible sound to warning proximate people of the presence of the AMR 10 and/or an operational mode thereof (e.g., remotely controlled, autonomously controlled, locally controlled, etc.).

Attachments

According to an exemplary embodiment, the AMR 10 is configured to accept or interface with various different types of attachments 800. The attachments 800 may include one or more first attachments that couple to the frame assembly 100 (e.g., along the upper panel 170, above the inner cavity 102, etc.) and/or one or more second attachments that interface with the hitch receiver 190 to be pushed or pulled (i.e., towed) by the AMR 10. By way of example, the one or more first attachments may be or include a modular platform attachment, a fixed bed attachment, a pivoting bed attachment, a rotating bed attachment, a sprayer attachment, a club carrier attachment, a vending unit attachment (e.g., with equipment for purchase, with food for purchase, for drinks or refreshments for purchase), an entertainment assembly attachment, a post digger attachment, and/or still other attachments. By way of another example, the one or more second attachments may be or include a rake attachment, a ball picker attachment, a mower attachment, a trailer attachment, a dew sweeper attachment, a club carrier attachment, a sprayer attachment, a vending unit attachment, an entertainment assembly attachment, a rider platform attachment, a post digger attachment, and/or still other towable or pushable attachments.

Modular Platform Attachment

Figure 11:
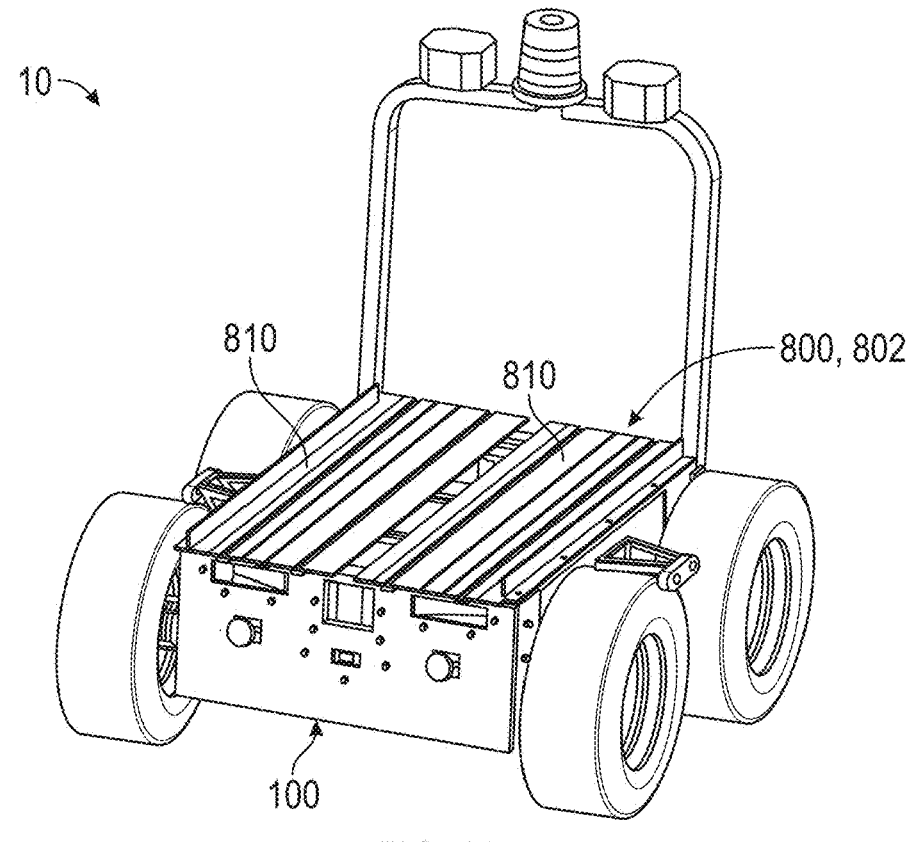
FIG. 11 is a front perspective view of the AMR of FIG. 1 with a modular platform attachment, according to an exemplary embodiment.
Figure 12:
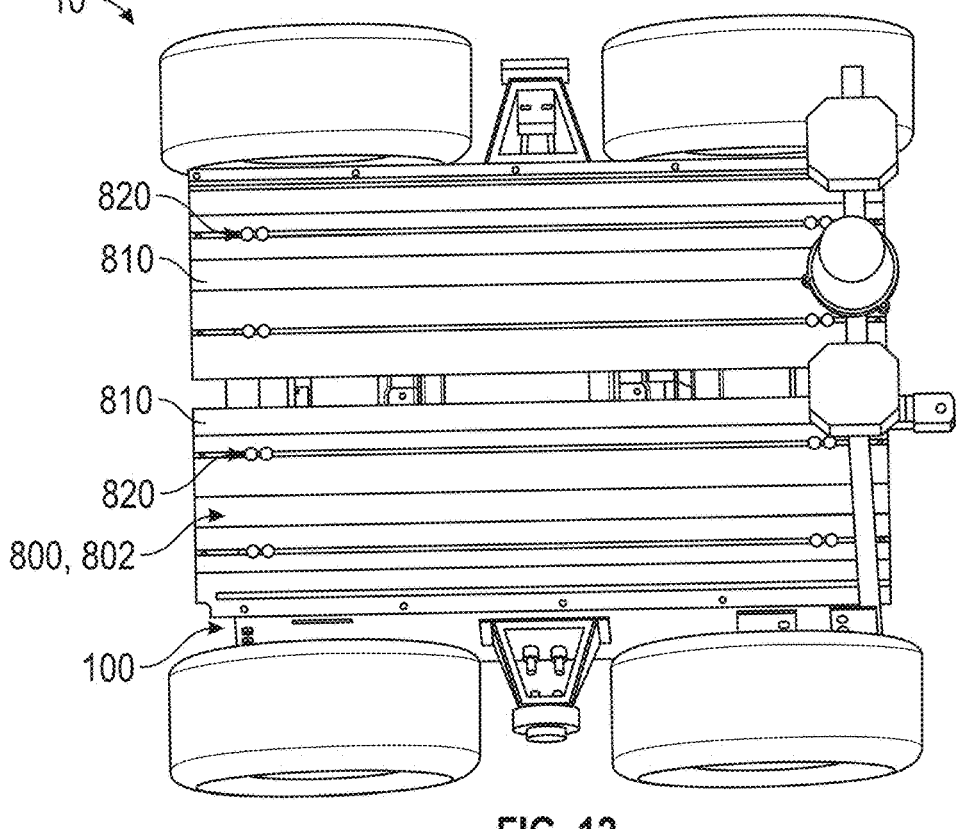
FIG. 12 is a top view of the AMR of FIG. 11 with the modular platform attachment, according to an exemplary embodiment.
Figures 13, 14:
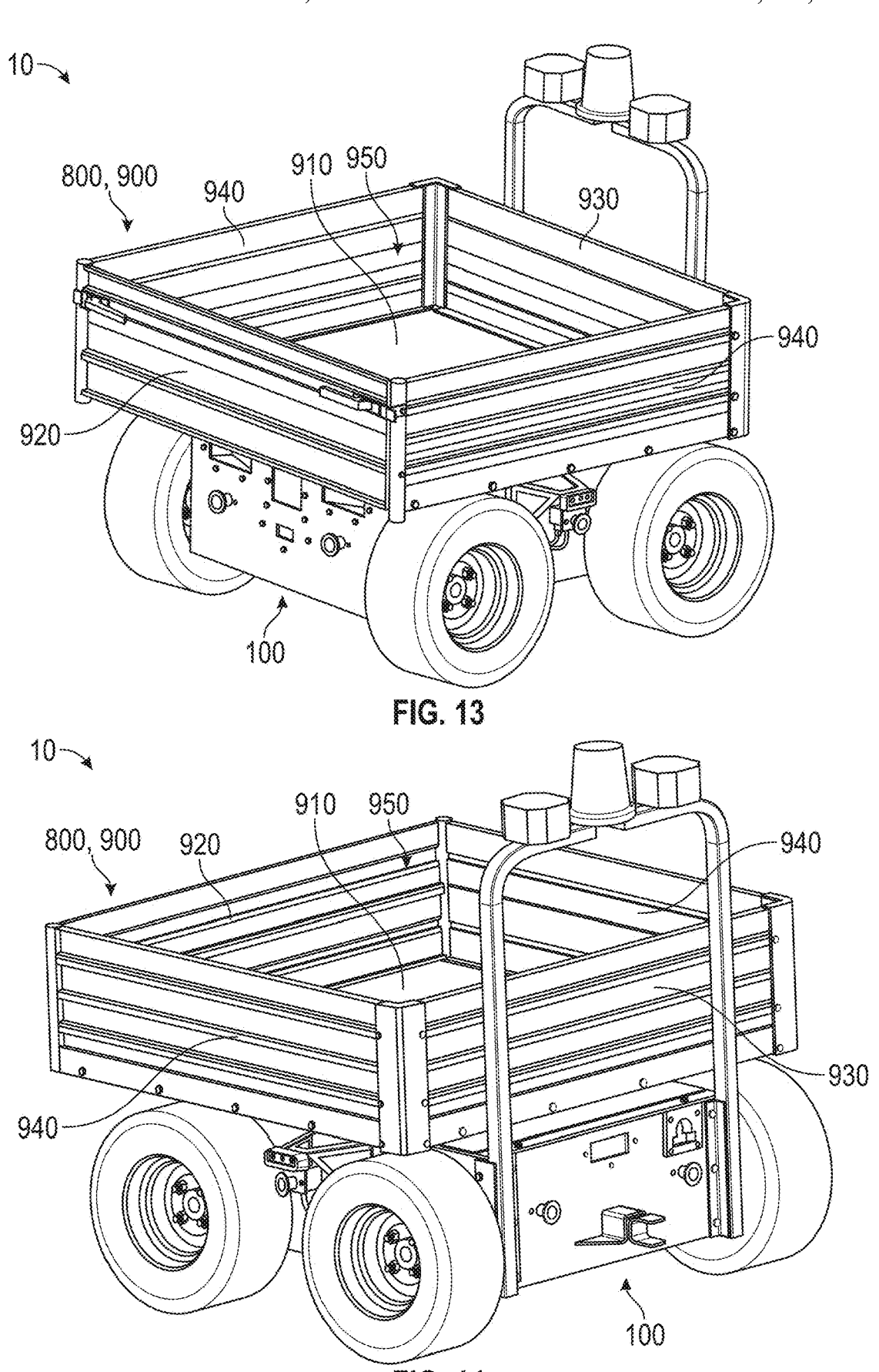
FIG. 13 is a front perspective view of the AMR of FIG. 1 with a first bed attachment, according to an exemplary embodiment.
FIG. 14 is a rear perspective view of the AMR of FIG. 13 with the first bed attachment, according to an exemplary embodiment.

As shown in FIGS. 11 and 12, the attachment 800 of the AMR 10 includes or is configured as modular platform, shown as modular platform attachment 802. The modular platform attachment 802 includes one or more panels, shown as panels 810, that are coupled to the top of the frame assembly 100 (e.g., on top of the top panel 170, in place of the top panel 170, etc.). As shown in FIG. 12, the panels 810 define a plurality of interfaces (e.g., quick release attachment points), shown as attachment interfaces 820. According to an exemplary embodiment, the attachment interfaces 820 are configured to facilitate detachably mounting various different mechanisms, devices, or attachments described herein on top of the frame assembly 100.

Bed Attachment

As shown in FIGS. 13-16, the attachment 800 of the AMR 10 includes or is configured as first bed attachment, shown as bed attachment 900. The bed attachment 900 includes a base, shown as bed 910, with a plurality of peripheral panels including a first panel, shown as front gate 920, a second panel, shown as rear panel 930, and a pair of third panels, shown as side panels 940. The bed 910, the front gate 920, the rear panel 930, and the side panels 940 cooperatively define a cavity, shown as bed cavity 950. According to an exemplary embodiment, the front gate 920 is configured to open and pivot. In some embodiments (e.g., where the AMR 10 does not include the hoop bar 180), the rear panel 930 additionally or alternatively is configured open and pivot. In some embodiments, one of more the side panels 940 are configured to open and pivot. In some embodiments, the bed attachment 900 does not include one or more of the front gate 920, the rear panel 930, or the side panels 940. By way of example, the bed attachment 900 may not include any of the front gate 920, the rear panel 930, and the side panels 940 such that the bed 910 is a flat bed. By way of another example, the bed attachment 900 may not include the front gate 920 and/or the rear panel 930.

Figures 15, 16:
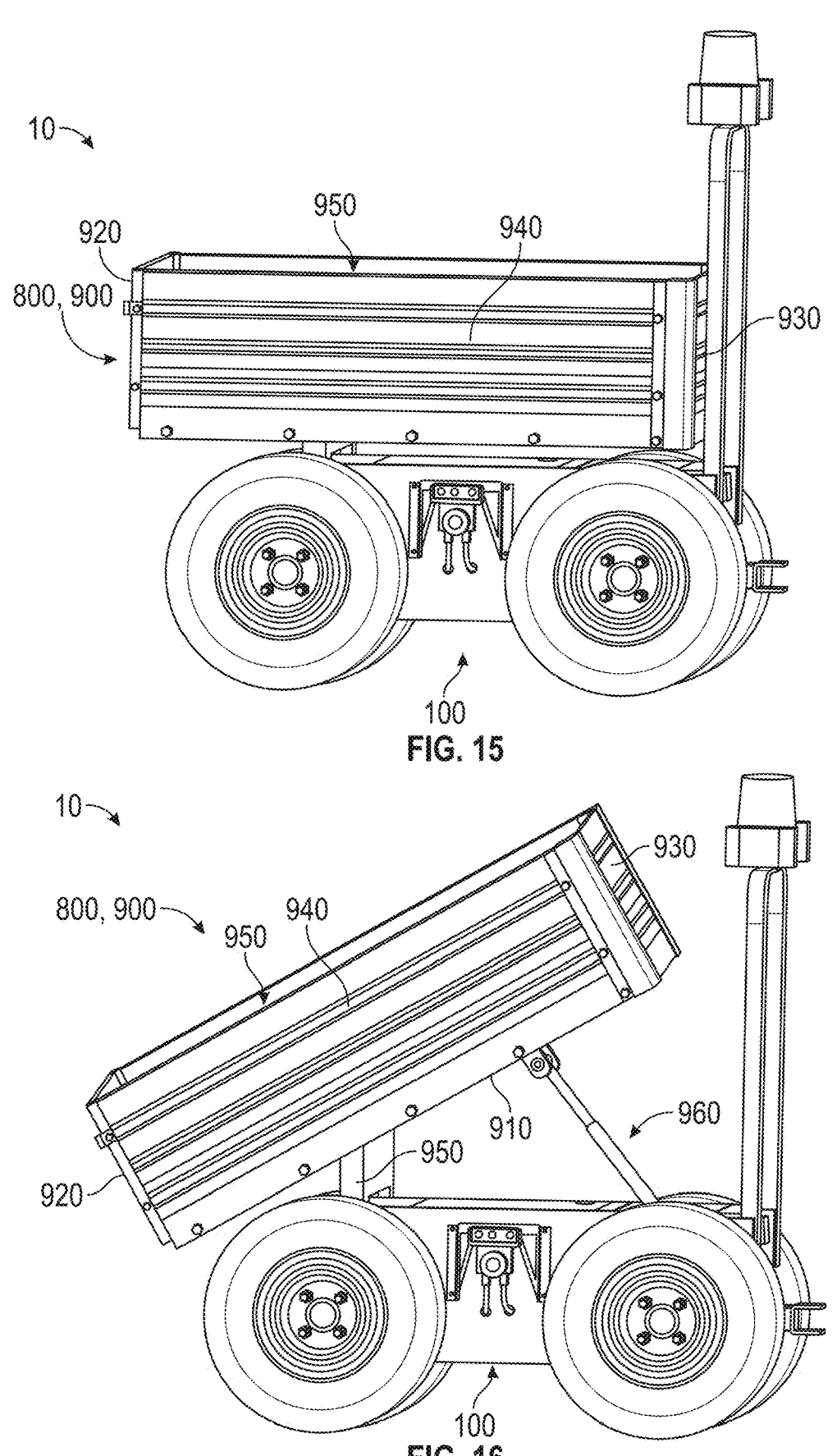
FIG. 15 is a side view of the AMR of FIG. 13 with the first bed attachment in a first orientation, according to an exemplary embodiment.
FIG. 16 is a side view of the AMR of FIG. 15 with the first bed attachment in a second orientation, according to an exemplary embodiment.
Figures 17, 18:
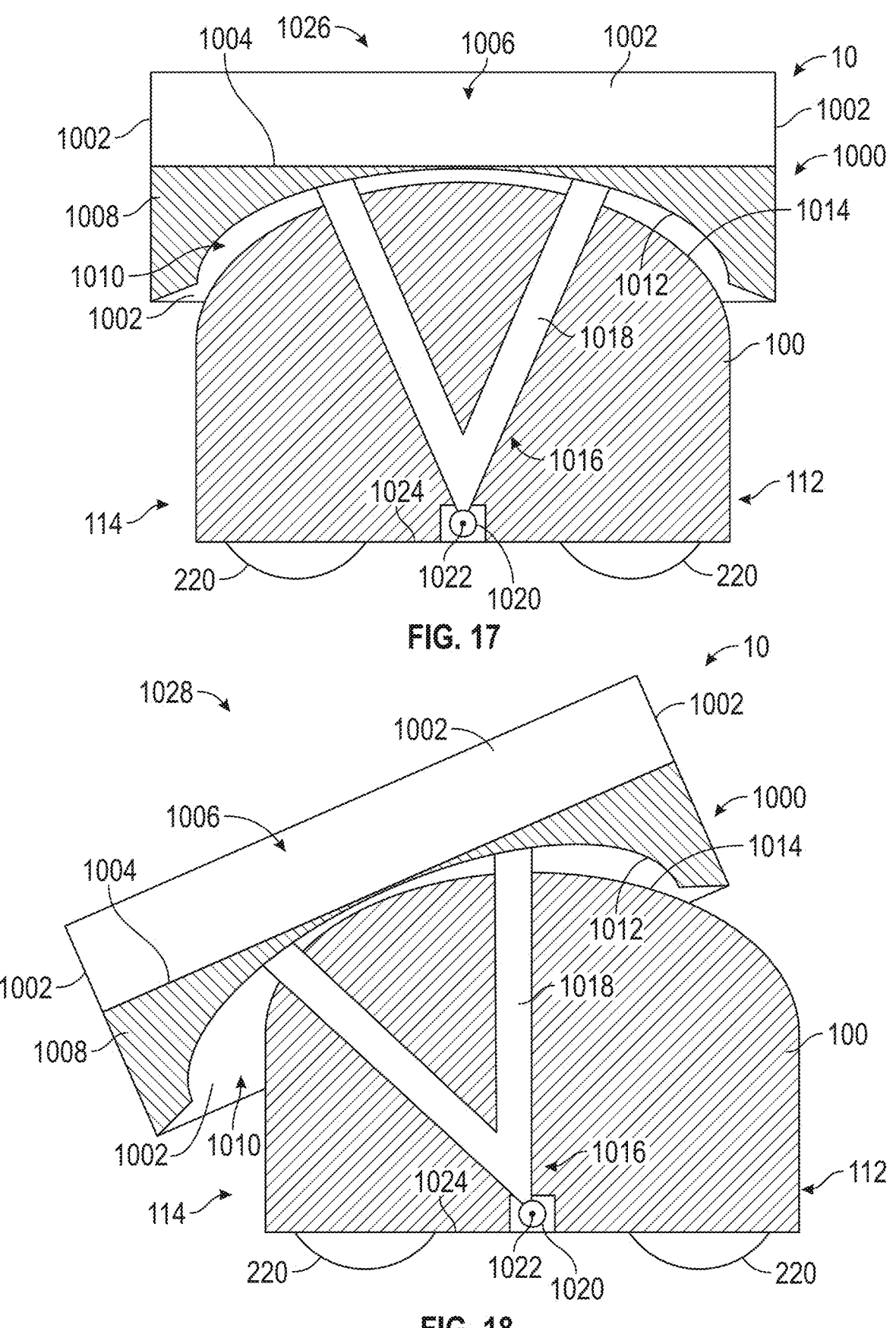
FIG. 17 is a side view of the AMR of FIG. 1 including a second bed attachment in a home position, according to an exemplary embodiment.
FIG. 18 is a side view of the AMR with the second bed attachment of FIG. 17 in a dumping position, according to an exemplary embodiment.

As shown in FIGS. 15 and 16, the bed attachment 900 is pivotable relative to the frame assembly 100 from a stowed position and a dump position. In other embodiments, the bed attachment 900 is not pivotable. As shown in FIG. 16, the bed attachment 900 includes (a) at least one actuator, shown as dump actuator 960, extending between the bed 910 and the frame assembly 100 and (b) a bed support, shown as bed pivot support 970, pivotably coupling the bed 910 to the frame assembly 100. Accordingly, the dump actuator 960 is configured to extend and retract to reposition the bed 910 between the stowed position and the dump position.

In some embodiments, the bed attachment 900 does not include the bed pivot support 970, but rather includes a plurality of the dump actuators 960. By way of example, a respective actuator may extend between a respective corner of the frame assembly 100 and a corresponding corner of the bed 910. Accordingly, the bed attachment 900 may include four dump actuators 960 configured to facilitate dumping the bed attachment 900 forward, rearward, and to either side. In such embodiments (e.g., with the plurality of the dump actuators 960 and with the front gate 920, the rear panel 930, and the side panels 940), each of the front gate 920, the rear panel 930, and the side panels 940 may be openable and pivotable to facilitate dumping in any direction. Such multi-direction dumping may be particularly beneficial because the AMR 10 would not need to orient in a specific orientation to dump contents supported by the bed attachment 900.

Rotating Bed Attachment

As shown in FIGS. 17-24 and 29-32, the attachment 800 of the AMR 10 includes or is configured as second/rotating bed attachment including a bed, shown as dump bed 1000, and a pivot assembly, shown as bed pivot assembly 1016, configured to pivotably couple the dump bed 1000 with the frame assembly 100. The dump bed 1000 includes a plurality of first walls (e.g., panels, members, etc.), shown as sidewalls 1002, extending in a vertical direction along front, rear, left, and right sides of the dump bed 1000; and a second wall, shown as bottom wall 1004, extending in a horizontal plane between the sidewalls 1002. Collectively, the sidewalls 1002 and the bottom wall 1004 define an interior chamber, shown as dump bed cavity 1006. The top of the dump bed cavity 1006 is open to the environment. In some embodiments, the dump bed 1000 includes a top wall (e.g., cover, panel, etc.) such that the dump bed cavity 1006 is selectively closed to the environment. The dump bed 1000 is configured to receive and support cargo (e.g., tools, golf clubs, sand, sod, etc.) within the dump bed cavity 1006. In some embodiments, one or more of the sidewalls 1002 are selectively movable relative to the bottom wall 1004 to facilitate loading and unloading the cargo into or from the dump bed cavity 1006. By way of example, a rear sidewall of the sidewalls 1002 may be configured to pivot relative to the bottom wall 1004. In such an example, when the dump bed 1000 is pivoted to a dumping position (as discussed in greater detail below), the rear sidewall may pivot relative to the bottom wall 1004 to facilitate dumping cargo supported by the dump bed 1000 from the dump bed cavity 1006 thereof.

As shown in FIGS. 17-24 and 29, the dump bed 1000 includes a frame assembly, shown as dump bed frame 1008. The sidewalls 1002 are coupled to the dump bed frame 1008 and extend vertically from the dump bed frame 1008 to form the dump bed cavity 1006 with the bottom wall 1004. In some embodiments, the bottom wall 1004 is a top surface of the dump bed frame 1008. By way of example, the dump bed 1000 may omit the bottom wall 1004 such that the top surface of the dump bed frame 1008 defines a bottom of the dump bed cavity 1006. In some embodiments, the sidewalls 1002 and the bottom wall 1004 are independent components from the dump bed frame 1008 that are coupled (e.g., fastened) to the dump bed frame 1008. By way of example, the sidewalls 1002 and the bottom wall 1004 defining the dump bed cavity 1006 may be selectively removable from the dump bed frame 1008. In other embodiments, the sidewalls 1002 and the bottom wall 1004 are integrally formed (e.g., welded together, etc.) with the dump bed frame 1008.

As shown in FIGS. 17-24 and 29, the dump bed frame 1008 defines an interior chamber, shown as dump bed recess 1010, of the dump bed 1000. The dump bed recess 1010 is configured to receive at least a portion of the bed pivot assembly 1016 and the frame assembly 100 of the AMR 10. As shown in FIGS. 17-24 and 29, the sidewalls 1002 (e.g., the sidewalls 1002 along the left side 116 and the right side 118) extend along opposing lateral sides of the dump bed recess 1010 to enclose the dump bed recess 1010 from the environment (e.g., such that the dump bed recess 1010 is not exposed to the exterior of the AMR 10 when the dump bed 1000 is coupled with the frame assembly 100). In some embodiments, the dump bed 1000 includes side panels as independent components from the sidewalls 1002 to extend along opposing lateral sides of the dump bed recess 1010. As shown in FIGS. 17-24 and 29, a bottom surface of the dump bed 1000 (e.g., a bottom surface of the dump bed frame 1008, a top surface of the dump bed recess 1010, etc.), shown as bed bottom surface 1012, defines a first curved profile (e.g., a first curvature) and a top surface of the frame assembly 100 of the AMR 10, shown as frame top surface 1014, defines a second curved profile (e.g., a second curvature) complementary to (e.g., matching) the first curved profile of the bed bottom surface 1012. The complementary curvatures of the first curved profile of the bed bottom surface 1012 and the second curved profile of the frame top surface 1014 enables the dump bed 1000 to pivot relative to the frame assembly 100 without contacting (e.g., scraping, bumping, interfering with, etc.) the frame assembly 100. In some embodiments, the bed bottom surface 1012 and/or the frame top surface 1014 define other suitable shapes or curvatures that enable the dump bed 1000 to pivot relative to the frame assembly 100.

As shown in FIGS. 17-24 and 29, the bed pivot assembly 1016 includes one or more frame members, shown as pivot frame 1018, and a mount, shown as pivot mount 1020, configured to pivotably couple the pivot frame 1018 with the frame assembly 100 about an axis of rotation (e.g., a lateral axis), shown as axis 1022. The axis 1022 shown in FIGS. 17-24 and 29 extends into and out of the page. According to the exemplary embodiment shown in FIGS. 17-24 and 29, the pivot frame 1018 includes two frame members coupled together such that the pivot frame 1018 is "V-shaped." In some embodiments, the pivot frame 1018 includes more or fewer than two frame members. In some embodiments, the pivot frame 1018 is otherwise suitably shaped. By way of example, the pivot frame 1018 may be "U-shaped." By way of another example, the pivot frame 1018 may be shaped such that the pivot frame 1018 does not contact one or more other components of the AMR 10 (e.g., components of the driveline 200, the power system 300, the sensor system 400, the light system 500, the AMR control system 600, etc.) or interfere with the operation thereof (e.g., defines an arced shape such that the pivot frame 1018 does not contact the wheels 220 when the dump bed 1000 is in a dumping position). As shown in FIGS. 17-24 and 29, the frame members of the pivot frame 1018 converge at the pivot mount 1020 and are coupled thereto such that the pivot frame 1018 is pivotable about the axis 1022.

As shown in FIGS. FIGS. 17-24 and 29, the pivot mount 1020 is coupled to the frame assembly 100 and positioned along or proximate a bottom surface of the frame assembly 100, shown as frame bottom surface 1024. The pivot mount 1020 is substantially centered along the frame assembly 100 between the front end 112 and the rear end 114 (e.g., longitudinally between the front end 112 and the rear end 114, longitudinally between the front wheels 220 and the rear wheels 220, etc.). In some embodiments, the pivot mount 1020 is positioned longitudinally offset from the longitudinal centerline between the front end 112 and the rear end 114 (e.g., the pivot mount 1020 is positioned closer to the front end 112 than the rear end 114) such that the pivot frame 1018 (and the dump bed 1000 coupled therewith) are biased to pivot in a direction towards the rear end 114. In some embodiments, the pivot mount 1020 is substantially centered along the frame assembly 100 between the left side 116 and the right side 118 (e.g., laterally between the left side 116 and the right side 118). According to an exemplary embodiment, the pivot mount 1020 is configured to pivotably couple the pivot frame 1018 with the frame assembly 100. By way of example, the pivot mount 1020 may be or may include one or more hinges, ball and socket joints, bearings, U-joints, clevis joints, among other components configured to permit rotation of the pivot frame 1018 about the axis 1022 relative to the frame assembly 100.

As shown in FIGS. 17-24 and 29, the pivot frame 1018 is pivotably coupled to the pivot mount 1020 at a first, lower end thereof and fixedly coupled to the dump bed 1000 at a second, upper end thereof such that the dump bed 1000 is pivotably coupled with the frame assembly 100 about the axis 1022. The pivot frame 1018 is coupled to the dump bed 1000 along the bed bottom surface 1012. In some embodiments, the pivot frame 1018 and the dump bed frame 1008 are independent components that are fastened together. In other embodiments, the pivot frame 1018 and the dump bed frame 1008 are integrally formed with each other (e.g., welded).

As shown in FIGS. 17-24 and 29, the dump bed 1000 is pivotable with the bed pivot assembly 1016 in a longitudinal direction from a first position, shown in FIGS. 17, 20, 21, 23, and 24 as home position 1026, to a second position, shown in FIGS. 18, 19, 22, and 29-32 as dumping position 1028, to dump contents (e.g., cargo, dirt, sand, sod, mulch, rock, etc.) supported by the dump bed 1000. The dump bed 1000 rotates about the axis 1022 and follows a curved path along the second curved profile of the frame top surface 1014 from the home position 1026 to the dumping position 1028. In some embodiments, the dump bed 1000 moves in a rearward direction (e.g., in a direction towards the rear end 114) from the home position 1026 to the dumping position 1028. In other embodiments, the dump bed 1000 moves in a forward direction (e.g., in a direction towards the front end 112) from the home position 1026 to the dumping position 1028. In yet other embodiments, the dump bed 1000 moves in the longitudinal direction either forwards or rearwards from the home position 1026 to the dumping position 1028. As shown in FIGS. 17-24 and 29, the dump bed 1000 is pivotable with the bed pivot assembly 1016 from the dumping position 1028 to the home position 1026. In some embodiments, the dump bed 1000 moves in a lateral direction (e.g., in a direction between the left side 116 and the right side 118) from the home position 1026 to the dumping position 1028. By way of example, the dump bed 1000 may move in a left direction (e.g., in a direction towards the left side 116) from the home position 1026 to the dumping position 1028. By way of another example, the dump bed 1000 may move in a right direction (e.g., in a direction towards the right side 118) from the home position 1026 to the dumping position 1028. By way of yet another example, the dump bed 1000 may move in the lateral direction either to the left or to the right from the home position 1026 to the dumping position 1028.

According to an exemplary embodiment, positioning the pivot mount 1020 along the frame bottom surface 1024 facilitates increasing a moment arm (e.g., a lever arm, a distance between the axis 1022 and the bed bottom surface 1012, etc.) between the axis 1022 and the dump bed 1000 compared to other dumping systems (e.g., other vehicles with dumping capabilities) in which an axis of rotation about which a dump bed pivots is along a top surface of a chassis (e.g., proximate a bottom surface of the dump bed). In the present disclosure, the larger moment arm enables initiating a dumping sequence (e.g., pivoting the dump bed 1000 from the home position 1026 to the dumping position 1028) with a smaller force compared to the force required pivot a dump bed of the other dumping system with a smaller moment arm.

In some embodiments, the AMR 10 defines a space (e.g., cavity) along the longitudinal length thereof to permit (i) the pivot frame 1018 to extend from the pivot mount 1020 to the dump bed 1000 and (ii) the pivot frame 1018 to pivot about the axis 1022. By way of example, the various components of the AMR 10 (e.g., components of the driveline 200, the power system 300, the sensor system 400, the light system 500, the AMR control system 600, etc.) may be positioned to provide a space for the pivot frame 1018 to move. In other embodiments, the pivot frame 1018 extends outside of the AMR 10 (e.g., outside of the width of the frame assembly 100) to couple the dump bed 1000 with the frame assembly 100 via the pivot mount 1020. In some embodiments, the AMR 10 includes more than one bed pivot assembly 1016. By way of example, the AMR 10 may include (i) a first bed pivot assembly 1016 along a first side (e.g., the left side 116) of the AMR 10 and including a first pivot frame 1018 extending between a first pivot mount 1020 and a first side (e.g., left side) of the dump bed 1000, and (ii) a second bed pivot assembly 1016 along a second side (e.g., the right side 118) of the AMR 10 and including a second pivot frame 1018 extending between a second pivot mount 1020 and a second side (e.g., right side) of the dump bed 1000.

Figures 19, 20, 21:
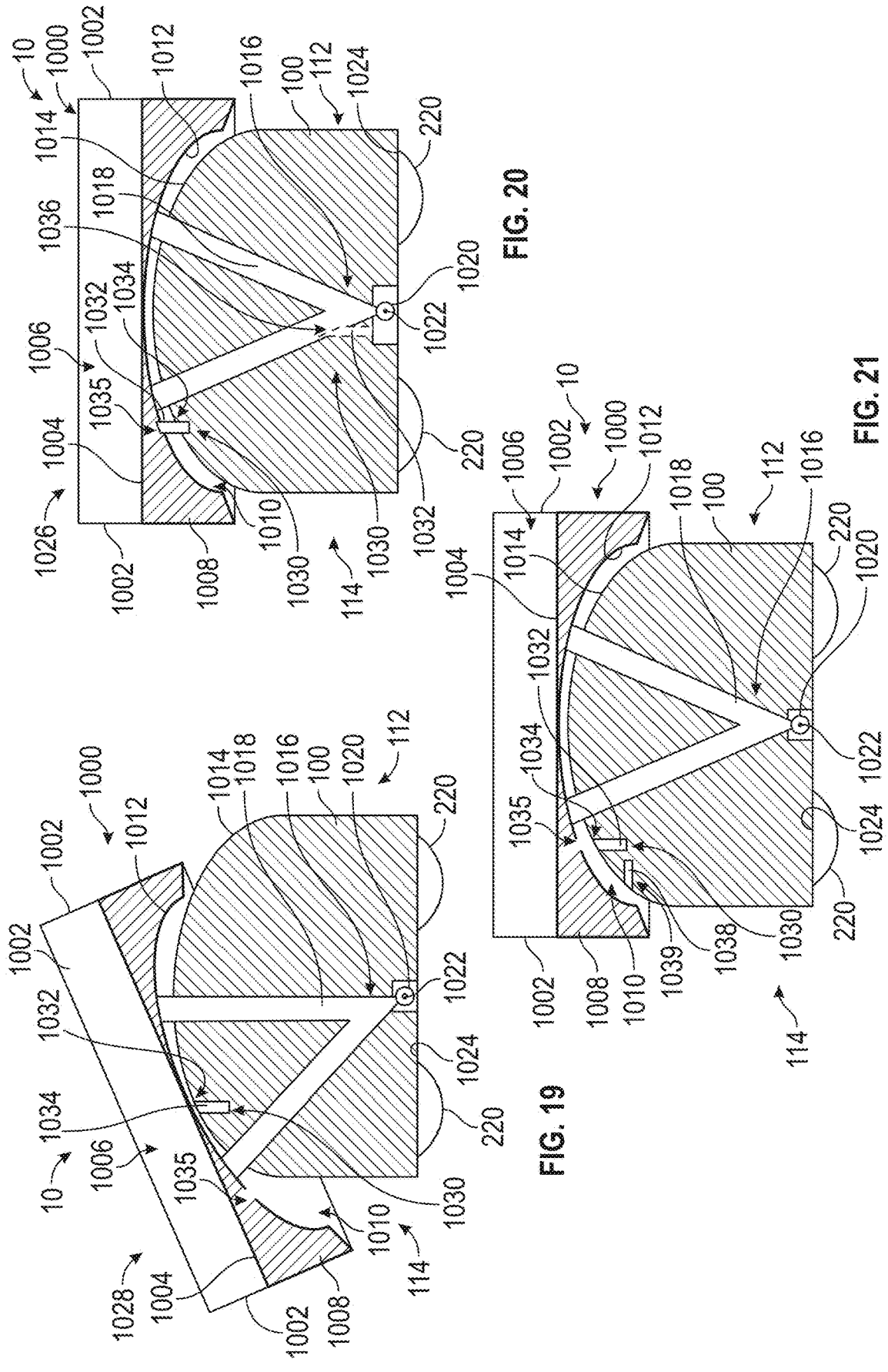
FIG. 19 is a side view of the AMR of FIG. 18 including a locking assembly in an unlocked position and with the second bed attachment in the dumping position, according to an exemplary embodiment.
FIG. 20 is a side view of the AMR of FIG. 19 with the locking assembly in a locked position and with the second bed attachment in the home position, according to an exemplary embodiment.
FIG. 21 is a side view of the AMR of FIG. 19 including a striker with the locking assembly in the unlocked position and with the second bed attachment in the home position, according to an exemplary embodiment.

As shown in FIGS. 19-21, the AMR 10 includes a locking assembly (e.g., pin assembly), shown as bed locking assembly 1030, including an engagement feature (e.g., pin, latch, clamp, hook, plunger, etc.), shown as locking pin 1032, configured to move between a locked position (shown in FIG. 20) and an unlocked position (shown in FIGS. 19 and 21) to transition the dump bed 1000 between a locked state (shown in FIG. 20) and an unlocked state (shown in FIGS. 19 and 21). In some embodiments, the locking pin 1032 is manually actuated (e.g., using a mechanical system such as a lever, a pedal, by an operator, etc.) to move between the locked position and the unlocked position. In other embodiments, the locking pin 1032 is actuated by an actuator, solenoid, or another motorized system to move between the locked position and the unlocked position. As shown in FIGS. 19-21, the frame assembly 100 defines a first opening, shown as pin aperture 1034, configured to receive the locking pin 1032, and the dump bed 1000 defines a second opening, shown as bed aperture 1035, configured to receive the locking pin 1032. In the locked position, the locking pin 1032 extends through the pin aperture 1034 and the bed aperture 1035 to retain the dump bed 1000 in the home position 1026. Accordingly, the locking pin 1032 is configured to engage with the bed aperture 1035 in dump bed frame 1008 to inhibit pivoting of the dump bed 1000. In the unlocked position, the locking pin 1032 retracts out of the bed aperture 1035 and into the pin aperture 1034 to permit pivoting of the dump bed 1000. Accordingly, in the unlocked position, the locking pin 1032 does not engage with the dump bed 1000 to inhibit pivoting thereof.

In some embodiments, as shown in FIG. 20, in addition or as an alternative to the locking pin 1032 engaging with the dump bed 1000 to selectively inhibit pivoting thereof, the pivot frame 1018 defines a third aperture, shown as frame aperture 1036, configured to receive the locking pin 1032. In the locked position, the locking pin 1032 extends through the frame aperture 1036 to retain the dump bed 1000 in the home position 1026. In some embodiments, the bed locking assembly 1030 includes one or more other locking mechanisms (e.g., an electromagnetic locking assembly) configured to selectively inhibit pivoting of the dump bed 1000. In some embodiments, the sensor system 400 is configured to monitor a position of the dump bed 1000 (e.g., whether the dump bed 1000 is in the home position 1026 or the dumping position 1028) and the AMR control system 600 is configured to move the locking pin 1032 based on the position of the dump bed 1000. By way of example, the AMR control system 600 may transmit a command to move the locking pin 1032 to the locked position in response to a determination that the dump bed 1000 is moved to the home position 1026.

As shown in FIG. 21, the AMR 10 includes a striker device (e.g., dumping initiation device, pin, actuator, etc.), shown as striker 1038, configured to selectively move within an opening, shown as striker aperture 1039, in the frame assembly 100 between an extended position and a retracted position. In some embodiments, the striker 1038 is actuated by an actuator, solenoid, or another motorized system, to move between the extended position and the retracted position. With the dump bed 1000 in the unlocked state (e.g., the locking pin 1032 in the unlocked position) and in the home position 1026, the striker 1038 is moved from the retracted position to the extended position to contact (e.g., hit, touch, tap, push, provide a force to, etc.) the dump bed 1000. The contact between the striker 1038 and the dump bed 1000 causes the dump bed 1000 to pivot from the home position 1026 to the dumping position 1028. In other words, the contact between the striker 1038 and the dump bed 1000 initiates the dumping (e.g., pivoting) sequence of the dump bed 1000. In some embodiments, the sensor system 400 is configured to monitor a position of the locking pin 1032 (e.g., whether the locking pin 1032 is in the locked position or the unlocked position) and the AMR control system 600 is configured to move the striker 1038 based on the position of the locking pin 1032. By way of example, the AMR control system 600 may transmit a command to move the striker 1038 to the extended position in response to a determination that the locking pin 1032 is moved from the locked position to the unlocked position. In such an example, (i) the locking pin 1032 may be moved to the unlocked position and (ii) the striker 1038 may be moved to the extended position to initiate the dumping sequence in response to a single input (e.g., from an operator to the wireless controller 700, the user interface 750, the operator device 2030, etc.).

In some embodiments, the AMR 10 does not include the striker 1038 and the dumping sequence of the dump bed 1000 is otherwise initiated. By way of example, with the dump bed 1000 in the unlocked state (e.g., the locking pin 1032 in the unlocked position) and in the home position 1026, an operator may contact (e.g., hit, touch, tap, push, provide a force to, etc.) the dump bed 1000 to cause the dump bed 1000 to pivot from the home position 1026 to the dumping position 1028. By way of another example, the cargo supported by the dump bed 1000 in the dump bed cavity 1006 may be positioned therein to bias the dump bed 1000 in a direction towards the dumping position 1028 such that when the locking pin 1032 is moved to the unlocked position, the weight of the cargo biases the dump bed 1000 to the dumping position 1028. By way of still another example, the pivot mount 1020 may be positioned offset from the longitudinal centerline between the front end 112 and the rear end 114 (e.g., the pivot mount 1020 may be positioned closer to the front end 112 than the rear end 114) such that the pivot frame 1018 and the dump bed 1000 coupled therewith are biased to pivot to the dumping position 1028 when the locking pin 1032 is moved to the unlocked position.

Figure 22:
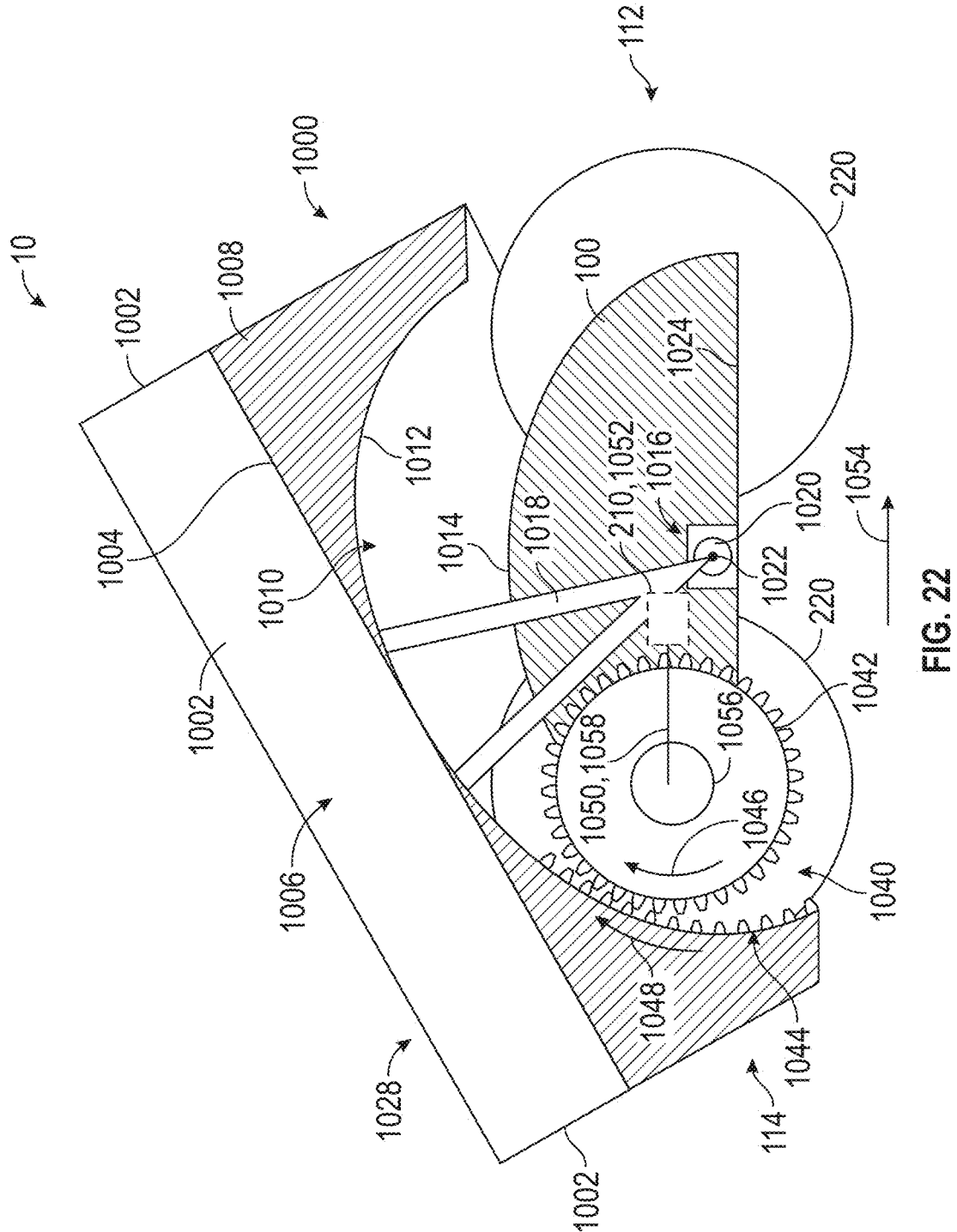
FIG. 22 is a side view of the AMR of FIG. 18 including a bed return assembly and with the second bed attachment of in the dumping position, according to an exemplary embodiment.
Figure 23:
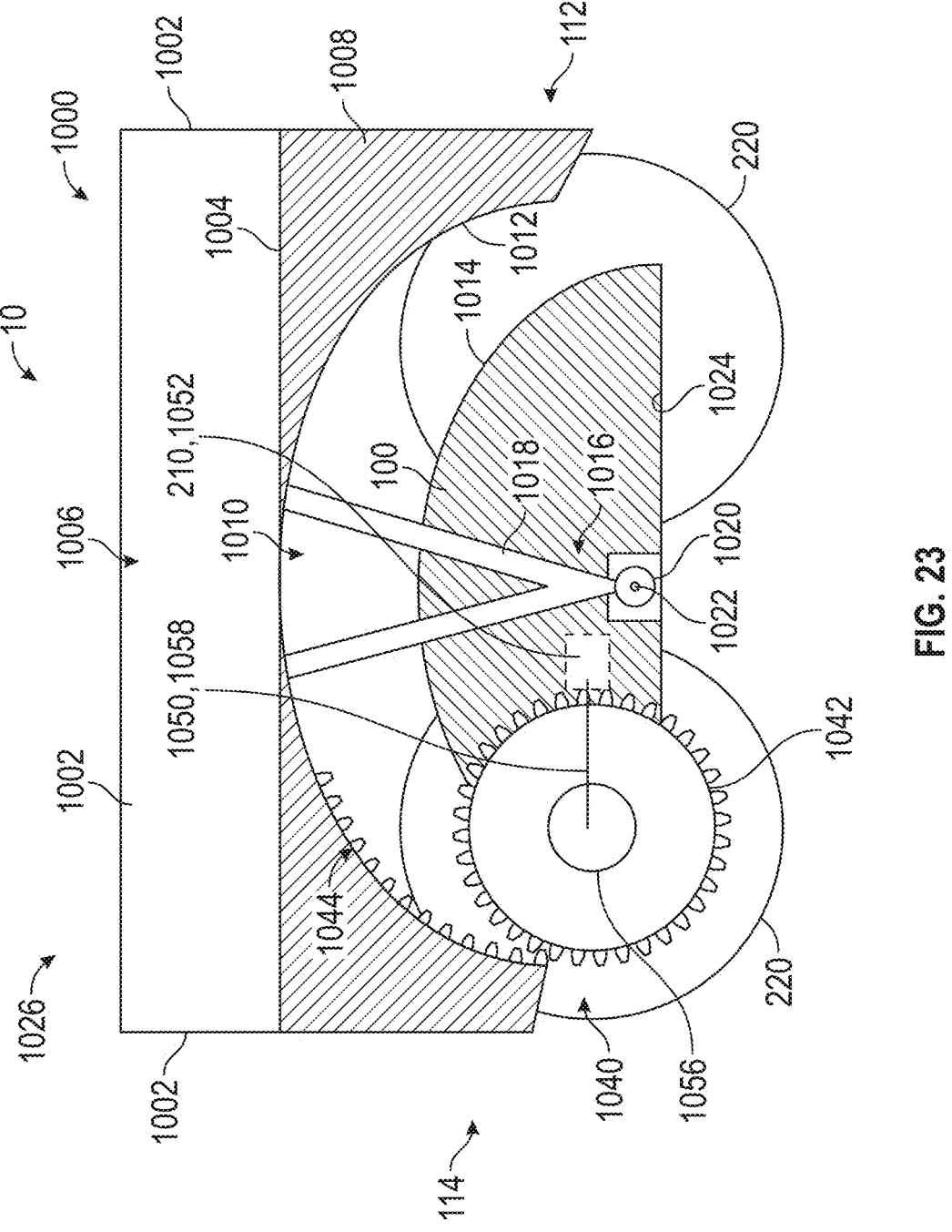
FIG. 23 is a side view of the AMR of FIG. 22 with the second bed attachment in the home position, according to an exemplary embodiment.

As shown in FIGS. 22-29, the AMR 10 includes a return assembly, shown as dump bed return assembly 1040, configured to move the dump bed 1000 from the dumping position 1028 to the home position 1026. As shown in FIGS. 22-28, the dump bed return assembly 1040 includes a first gear, shown as gear 1042, including first gear teeth. As shown in FIGS. 22, 23, and 25-27, the dump bed 1000 includes a rack, shown as bed rack 1044, including second teeth configured to engage (e.g., mesh) with the first gear teeth of the gear 1042. The bed rack 1044 extends along the bed bottom surface 1012 and follows the curvature thereof. The bed rack 1044 is positioned such that the gear 1042 may engage with the bed rack 1044 when the dump bed 1000 is in the home position 1026 and/or the dumping position 1028. As shown in FIG. 22, the gear 1042 is configured to rotate in a first direction, shown as direction 1046, to cause the dump bed 1000 to pivot from the dumping position 1028 to the home position 1026 in a second direction, shown as direction 1048 (e.g., a direction in which the dump bed 1000 follows the curved path along the curved profile of the frame top surface 1014). In other words, the rotation of the gear 1042 and the engagement between the gear 1042 and the bed rack 1044 causes the dump bed 1000 to pivot from the dumping position 1028 to the home position 1026.

As shown in FIGS. 22, 23, and 25-27, the AMR 10 includes an axle, shown as drive axle 1050, coupled between the wheels 220 and the hub motors 210 and configured to provide rotational energy from the hub motors 210 to the wheels 220 to drive the wheels 220. The gear 1042 is received by the drive axle 1050 and is configured to rotate with the wheels 220 (and the drive axle 1050) in response to the wheels 220 being driven by the hub motors 210. In some embodiments, each of the wheels 220 and the hub motors 210 are connected via a drive axle 1050 and include a respective gear 1042 associated therewith that engages with a respective bed rack 1044. In some embodiments, only a subset of the wheels and the hub motors 210 are associated with a respective gear 1042 that engages with a respective bed rack 1044 (e.g., one at the front end 112 and one at the rear end 114, two at the front end 112 and none at the rear end 114, two at the rear end 114 and none at the front end 112, etc.).

According to an exemplary embodiment shown in FIGS. 22, 23, 25, and 26, the AMR 10 includes a second motor (e.g., an electric motor), shown as bed motor 1052, configured to translate the gear 1042 along the drive axle 1050 between (i) a first position (shown in FIG. 25) in which the gear 1042 is engaged with the bed rack 1044 and (ii) a second position (shown in FIG. 26) in which the gear 1042 is disengaged from the bed rack 1044 (e.g., as a Bendix drive system). In such embodiments, the gear 1042 may be coupled with the drive axle 1050 such that the gear 1042 (*i*) rotates with the drive axle 1050 (e.g., when the drive axle 1050 is driven) and (ii) is configured to translate along the drive axle 1050. By way of example, the drive axle 1050 may be splined (e.g., may include external splines) and the gear 1042 may be splined (e.g., may include internal splines) such that the external splines mesh with the internal splines to (i) rotate the gear 1042 in response to rotation of the drive axle 1050 and (ii) permit translation of the gear 1042 along the splined portion of the drive axle 1050. In embodiments where the gear 1042 is selectively engageable with the bed rack 1044 by translating the gear 1042 along the drive axle 1050, the bed motor 1052 moves the gear 1042 to be engaged with the bed rack 1044, and in response to propelling the AMR 10 (e.g., in response to the hub motors 210 driving the drive axles 1050 and the wheels 220), the dump bed 1000 pivots from the dumping position 1028 to the home position 1026. In other words, in such embodiments, when the gear 1042 is engaged with the bed rack 1044 and the AMR 10 is driven in a third direction, shown as travel direction 1054, the rotation of the gear 1042 and the engagement between the gear 1042 and the bed rack 1044 causes the dump bed 1000 to pivot from the dumping position 1028 to the home position 1026. The bed motor 1052 may then be controlled to disengage the gear 1042 from the bed rack 1044 when the dump bed 1000 reaches the home position 1026 to permit continued driving of the AMR 10 in the travel direction 1054.

According to an exemplary embodiment shown in FIGS. 22-24 and 27, the dump bed return assembly 1040 includes a first clutch, shown as first gear clutch 1056, coaxial with and received within the gear 1042. In other words, the gear 1042 is a clutched gear such that the gear 1042 annularly surrounds the first gear clutch 1056. The first gear clutch 1056 and the gear 1042 are configured to be received on the drive axle 1050 such that the first gear clutch 1056 is disposed radially between the gear 1042 and the drive axle 1050. The first gear clutch 1056 is configured to selectively engage and disengage to selectively provide rotational energy from the drive axle 1050 to the gear 1042. When the first gear clutch 1056 is disengaged, the first gear clutch 1056 decouples the gear 1042 from the drive axle 1050 such that in response to the drive axle 1050 being driven (e.g., rotated) by the hub motors 210, the gear 1042 does not rotate with the drive axle 1050. When the first gear clutch 1056 is engaged, the first gear clutch 1056 couples the gear 1042 with the drive axle 1050 such that in response to the drive axle 1050 being driven (e.g., rotated) by the hub motors 210, the gear 1042 rotates with the drive axle 1050. As such, engaging the first gear clutch 1056 and driving the AMR 10 in the travel direction 1054 rotates the gear 1042, and the engagement between the gear 1042 and the bed rack 1044 causes the dump bed 1000 to pivot from the dumping position 1028 to the home position 1026. The first gear clutch 1056 is configured to selectively engage the gear 1042 with the hub motors 210 and thereby enables a constant mesh arrangement between the gear 1042 and the bed rack 1044. In embodiments where the gear 1042 is selectively engageable with the bed rack 1044 by sliding the gear 1042 along the drive axle 1050, the dump bed return assembly 1040 may not include the first gear clutch 1056.

Figure 24:
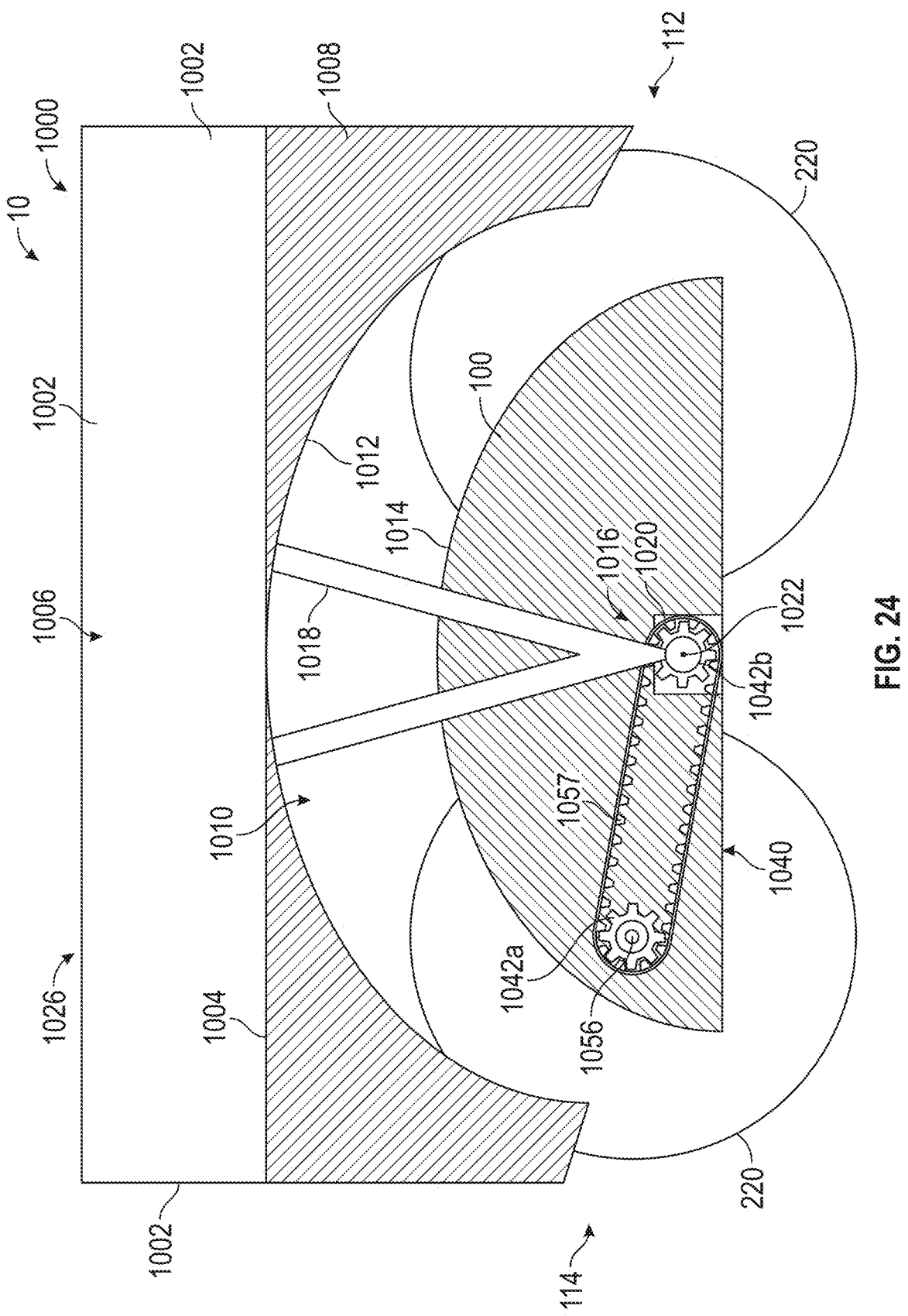
FIG. 24 is a side view of the AMR of FIG. 17 including a bed return assembly and with the second bed attachment in the home position, according to an exemplary embodiment.
Figures 25, 26:
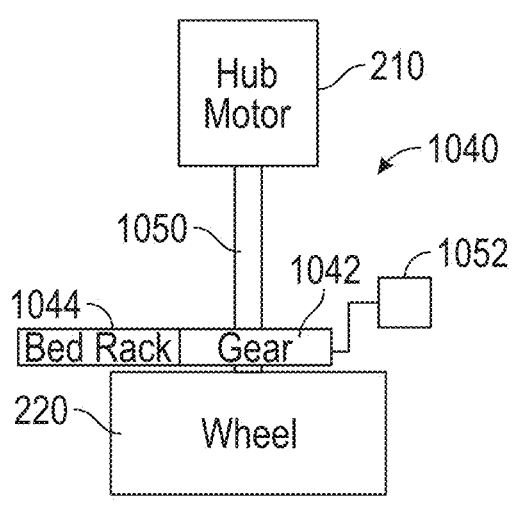
FIG. 25 is a schematic block diagram of a bed return assembly including a gear engaged with a bed rack of the second bed attachment of FIG. 17, according to an exemplary embodiment.
FIG. 26 is a schematic block diagram of the bed return assembly of FIG. 25 including the gear disengaged from the bed rack of the second bed attachment, according to an exemplary embodiment.
Figure 27:
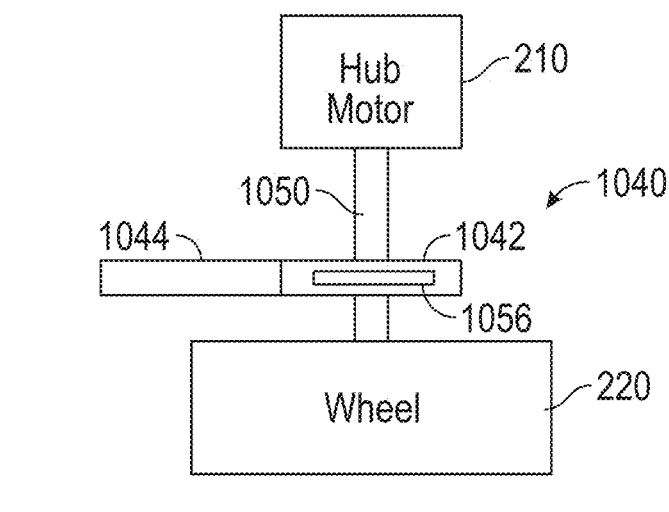
FIG. 27 is a schematic block diagram of a bed return assembly including a gear engaged with a bed rack of the second bed attachment of FIG. 17 and a clutch disposed between the gear and a drive shaft, according to an exemplary embodiment.

As shown in FIG. 24, the dump bed return assembly 1040 includes the gear 1042 configured as a first gear 1042a, a second gear 1042b coupled with the bed pivot assembly 1016, and a belt (e.g., a toothed belt, a cog belt, a chain belt, etc.), shown as drive belt 1057, engaged (e.g., meshed) with the first gear 1042a and the second gear 1042b. In such an embodiment, the dump bed return assembly 1040 may include the first gear clutch 1056 coupled with the first gear 1042a and configured to selectively engage and disengage to selectively provide rotational energy from the drive axle 1050 to the first gear 1042a. The second gear 1042b is coupled with the bed pivot assembly 1016 (e.g., fixedly coupled with the pivot frame 1018) such that rotation of the second gear 1042b causes the pivot frame 1018 and the dump bed 1000 coupled therewith to pivot. When the first gear clutch 1056 is disengaged, the first gear clutch 1056 decouples the first gear 1042a from the drive axle 1050 such that in response to the drive axle 1050 being driven (e.g., rotated) by the hub motors 210, the first gear 1042a does not rotate with the drive axle 1050. When the first gear clutch 1056 is engaged, the first gear clutch 1056 couples the first gear 1042a with the drive axle 1050 such that in response to the drive axle 1050 being driven (e.g., rotated) by the hub motors 210, the first gear 1042a rotates with the drive axle 1050. The engagement between the drive belt 1057 and the first gear 1042a causes the drive belt 1057 to rotate, and the engagement between the drive belt 1057 and the second gear 1042b causes the second gear 1042b to rotate. As such, engaging the first gear clutch 1056 and driving the AMR 10 in the travel direction 1054 rotates the first gear 1042a, and (i) the engagement between the first gear 1042a and the drive belt 1057 and (ii) the engagement between the drive belt 1057 and the second gear 1042b causes the pivot frame 1018 to pivot and the dump bed 1000 to pivot from the dumping position 1028 to the home position 1026. In such embodiments, the dump bed 1000 may not include the bed rack 1044.

Figure 28:
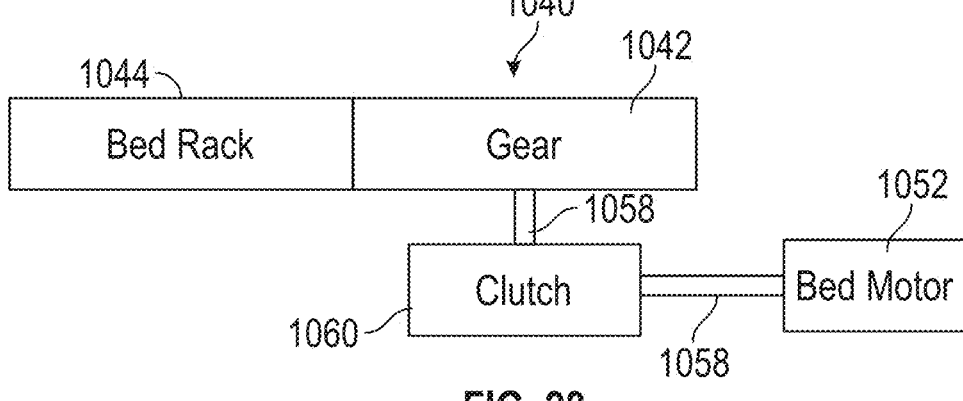
FIG. 28 is a schematic block diagram of a bed return assembly including a gear engaged with a bed rack of the second bed attachment of FIG. 17, a bed motor, and a clutch positioned between the gear and the bed motor, according to an exemplary embodiment.

As shown in FIGS. 22 and 28, the dump bed return assembly 1040 includes the bed motor 1052, an axle, shown as gear axle 1058, coupled between the bed motor 1052 and the gear 1042 and configured to receive rotational energy from the bed motor 1052 and transfer the rotational energy to the gear 1042, and a second clutch, shown as second gear clutch 1060, positioned along the gear axle 1058. The second gear clutch 1060 is configured to selectively engage the gear 1042 with the bed motor 1052. When the second gear clutch 1060 is disengaged, the second gear clutch 1060 decouples the gear 1042 from the bed motor 1052 such that in response to the gear axle 1058 being driven (e.g., rotated) by the bed motor 1052, the gear 1042 does not rotate with the gear axle 1058. When the second gear clutch 1060 is engaged, the second gear clutch 1060 couples the gear 1042 with the bed motor 1052 such that in response to the gear axle 1058 being driven (e.g., rotated) by the bed motor 1052, the gear 1042 rotates with the gear axle 1058. The second gear clutch 1060 is configured to selectively engage the gear 1042 with the bed motor 1052 and thereby enables (i) a constant mesh arrangement between the gear 1042 and the bed rack 1044 and (ii) driving the gear 1042 to move the dump bed 1000 independently of the operation of the hub motors 210 (e.g., to pivot the dump bed 1000 regardless of whether the AMR 10 is traveling). In some embodiments, the dump bed return assembly 1040 does not include the second gear clutch 1060 such that the gear 1042 is driven in response to the bed motor 1052 driving the gear axle 1058.

Figure 29:
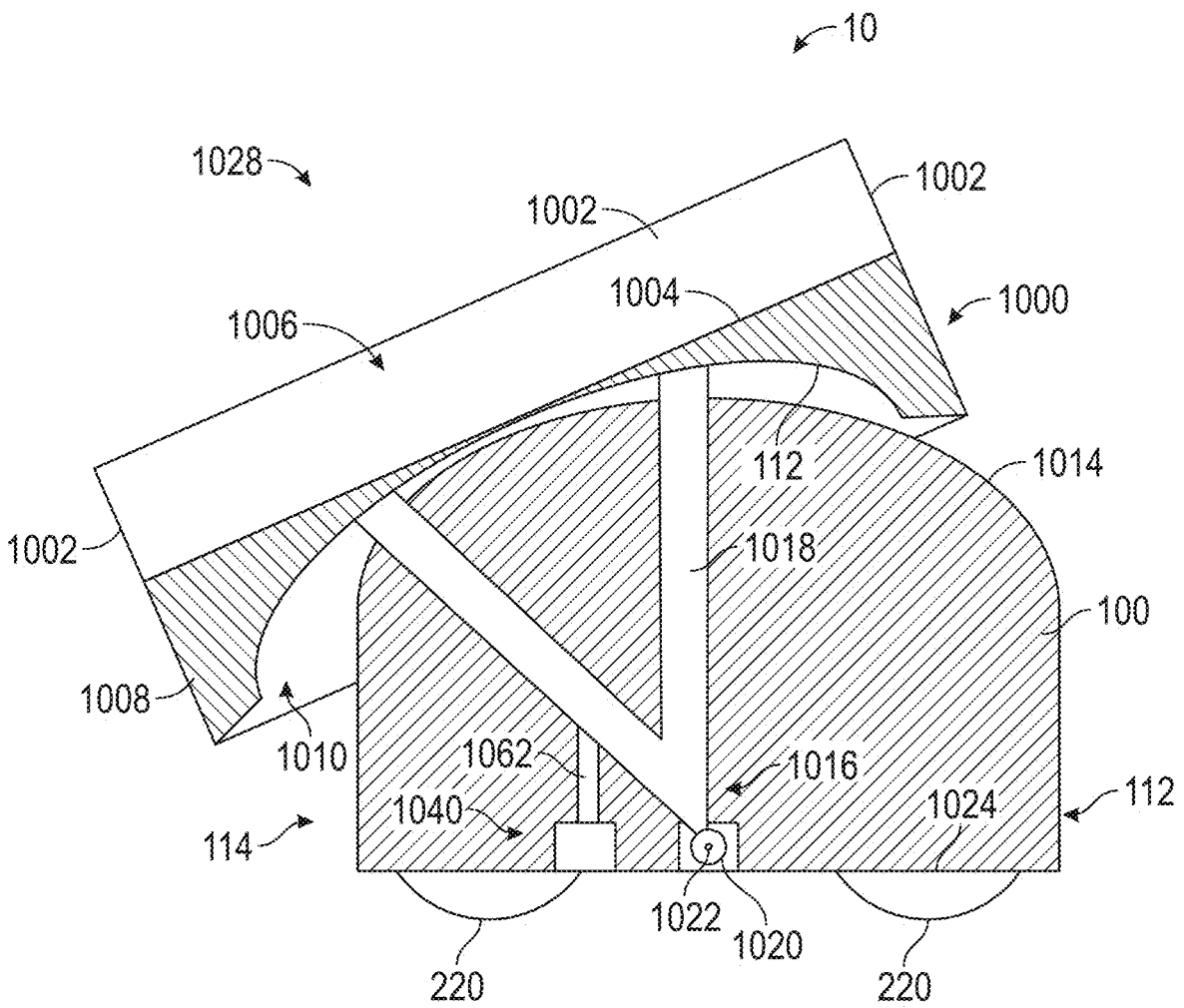
FIG. 29 is side view of the AMR of FIG. 17 including a bed return assembly with an actuator engaged with the second bed attachment, according to an exemplary embodiment.

As shown in FIG. 29, the dump bed return assembly 1040 includes an actuator (e.g., electric actuator, hydraulic actuator, pneumatic actuator, etc.), shown as bed actuator 1062, coupled between the frame assembly 100 and the pivot frame 1018. The bed actuator 1062 is configured to actuate from a retracted position (shown in FIG. 29) to an extended position to pivot the dump bed 1000 from the dumping position 1028 to the home position 1026. In some embodiments, the bed actuator 1062 is only used to pivot the dump bed 1000 from the dumping position 1028 to the home position 1026 (e.g., and not from the home position 1026 to the dumping position 1028). In such embodiments, because the bed actuator 1062 is not used to pivot the dump bed 1000 from the home position 1026 to the dumping position 1028 (or lift a dump bed of other dumping vehicles) when the dump bed 1000 is supporting heavy cargo, and is instead only used to return the dump bed 1000 from the dumping position 1028 to the home position 1026, a bed actuator 1062 with a smaller capacity may be used. In other words, an actuator with a first capacity may be needed to lift a dump bed of another dumping system to initiate a dumping sequence, and the bed actuator 1062 with a second capacity less than the first capacity may be used to return the dump bed 1000 from the dumping position 1028 to the home position 1026 because the bed actuator 1062 is not used to (i) pivot the dump bed 1000 from the home position 1026 to the dumping position 1028, or (ii) lift the dump bed 1000 (like in other dumping systems).

While the dump bed return assemblies 1040 shown in FIGS. 22-29 have been described herein as being used to return the dump bed 1000 from the dumping position 1028 to the home position 1026, in some embodiments, such dump bed return assemblies 1040 may be used to provide controlled dumping from the home position 1026 to the dumping position 1028 (e.g., by driving in a direction opposite to the travel direction 1054 with the first gear clutch 1056 engaged, by driving in a direction opposite to the travel direction 1054 with the gear 1042 in engagement with the bed rack 1044, by driving the gear 1042 in an opposing direction with the bed motor 1052, by operating the bed actuator 1062 to dump the dump bed 1000, etc.).

Figure 30:
FIG. 30 is a perspective view of the AMR of FIG. 18 including a coupler and with the second bed attachment in a dumping position, and a vehicle including a receiver, according to an exemplary embodiment.

As shown in FIG. 30, the AMR 10 includes coupling interface (e.g., trailer engagement feature, kingpin, the hitch receiver 190, the attachment interface 360, etc.), shown as coupler 1064, coupled to the frame top surface 1014, and centered along the longitudinal axis 110. The coupler 1064 may be positioned such that access to the coupler 1064 is permitted when the dump bed 1000 is in the dumping position 1028 and inhibited when the dump bed 1000 is in the home position 1026. According to an exemplary embodiment, in the dumping position 1028, the coupler 1064 is accessible and the receiver 1068 can freely engage with the coupler 1064 to couple the vehicle 1066 (or some other attachment) to the AMR 10. In the home position 1026, access to the coupler 1064 is inhibited and the receiver 1068 is unable to engage with the coupler 1064 to couple the vehicle 1066 (or some other attachment) to the AMR 10. Once connected, the dump bed 1000 may return to the home position 1026 to secure the connection between the coupler 1064 and the receiver 1068. The coupler 1064 may be configured to facilitate selectively coupling a vehicle, shown as vehicle 1066, to the AMR 10. As shown in FIG. 30, the vehicle 1066 includes a fifth wheel, shown as receiver 1068, coupled to a rear end portion of a chassis of the vehicle 1066. The receiver 1068 is configured to receive the coupler 1064 to couple the AMR 10 with the vehicle 1066. The coupler 1064 can rotate within the receiver 1068 such that the AMR 10 and the vehicle 1066 pivot relative to each other and remain coupled together when the vehicle 1066 travels (e.g., when the vehicle 1066 travels along a road, when the vehicle 1066 turns, when the vehicle 1066 reverses, etc.).

In some embodiments, the receiver 1068 is coupled to a towable or pushable attachment (e.g., one or more of the attachments 800 described herein) that interfaces with the coupler 1064 to be pushed or pulled (i.e., towed) by the AMR 10. By way of example, the towable or pushable attachment may be or include a rake attachment, a ball picker attachment, a mower attachment, a trailer attachment, a dew sweeper attachment, a club carrier attachment, a sprayer attachment, a vending unit attachment, an entertainment assembly attachment, a rider platform attachment, a post digger attachment, and/or still other towable or pushable attachments. In some embodiments, the coupler 1064 and/or the receiver 1068 are other types of coupling interfaces.

Figure 31:
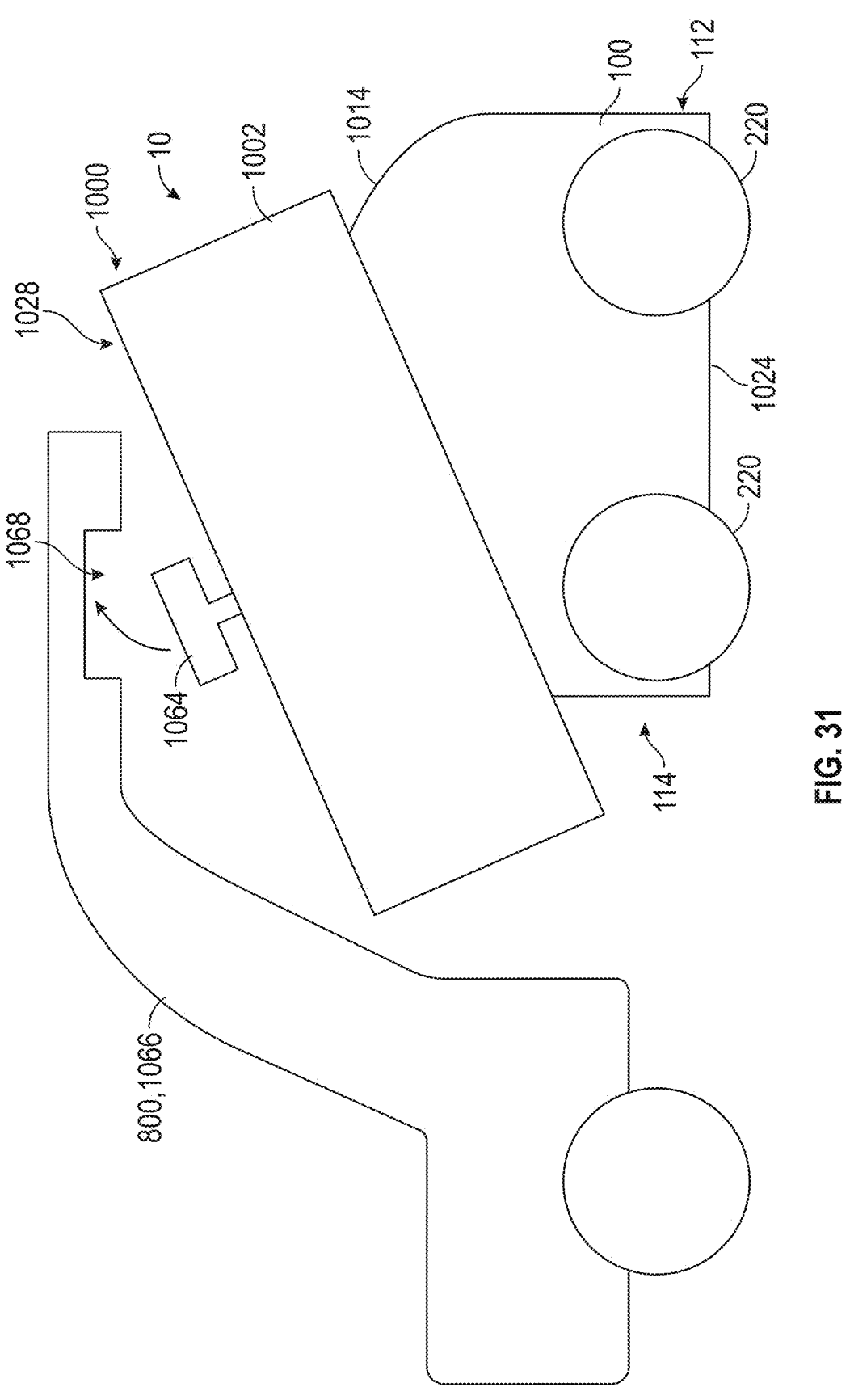
FIG. 31 is a side view of the AMR of FIG. 18 including a coupler and with the second bed attachment in the dumping position, and a receiver, according to an exemplary embodiment.

As shown in FIG. 31, the coupler 1064 is positioned along a top surface of the dump bed 1000 and moves with the dump bed 1000 as the dump bed 1000 moves between the home position 1026 and the dumping position 1028. As shown in FIG. 31, the dump bed 1000 is in the dumping position 1028 and the attachment 800 is positioned to position the receiver 1068 vertically above the AMR 10. The attachment 800 may be positioned such that as the dump bed 1000 pivots from the dumping position 1028 to the home position 1026, the coupler 1064 is received by the receiver 1068. In some embodiments, the receiver 1068 is positioned at a vertical height lower than the coupler 1064 when the dump bed 1000 is in the home position 1026. In such embodiments, as the dump bed 1000 pivots from the dumping position 1028 to the home position 1026 and the coupler 1064 is received by the receiver 1068, the coupler 1064 may provide an upward force (e.g., a lifting force) on the attachment 800. The coupling between the coupler 1064 and the receiver 1068 and the upward force applied to the attachment 800 may enable the attachment 800 to be towed or pushed by the AMR 10.

Figure 32:
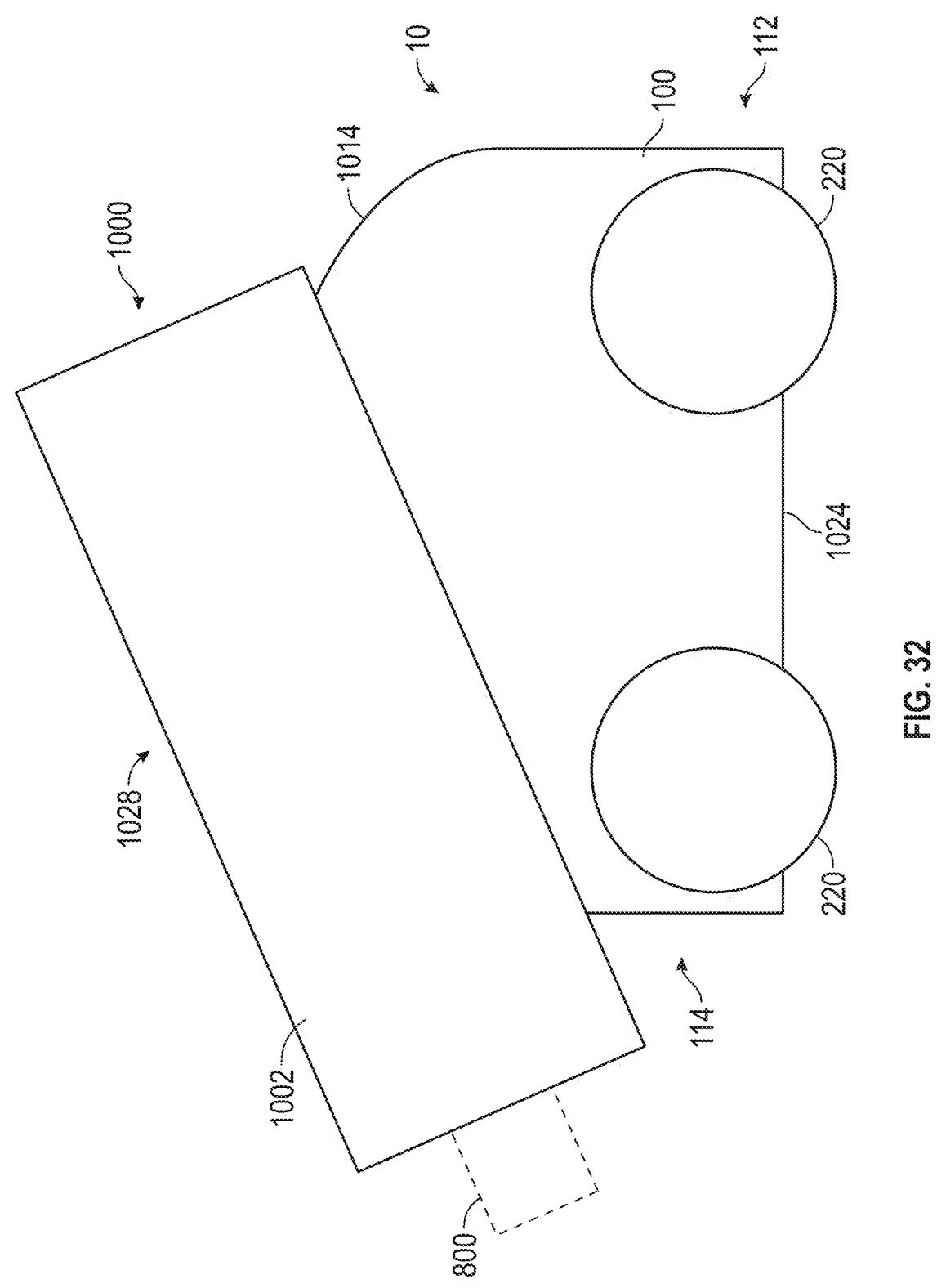
FIG. 32 is a side view of the AMR of FIG. 18 with the dump bed 17 in the dumping position and an attachment or implement coupled thereto, according to an exemplary embodiment.

As shown in FIG. 32, one or more of the attachments 800 are configured to couple to the dump bed 1000 along one or more of the sidewalls 1002 thereof. In some embodiments, the dump bed 1000 includes the hitch receiver 190 and/or the attachment interface 360 along one or more of the sidewalls 1002 to facilitate coupling the attachments 800 thereto. In some embodiments, the attachments 800 are coupled to the dump bed 1000 or the frame assembly 100 using the coupler 1064 as described above with reference to FIGS. 30 and 31. As shown in FIG. 32, the attachment 800 is coupled to the dump bed 1000 such that the attachment 800 moves with the dump bed 1000 as the dump bed 1000 pivots between the home position 1026 and the dumping position 1028. In some embodiments, the attachment 800 coupled to the dump bed 1000 is a trenching or post hole digging device configured to facilitate removing (e.g., by raising and lowing the attachment 800) soil (e.g., dirt, grass, sand, etc.) to create a trench or a post hole in the ground. In such embodiments, the raising and lowing of the trenching or post hole digging device may be controlled by pivoting the dump bed 1000 between the home position 1026 and the dumping position 1028. In other embodiments, the attachment 800 is or includes another type of attachment, implement, end effector, etc., configured to couple to and move with the dump bed 1000.

Rider Platform Attachment and Wireless Controller

As shown in FIGS. 33-40, the attachment 800 of the AMR 10 includes or is configured as a riding platform or support attachment, shown as platform assembly 1110. According to an exemplary embodiment, the platform assembly 1110 is removably, or selectively, coupled to the frame assembly 100 of the AMR 10 and may be used in combination with the modular platform attachment 802, the bed attachment 900, the dump bed 1000, and/or other attachments described herein. In some embodiments, the platform assembly 1110 is configured to replace the hoop bar 180. In such embodiments, the components coupled to the hoop bar 180 (e.g., the GPS antenna 450, the Wi-Fi antenna 460, the beacon light 510, etc.) may be coupled to the platform assembly 1110. In some embodiments, the platform assembly 1100 is configured to coupled to another portion of the AMR 10 such that the AMR 10 include both the platform assembly 1110 and the hoop bar 180.

According to an exemplary embodiment, the platform assembly 1110 is configured to support and/or provide a riding area on the AMR 10 for a passenger or operator. As shown in FIGS. 33-35 and 37-40, the platform assembly 1110 is configured to be positioned outside of, and adjacent to, the bed attachment 900. As shown in FIG. 36, the platform assembly 1110 is additionally or alternatively configured to be positioned in the bed cavity 950 of the bed attachment 900. The platform assembly 1110 may be configured to be easily and quickly released from the AMR 10. For example, an operator can unbolt, unclip, or disengage an attachment mechanism of the platform assembly 1110 from a portion of the AMR 10, such as the hitch receiver 190, when using the AMR 10 in an autonomous or remote control mode. The removability of the platform assembly 1110 minimizes wear on the platform assembly 1110 when an operator or user is not riding on the AMR 10. In some embodiments, the platform assembly 1110 may be foldable or collapsable such that the platform assembly 1110 can be easily stored (e.g., in the bed cavity 950). In other embodiments, the platform assembly 1110 may be foldable or collapsable for storage while attached to the AMR 10 such that the platform assembly 1110 does not protrude outward form the AMR 10 while not in use (e.g., no rider onboard, etc.). In some embodiments, the frame assembly 100 and/or the bed attachment 900 define a cavity or storage area for the platform assembly 1110 to be stored on board the AMR 10.

As shown in FIGS. 33-40, the platform assembly 1110 includes a base (e.g., a ledge, support, etc.), shown as platform 1112. The platform 1112 may be removably coupled to the frame assembly 100 via a securing mechanism, such as a bolt, a hitch assembly, or other mechanism. According to the exemplary embodiment shown in FIGS. 33-35 and 36-40, the platform 1112 is a flat, rectangular-like support that extends outward from (e.g., substantially perpendicular to, etc.) a side (e.g., the rear end 114, etc.) of the frame assembly 100. In other embodiments, the platform 1112 is otherwise shaped (e.g., semi-circular, etc.). As shown in FIGS. 33-37, 39, and 40, the platform 1112 defines an operator area, shown as occupant riding area 1113. For example, a rider, such as an operator of the AMR 10 may stand on top of the platform 1112 in the occupant riding area 1113 positioned at the rear end 114 of the AMR 10 and can operate, or drive, the AMR 10 from the rear end 114 of the AMR 10. In some embodiments, the platform 1112 is foldably coupled to the frame assembly 100 (e.g., via a hinge coupling mechanism, etc.). In such embodiments, the platform 1112 may folded such that the platform 1112 is flush with or parallel to the frame assembly 100 and/or the bed attachment 900 when stored.

As shown in FIGS. 33-40, the platform assembly 1110 includes a frame, shown as frame assembly 1114, coupled to (e.g., screwed, bolted onto, pivotably coupled to, etc.) the platform 1112. The frame assembly 1114 extends upward, substantially perpendicular to, the platform 1112 and is configured to provide support to the rider and/or operator of the AMR 10 within the occupant riding area 1113.

Figure 33:
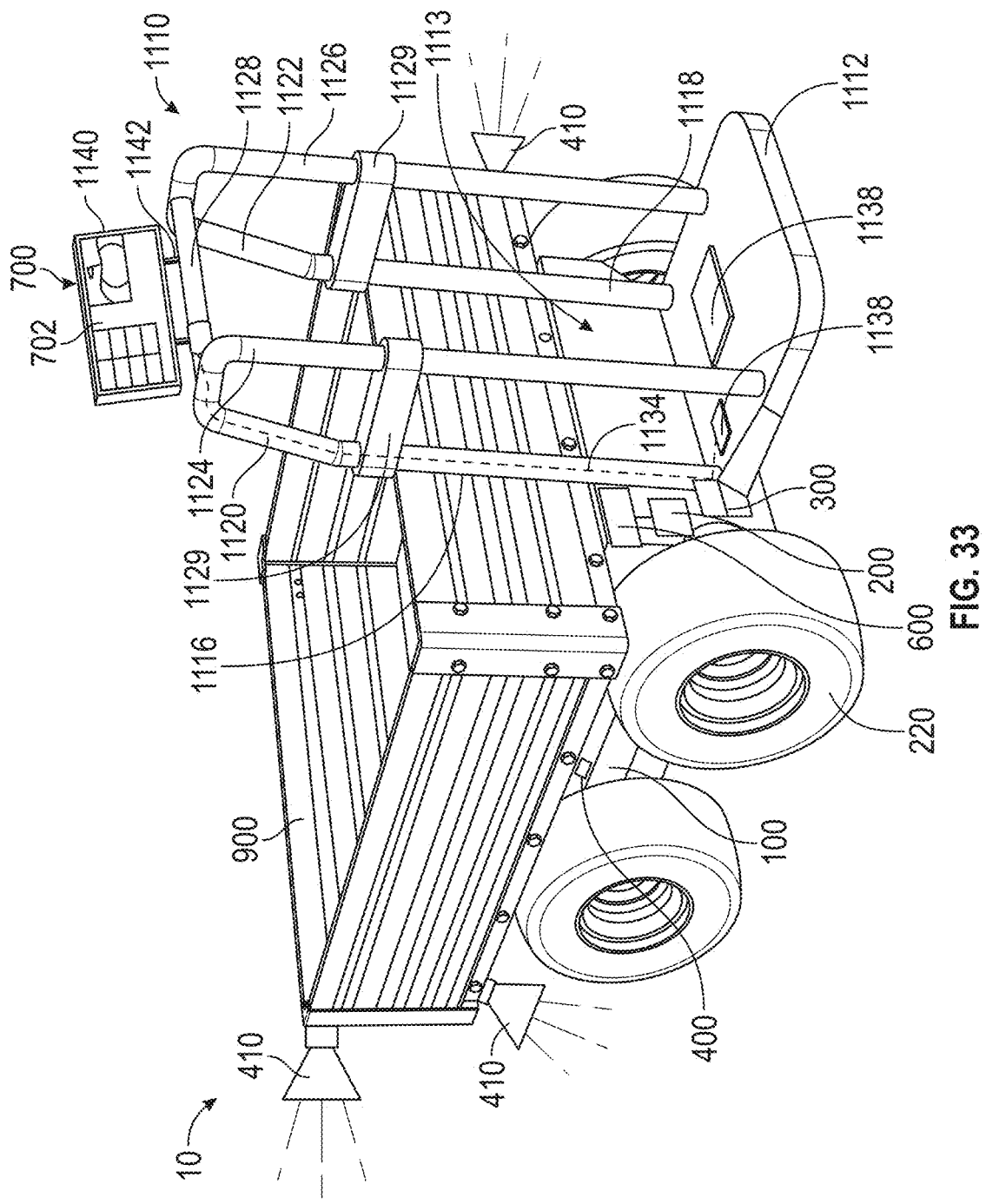
FIG. 33 is a rear perspective view of the AMR of FIG. 13 including a platform assembly, according to an exemplary embodiment.
Figure 34:
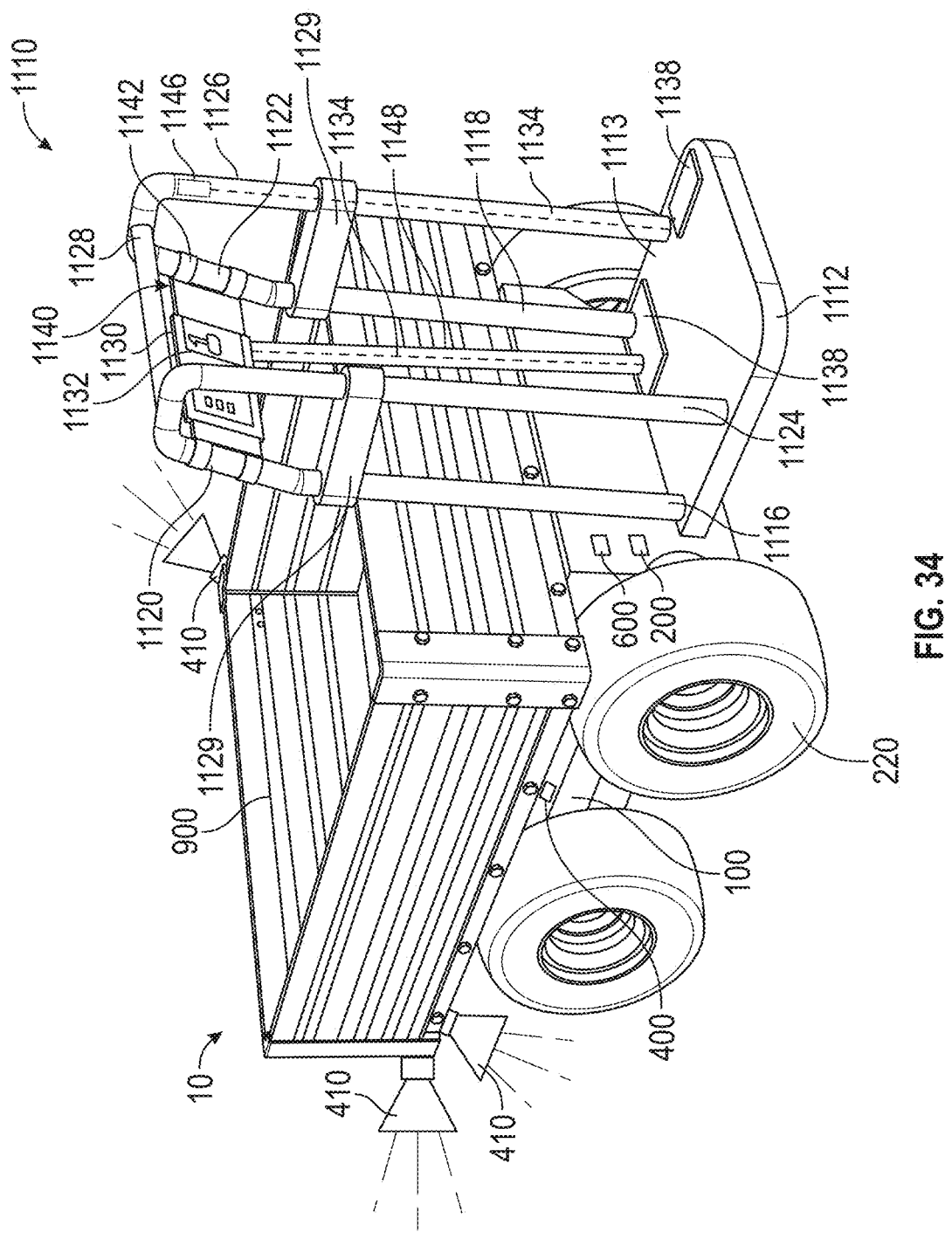
FIG. 34 is a rear perspective view of the AMR of FIG. 33, according to another exemplary embodiment.
Figure 35:
FIG. 35 is a side view of the AMR of FIG. 33, according to another exemplary embodiment.
Figure 36:
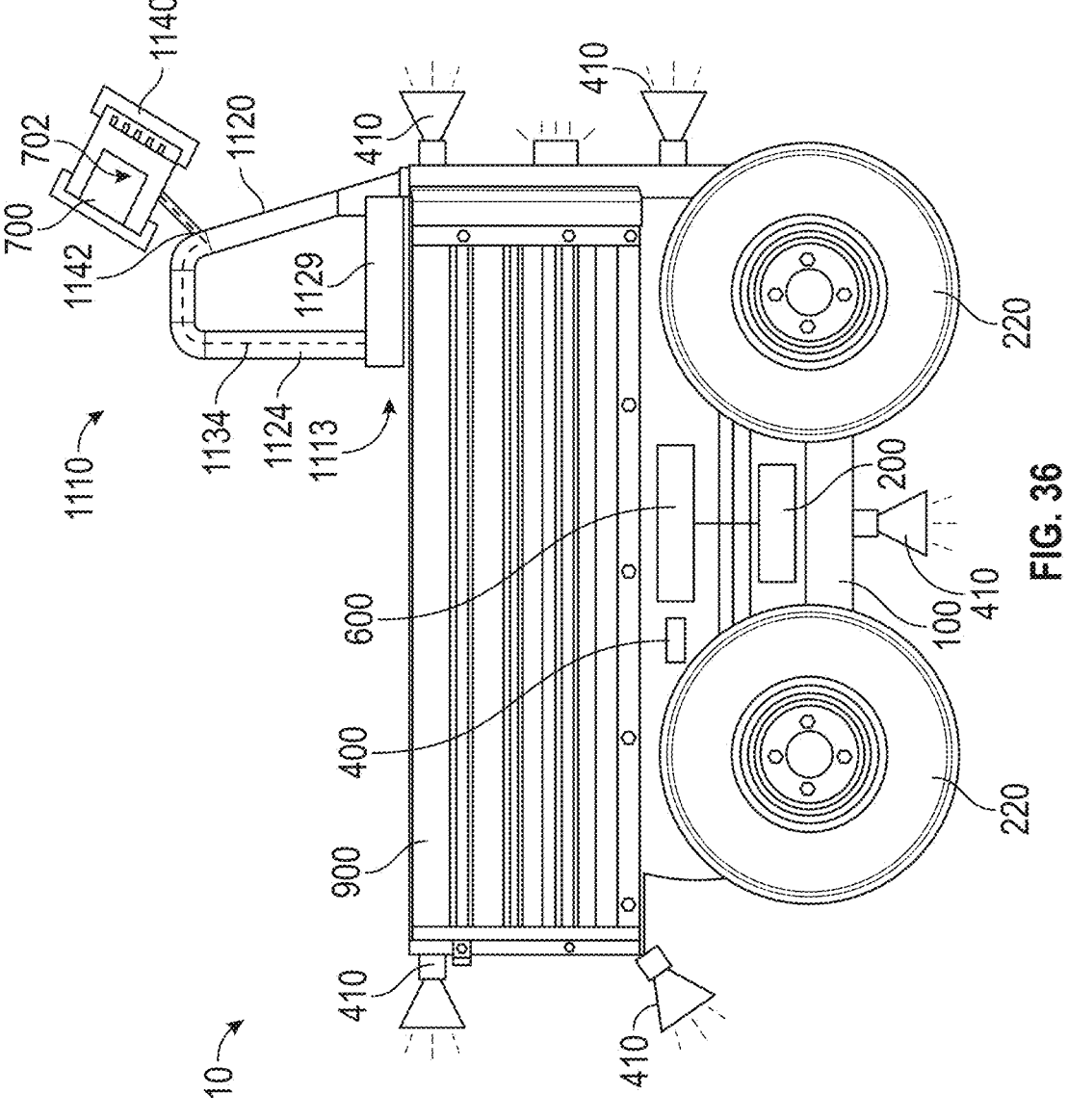
FIG. 36 is a side view of the AMR of FIG. 33, according to another exemplary embodiment.

As shown in FIGS. 33-35, the frame assembly 1114 includes a plurality of first supports, shown as first supports 1116 and 1118, that are positioned against or proximate the frame assembly 100 and the bed attachment 900. As shown in FIGS. 33-35, the first supports 1116 and 1118 include curved portions, shown as bent portions 1120 and 1122, that extend at an angle (e.g., thirty degrees, forty degrees, etc.) away from the bed attachment 900. For example, the bent portions 1120 and 1122 may extend outward and away from the bed attachment 900 such that the area above the bed attachment 900 is unobstructed allowing the contents, like debris, to extend past an upper edge of the bed attachment 900. As shown in FIG. 36, the bent portion 1120 (and the bent portion 1122) extend inward above the bed attachment 900. As shown in FIGS. 33-35 and 39, the frame assembly 1114 includes a plurality of second supports, shown as second supports 1124 and 1126, that are coupled to the platform 1112 and positioned a distance rearward from the first supports 1116 and 1118. The second supports 1124 and 1126 are substantially straight and extend upwards from the platform 1112 and are coupled to the bent portions 1120 and 1122.

As shown in FIGS. 33, 34, and 39, the frame assembly 1114 includes a cross-bar, shown as handle 1128, positioned proximate a top of the bent portions 1120 and 1122. The handle 1128 extends between the bent portions 1120 and 1122, across the occupant riding area 1113. In other embodiments, the handle 1128 extends between the first supports 1116 and 1118 beneath the bent portions 1120 and 1122. According to an exemplary embodiment, the handle 1128 is configured to provide support for the operator and/or passenger to hold onto the frame assembly 1114 while riding on the AMR 10. In some embodiments, the frame assembly 1114 includes panels that enclose one or more sides of the occupant riding area 1113. For example, a first panel may extend between the first support 1116 and the second supports 1124, a second panel may extend between the first support 1118 and the second supports 1126, a third panel may extend between the first supports 1116 and 1118 adjacent to the bed attachment 900, and/or a fourth panel may extend between the second supports 1124 and 1126. The fourth panel may be of function like a gate or door and may be pivotably coupled to one of the second supports 1124 and 1126. In yet another embodiment, the platform assembly 1110 includes a plurality of panels coupled to the platform 1112 defining a utility bed for additional cargo storage.

As shown in FIGS. 33-40, the frame assembly 1114 includes a plurality of side supports, shown as side supports 1129, that extend between (a) each of the first supports 1116 and 1118 and (b) each of the second supports 1124 and 1126. The side supports 1129 provide additional support to the frame assembly 1114.

As shown in FIGS. 33-37 and 40, the platform assembly 1110 includes a controller holder or mount, shown as controller dock 1140, configured to selectively receive the wireless controller 700. The controller dock 1140 is coupled to the frame assembly 1114. In some embodiments, the controller dock 1140 is coupled to the hoop bar 180. As shown in FIGS. 33 and 34, the controller dock 1140 is coupled to the handle 1128 of the frame assembly 1114 such that the controller dock 1140 and, therefore, the wireless controller 700 are centered between the first supports 1116 and 1118. As shown in FIG. 33, the controller dock 1140 is positioned above the handle 1128 between the first supports 1116 and 1118. As shown in FIG. 34, the controller dock 1140 is positioned underneath the handle 1128 between the first supports 1116 and 1118 such that an area around the handle 1128 is unobstructed to provide room for the rider or operator to hold onto the handle 1128. As shown in FIGS. 35 and 36, the controller dock 1140 is positioned outside of the occupant riding area 1113.

Figure 37:
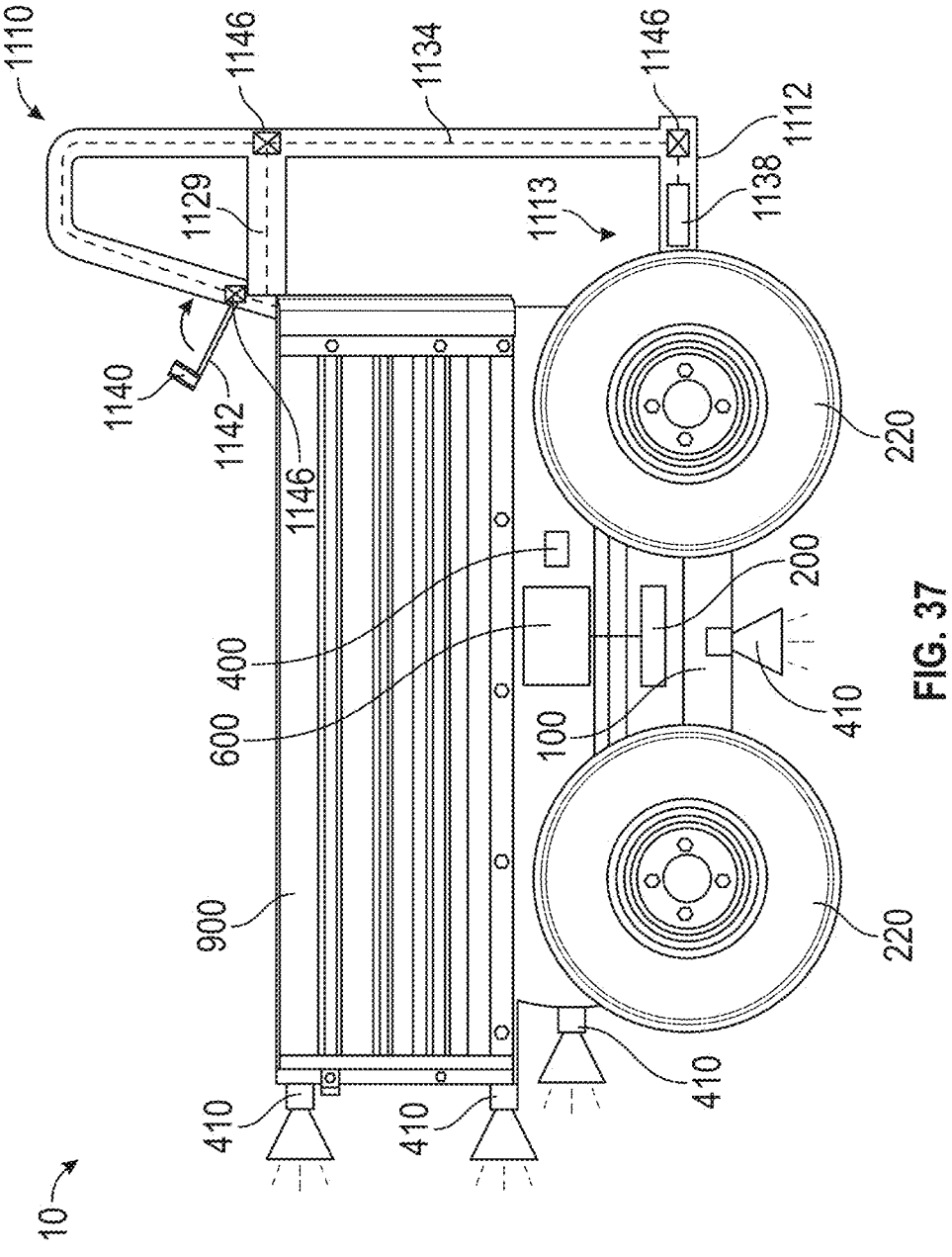
FIG. 37 is a side view of the AMR of FIG. 33, according to another exemplary embodiment.

As shown in FIGS. 33-38 and 40, the controller dock 1140 includes one or more supports, shown as dock supports 1142, that are coupled to and extend from the frame assembly 1114. In some embodiments, the dock supports 1142 are adjustable in height/length and/or pivotable to facilitate reorienting the wireless controller 700. As shown in FIG. 33, the dock supports 1142 are coupled to the handle 1128. As shown in FIG. 34, the dock supports 1142 are coupled to the bent portions 1120 and 1122 of the first supports 1116 and 1118 of the frame assembly 1114 such that the controller dock 1140 is positioned within the occupant riding area 1113. As shown in FIGS. 35 and 36, the dock supports 1142 are coupled to the bent portions 1120 and 1122 such that the controller dock 1140 is positioned outside of the occupant riding area 1113 and oriented at an angle (e.g., a 45-degree angle, a 55-degree angle, etc.). In some embodiments, the dock supports 1142 are coupled to the frame assembly 1114 using clamps that can be tightened or loosened to adjust the position of the controller dock 1140 horizontally along the handle 1128 or vertically along the first supports 1116 and 1118. In some embodiments, the controller dock 1140 includes a spring-loaded clamp that can be pulled apart and released to bias sides of the controller dock 1140 against the wireless controller 700 to secure the wireless controller 700 therein. In other embodiments, the controller dock 1140 is mechanically adjustable (e.g., via a screw or a releasable rachet lock system). As shown in FIG. 37, the controller dock 1140 is foldable or repositionable to provide a desired viewing angle. In some embodiments, the controller dock 1140 can be stored flush, or substantially flush, with the frame assembly 1114 (e.g., can rotate or fold towards the frame assembly 1114 to be flush with, or aligned with, the bent portions 1120 and 1122).

According to an exemplary embodiment, the wireless controller 700 is configured to receive commands, signals, or inputs from a user or operator, and provide the commands to the AMR control system 600 to implement the command or operate the AMR 10 according to the command. As shown in FIGS. 33-36, 40, and 41, the wireless controller 700 includes an interface, shown as operator interface 702. The operator interface 702 may include a touch screen display, a non-touch display, and/or various knobs, button, switches, and/or joysticks for operator to interact with to provide various commands to the AMR control system 600 to control the driveline 200, such as to increase the speed, decrease the speed, or steer the AMR 10. In some embodiments, the wireless controller 700 includes a speaker and a microphone to receive voice inputs and provide audio outputs to the operator.

As shown in FIGS. 33-36, the wireless controller 700 receives an electrical input, or power, for charging from a powerline, shown as wired connection 1134, that runs through the platform assembly 1110 (e.g., along one of the first supports 1116, 1118 or the second supports 1124, 1126, etc.) and connects to the controller dock 1140. The wireless controller 700 may include a rechargeable battery such that the wireless controller 700 can operate without being connected to the wired connection 1134. The wired connection 1134 may be connected to and receive power from the power system 300 or an attachment battery, shown as platform battery 1138, of the platform assembly 1110. As shown in FIGS. 33-35 and 37-40, the platform battery 1138 is positioned on, within, or underneath the platform 1112 (e.g., protected from, or shielded from, the elements, such as rain or debris). For example, the platform battery 1138 may be positioned on an underside of the platform 1112 or positioned within a cavity of the platform 1112. The wireless controller 700 includes an electrical interface or power port that can be electrically coupled to an interface of the controller dock 1140 connected to the wired connection 1134 to provide or transfer power from one of the power system 300 or the platform battery 1138 for charging the wireless controller 700.

In some embodiments, the wireless controller 700 is configured to communicate with the sensor system 400. In some embodiments, the sensor system 400 provides sensor data to the AMR control system 600 and then the AMR control system 600 provides the sensor data to the wireless controller 700. In other embodiments, the sensor system 400 provides the sensor data directly to the wireless controller 700. As such, the wireless controller 700 can provide the sensor data to an operator, and the operator can provide an input or control command to the wireless controller 700 for transmitting to the AMR control system 600 for implementation based on the sensor data. For example, the sensor system 400 may include at least one visual sensor or camera that provides real time visual input to the wireless controller 700. The operator interface 702 of the wireless controller 700 may display the visual input in real time and the operator can adjust or control the AMR 10 via the wireless controller 700 based on the visual input. As shown in FIGS. 33-40, the stereo cameras 410 can be positioned on the frame assembly 100 (e.g., the front end 112, the rear end 114, the left side 116, the right side 118, an underside, etc.), on the bed attachment 900, and/or on the platform assembly 1110 to provide sensor data from various viewpoints.

According to an exemplary embodiment, the AMR 10 and the platform assembly 1110 include a plurality of electrical or wired connections for providing power from the AMR 10 to the platform assembly 1110. As shown in FIGS. 33-40, the wired connection 1134 extends throughout the frame assembly 1114. As shown in FIGS. 34, 35, and 37-39, the platform assembly 1110 includes one or more electrical interfaces (e.g., USB, USB-C, 120V outlet, etc.), shown as electrical connectors 1146, to facilitate the transfer of power from the platform battery 1138 an/or the power system 300 to electrical devices, such as the wireless controller 700 or other personal devices such as cellular phones or power tools. For example, the electrical connectors 1146 may be positioned on the first supports 1116 and 1118, the second supports 1124 and 1126, the handle 1128, and/or on the platform 1112. In some embodiments, the electrical connectors 1146 are disposed along the frame assembly 100.

As shown in FIG. 34, the platform assembly 1110 includes a flexible wired connection 1148 positioned outside of, or separate from, the frame assembly 1114. For example, the flexible wired connection 1148 may be an extension cord or electrical tether that is configured to be stored within the platform 1112 of the platform assembly 1110. As such, the flexible wired connection 1148 can accommodate providing power to various devices and tools, such as the wireless controller 700 and other power tools positioned a distance away from the platform 1112 and the frame assembly 1114.

As shown in FIG. 35, the power system 300 supported by the frame assembly 100 is configured to provides electrical power to the platform assembly 1110. For example, the frame assembly 100 includes a power interface (e.g., the attachment interface 360) coupled the power system 300 and is configured to transfer power from the power system 300 to the platform assembly 1110. The platform 1112 of the platform assembly 1110 may includes an electrical connector configured to receive power from the power interface on the frame assembly 100 and the electrical connector of the platform 1112 provides the power through the wired connection 1134 up the frame assembly 1114 to provide power to the wireless controller 700 and/or the electrical connectors 1146.

As shown in FIG. 36, the frame assembly 1114 is coupled to each of the frame assembly 100 and the bed attachment 900, and the frame assembly 1114 is positioned within the bed attachment 900. As such, the occupant riding area 1113 is positioned within the bed attachment 900. By positioning the frame assembly 1114 within the bed attachment 900, the platform 1112 may be omitted. According to this embodiment, the frame assembly 1114 receives power via the wired connection 1134 from the frame assembly 100 or is electrically connected to, the frame assembly 100 via a connection port or power interface positioned within the bed attachment 900.

Figure 38:
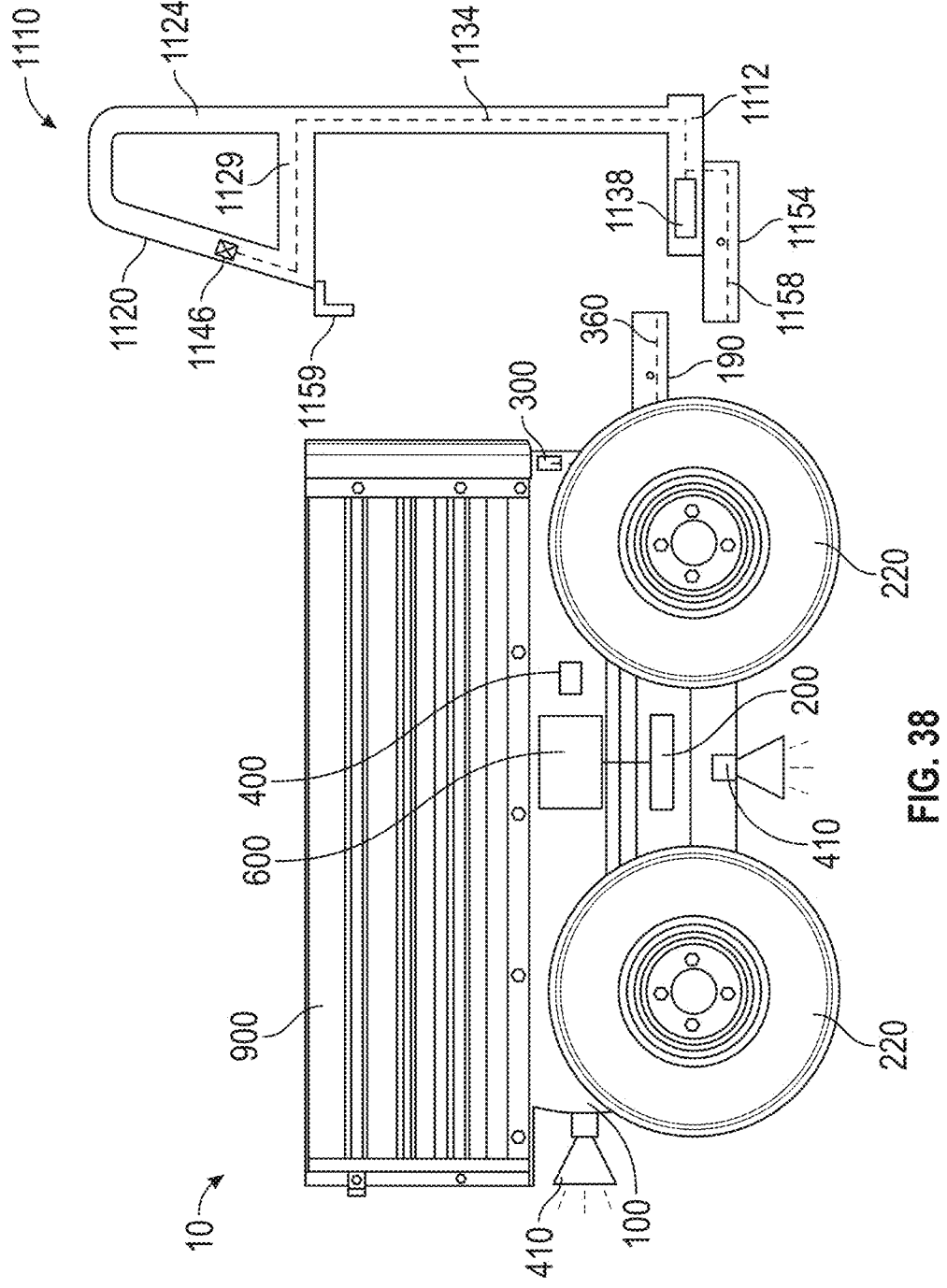
FIG. 38 is a side view of the AMR of FIG. 33 with the platform assembly detached, according to an exemplary embodiment.

As shown in FIGS. 38 and 39, the platform 1112 of the platform assembly 1110 includes protrusion or interface, shown as hitch connector 1154, extending therefrom (e.g., a bottom thereof, an edge thereof, etc.). According to an exemplary embodiment, the hitch connector 1154 is configured to interface with the hitch receiver 190 of the frame assembly 100 to couple the platform assembly to the AMR 10. For example, each of the hitch receiver 190 and the hitch connector 1154 define apertures configured to receive a pin or other fastener to secure the hitch connector 1154 within the hitch receiver 190. Accordingly, the platform assembly 1110 may be slidably engaged with the hitch receiver 190 of the AMR 10. As shown in FIGS. 38 and 39, the hitch connector 1154 is positioned underneath or below the platform 1112 of the platform assembly 1110. In other embodiments, the hitch connector 1154 extends from a side of the platform 1112. In yet another embodiment, the platform 1112 defines a slot or cavity that receives the hitch receiver 190.

In some embodiments, the hitch connector 1154 and the hitch receiver 190 facilitate the transfer of power between the AMR 10 and the platform assembly 1110. As shown in FIG. 38, the attachment interface 360 is integrated into the hitch receiver 190, and the attachment interface 360 receives power from the power system 300 and provides the power to the hitch connector 1154 via a port or connector, shown as electrical connector 1158. Accordingly, the power system 300 can provide power through the hitch receiver 190 to the attachment interface 360 where power is transferred to the hitch connector 1154 via the electrical connector 1158. The hitch connector 1154 then provides the power to the platform 1112 and the frame assembly 1114 via the wired connection 1134. The power system 300 may also charge the platform battery 1138 by transferring power via the attachment interface 360 and the electrical connector 1158. Once the platform battery 1138 is charged, the platform battery 1138 can provide power to the platform 1112 and the frame assembly 1114 via the wired connection 1134 to charge accessories or devices, such as the wireless controller 700.

As shown in FIG. 39, the attachment interface 360 is positioned separate from or not integrated with the hitch receiver 190 and the electrical connector 1158 of the platform assembly 1110 is positioned separate from the hitch connector 1154. The attachment interface 360 is positioned on the frame assembly 100 of the AMR 10 such that when the hitch connector 1154 is received by the hitch receiver 190, the electrical connector 1158 is aligned with, and positioned to contact, the attachment interface 360 to facilitate that transfer of power from the power system 300 to the electrical connector 1158 via the attachment interface 360. According to this embodiment, the electrical connector 1158 is positioned on an edge of the platform 1112 that engages with, or contacts the frame assembly 100 (e.g., an edge adjacent to or above the hitch connector 1154, etc.). As shown in FIG. 39, the electrical connector 1158 is positioned above the hitch connector 1154. According to this embodiment, the power received by the electrical connector 1158 can simultaneously charge the platform battery 1138 and provide power, via the wired connection 1134, to the wireless controller 700 and other devices or tools via the electrical connectors 1146.

As shown in FIG. 38, the platform assembly 1110 includes one or more coupling mechanisms, shown as hooks 1159, that are configured to engage with an attachment, such as the bed attachment 900. For example, the hooks 1159 may rest on, or engage with, a wall or panel of the bed attachment 900, further coupling and stabilizing the platform assembly 1110 to the AMR 10. The hooks 1159 may be rotatably coupled to the bent portions 1120 and 1122. The hooks 1159 may be configured to be rotated or disengaged with the bed attachment 900 to slidably remove the hitch connector 1154 from the hitch receiver 190.

Figure 40:
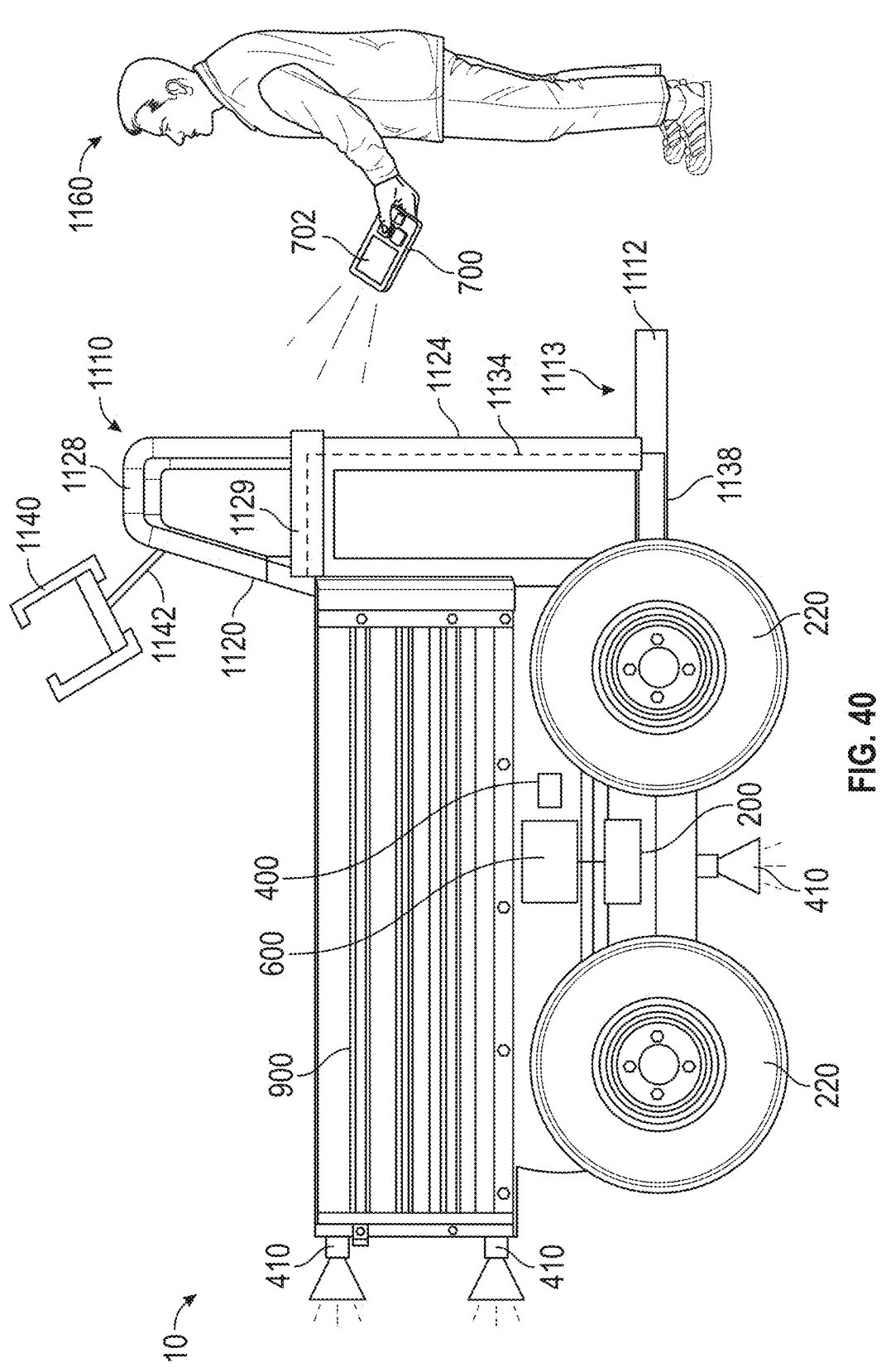
FIG. 40 is a side view of the AMR of any of FIGS. 33-39 being remotely controlled by a user with a controller, according to an exemplary embodiment.

As shown in FIG. 40, the wireless controller 700 is removed from or decoupled from the controller dock 1140. For example, the user or operator 1160 may step off of the platform 1112 or leave the occupant riding area 1113 and bring the wireless controller 700 with them. The wireless controller 700 is wirelessly connected (e.g. via Bluetooth, Wi-Fi, etc.) to the AMR control system 600. As such, the operator 1160 can control the AMR 10 remotely from outside of the occupant riding area 1113 using the wireless controller 700. For example, the operator 1160 may provide commands, via touch inputs or buttons, to the wireless controller 700 and the wireless controller 700 transmits the commands to the AMR control system 600. The AMR control system 600 then communicates with driveline 200 and/or system of the AMR 10 such as the light system 500 or the sensor system 400 to implement the command or an action corresponding to or associated with the input of the operator 1160. For example, the operator 1160 can remotely control or command the AMR 10 to survey a portion of land via the wireless controller 700 using feedback from the stereo cameras 410. As an example, the operator 1160 may ride on the AMR 10 and operate the AMR 10 via the wireless controller 700 while positioned in the occupant riding area 1113 and then, once a desired destination or location is reached, the operator 1160 can leave the occupant riding area 1113 and take the wireless controller 700 with them from the controller dock 1140 and direct or control the AMR 10 to travel to a remote area, or an area away from the operator 1160, via the wireless controller 700. The operator 1160 can then command or direct the AMR 10 to return to them, or to their current location, and step onto the platform 1112 such that they are in the occupant riding area 1113 and recouple the wireless controller 700 to the controller dock 1140. While coupled to the controller dock 1140, the wireless controller 700 can be charged by one of the power system 300 or the platform battery 1138 via the wired connection 1134.

Figure 41:
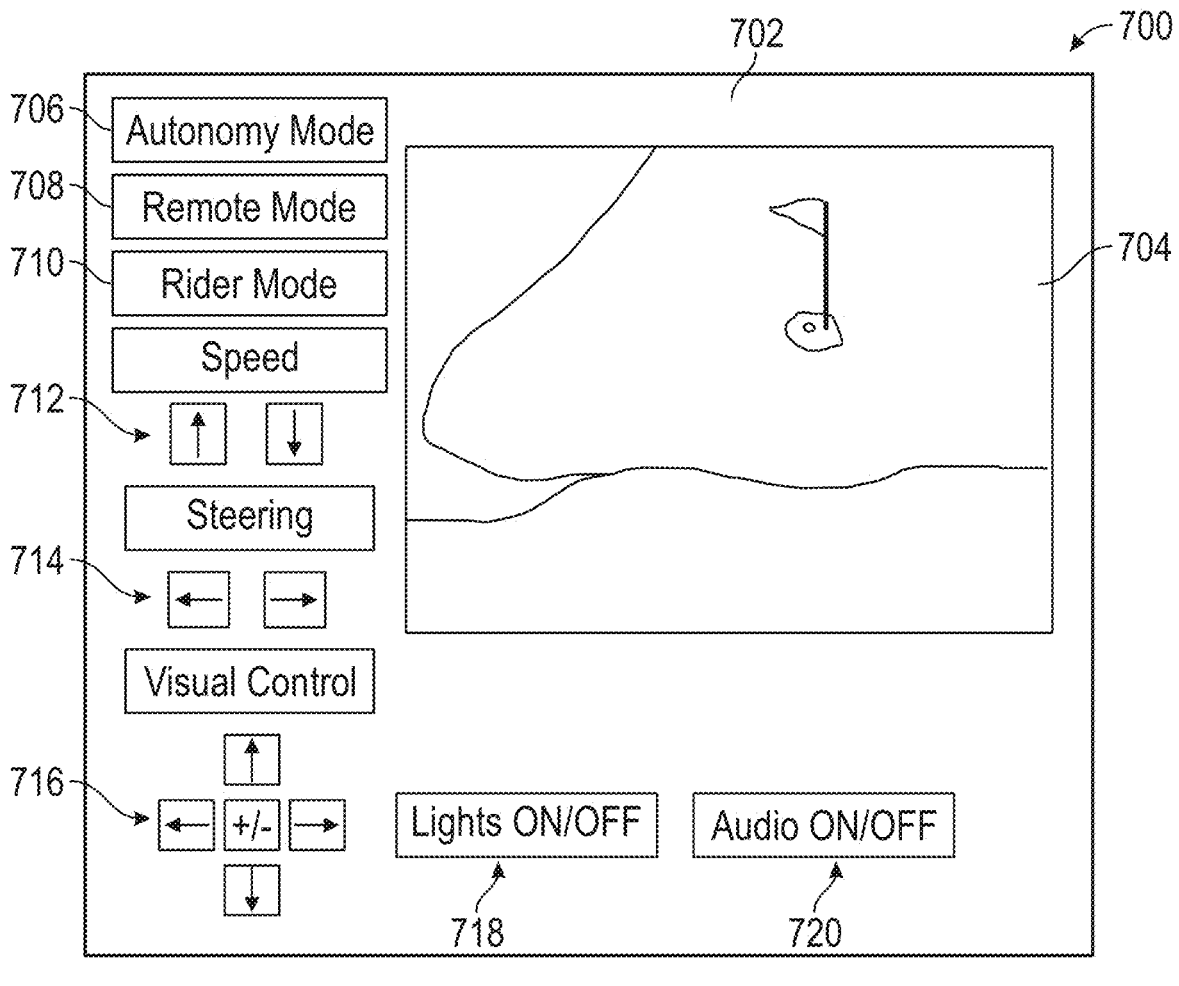
FIG. 41 is a user interface of the controller of FIG. 40, according to an exemplary embodiment.

As shown in FIG. 41, the operator interface 702 of the wireless controller 700 includes first area or portion, shown as visual display area 704, configured to display the visual input provided by the stereo cameras 410. For example, the AMR 10 can be used on a golf course to analyze or gather data on the conditions of greens or perform repairs, and the stereo cameras 410 can provide visual input for display on the visual display area 704 such that the operator 1160 can guide or direct the AMR 10 remotely.

As shown in FIG. 41, the operator interface 702 of the wireless controller 700 includes second area or portion including a plurality of interfaces (e.g., button, switches, touch interfaces, etc.). The plurality of interfaces includes mode switching buttons or inputs, shown as autonomy mode input 706, a remote mode input 708, and a rider mode input 710. When the autonomy mode input 706 is selected, the AMR 10 is configured to roam, gather data, and/or performed assigned tasks based autonomously. For example, the AMR 10 may autonomously gather green data or speed of play of players on a golf course and provide the data to a user by transmitting the data from the AMR control system 600 to the wireless controller 700 and/or the remote systems 2040. When in the remote mode 708, the AMR 10 is configured to be controlled or receive commands from the operator 1160 via the wireless controller 700. For example, in the remote mode 708, the operator 1160 may be controlling or providing inputs to the AMR 10 based on the visual input shown in the visual display area 704. In some embodiments, such as when the rider mode 710 is activated, the visual display area 704 may be turned off or suspended to minimize visual data while operating the AMR 10 as the operator 1160 is positioned in the occupant riding area 1113. In some embodiments, the operator interface 702 may change or be optimized for each of the selected modes (e.g., autonomy mode input 706, remote mode input 708, rider mode input 710, etc.).

As shown in FIG. 41, the plurality of interfaces in the second area of the operator interface 702 incudes inputs or buttons for providing a speed input 712, a steering input 714, and a visual control input 716. The speed input 712 includes inputs for increasing or decreasing the speed. For example, pressing an option of the speed input 712 transmits a command to the AMR control system 600 to control the driveline 200. In some embodiments, the speed input 712 includes a visual indications of a current speed, such as a speedometer. The steering input 714 controls a direction of the AMR 10. For example, toggling or pressing the steering input 714 provides a command to the AMR control system 600 to perform skid steer operations and/or control the steering actuators 240. Similarly, providing an input to the visual control input 716 (*a*) transmits a command to the AMR control system 600 to rotate or actuate the stereo cameras 410 to change or adjust the view provided to visual display area 704 or (*b*) toggle between which of the stereo cameras 410 field of view is being displayed in the visual display area 704. As shown in FIG. 41, the plurality of interfaces in the second area of the operator interface 702 incudes various buttons or inputs for controlling devices and/or accessories of the AMR 10 including a light input 718 so that the operator 1160 can control the light system 500 and/or an audio input 720 to control a microphone and/or a speaker of the AMR 10.

Ball Picker Attachment

Figure 42:
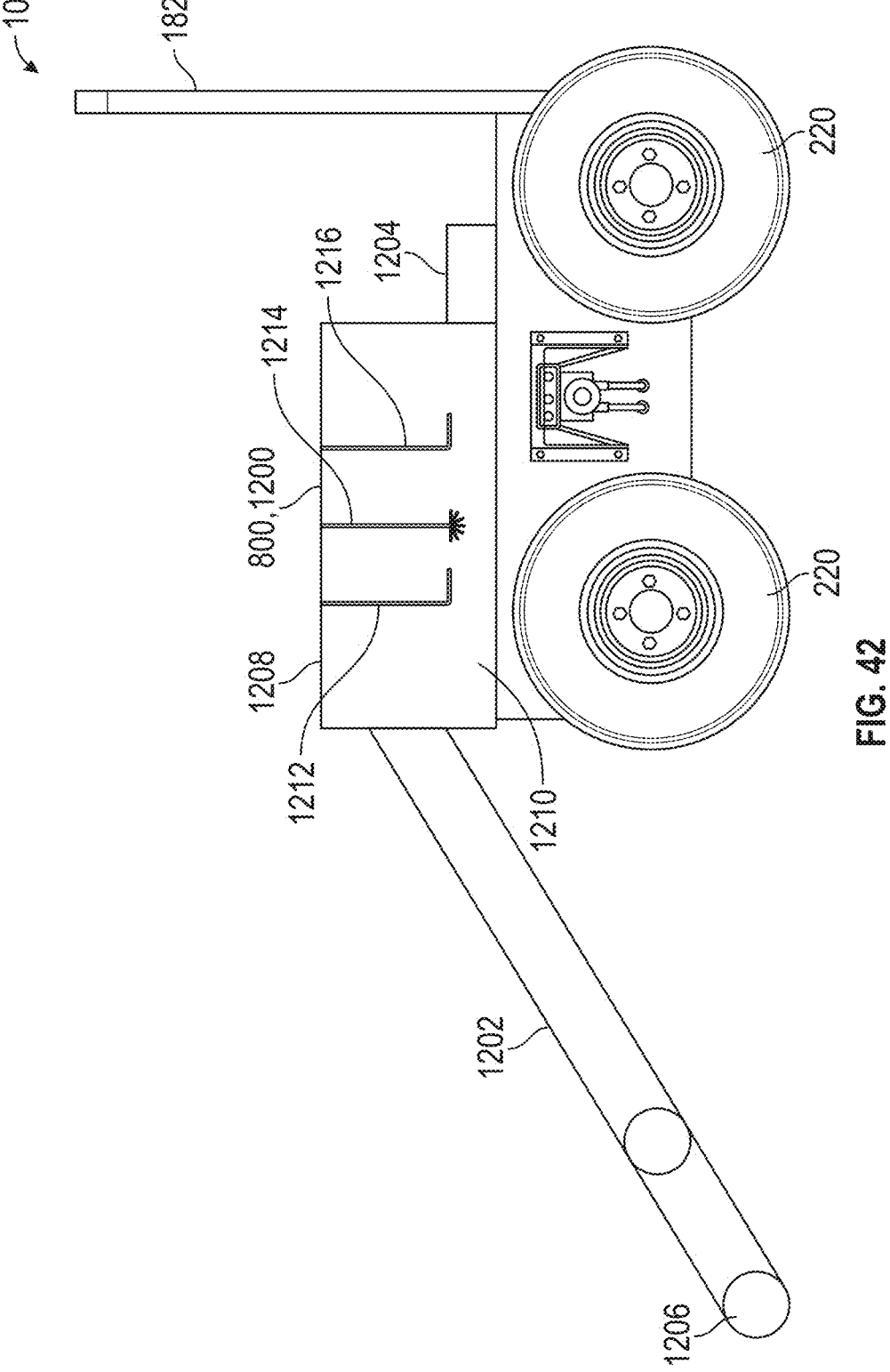
FIG. 42 is a side view of the AMR of FIG. 1 with a ball picker attachment, according to an exemplary embodiment.

As shown in FIG. 42, the attachment 800 of the AMR 10 includes or is configured as a ball collector or ball retriever, shown as ball picker attachment 1200. The ball picker attachment 1200 is configured to collect and store balls (e.g., golf balls, etc.) and interfaces with the frame assembly 100. The ball picker attachment 1200 includes a robotic arm, shown as telescopic arm 1202, a motor 1204, one or more gripping tools, shown as suction cups 1206, and a hopper or storage container, shown as ball hopper 1208. The motor 1204 and the ball hopper 1208 interface with the frame assembly 100. The suction cups 1206 are coupled to the telescopic arm 1202 and are configured to couple to a ball. The motor 1204 is configured to actuate the telescopic arm 1202 and, therefore, the suction cups 1206 and the balls to be positioned above (e.g., opposite the frame assembly 100 from the wheels 220) the ball hopper 1208. The suction cups 1206 are configured to release suction on the balls so the balls fall into the ball hopper 1208. In some embodiments, the suction cups 1206 are replaced with an alternate means of collecting the balls (e.g., a clamp, a tong, a vacuum gripper, an adhesive pad, a pneumatic gripper, etc.). In some embodiments, the suction cups 1206 are omitted, and the telescopic arm 1202 includes an aperture extending from an end of the telescopic arm 1202 to the ball hopper 1208, and the balls are configured to travel through the aperture to the ball hopper 1208 (e.g., suction is provided within the aperture, etc.). In such embodiments, the motor 1204 may be replaced or supplemented by a vacuum pump.

As shown in FIG. 42, the ball hopper 1208 includes a first chamber, shown as entrance chamber 1210, a second chamber, shown as ball cleaning station 1212, and a third chamber, shown as storage chamber 1216. The entrance chamber 1210 is configured to collect the balls, and the balls are configured to move from the entrance chamber 1210 to the ball cleaning station 1212, and from the ball cleaning station 1212 to the storage chamber 1216. The ball cleaning station 1212 includes a ball cleaning mechanism, shown as cleaning rollers 1214. The ball cleaning station 1212 is configured to clean (e.g., wash, scrub, etc.) the balls. In some embodiments, the ball cleaning station 1212 includes additional ball cleaning mechanism (e.g., spray jets, high pressurized air configured to air dry the balls, foam sprayers, water jets, pre-soak sprayers, etc.).

Figure 43:
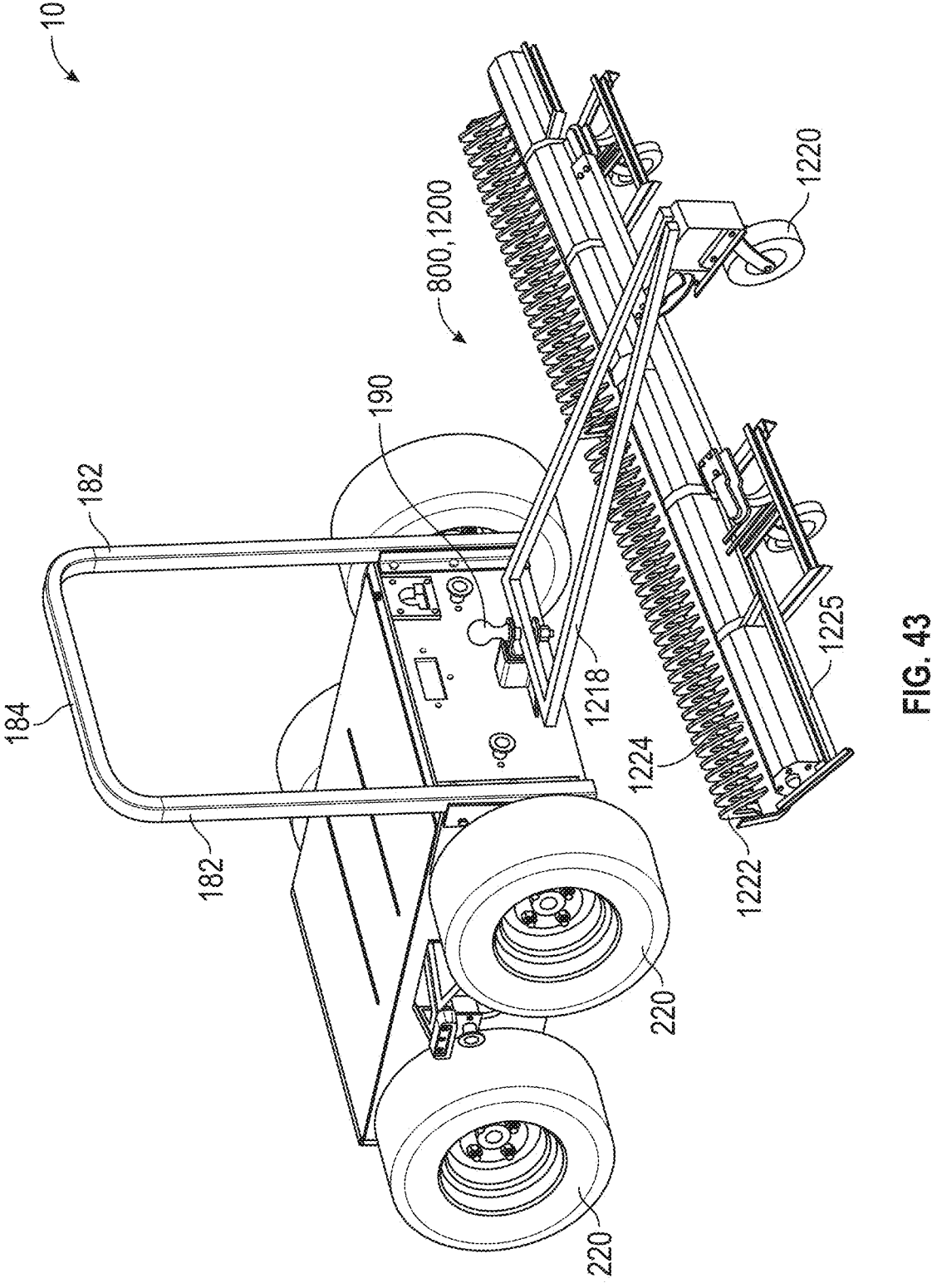
FIG. 43 is a perspective view of the AMR of FIG. 1 with a ball picker attachment, according to another exemplary embodiment.

As shown in FIG. 43, an alternate embodiment of the ball picker attachment 1200 interfaces with the hitch receiver 190. The ball picker attachment 1200 is configured to be pulled/pushed by the AMR 10 along a ground surface. The ball picker attachment 1200 includes a coupling mechanism, shown as hitch attachment 1218, one or more tractive elements, shown as wheel 1220; one or more collection mechanisms, shown as disks 1222, a rotating mechanism, shown as drum 1224, and one or more storing containers, shown as baskets 1225. The hitch attachment 1218 is configured to couple to the hitch receiver 190 and extends away from the rear panel 130. The drum 1224 is configured to rotate while the AMR 10 pulls/pushes the ball picker attachment 1200. The drum 1224 includes the disks 1222. The disks 1222 form gaps between each of the disks 1222.

While the drum 1224 rotates, balls are collected within the gaps of the disks 1222, rotate around the drum 1224, and are collected within the baskets 1225.

Club Carrier Attachment

Figure 44:
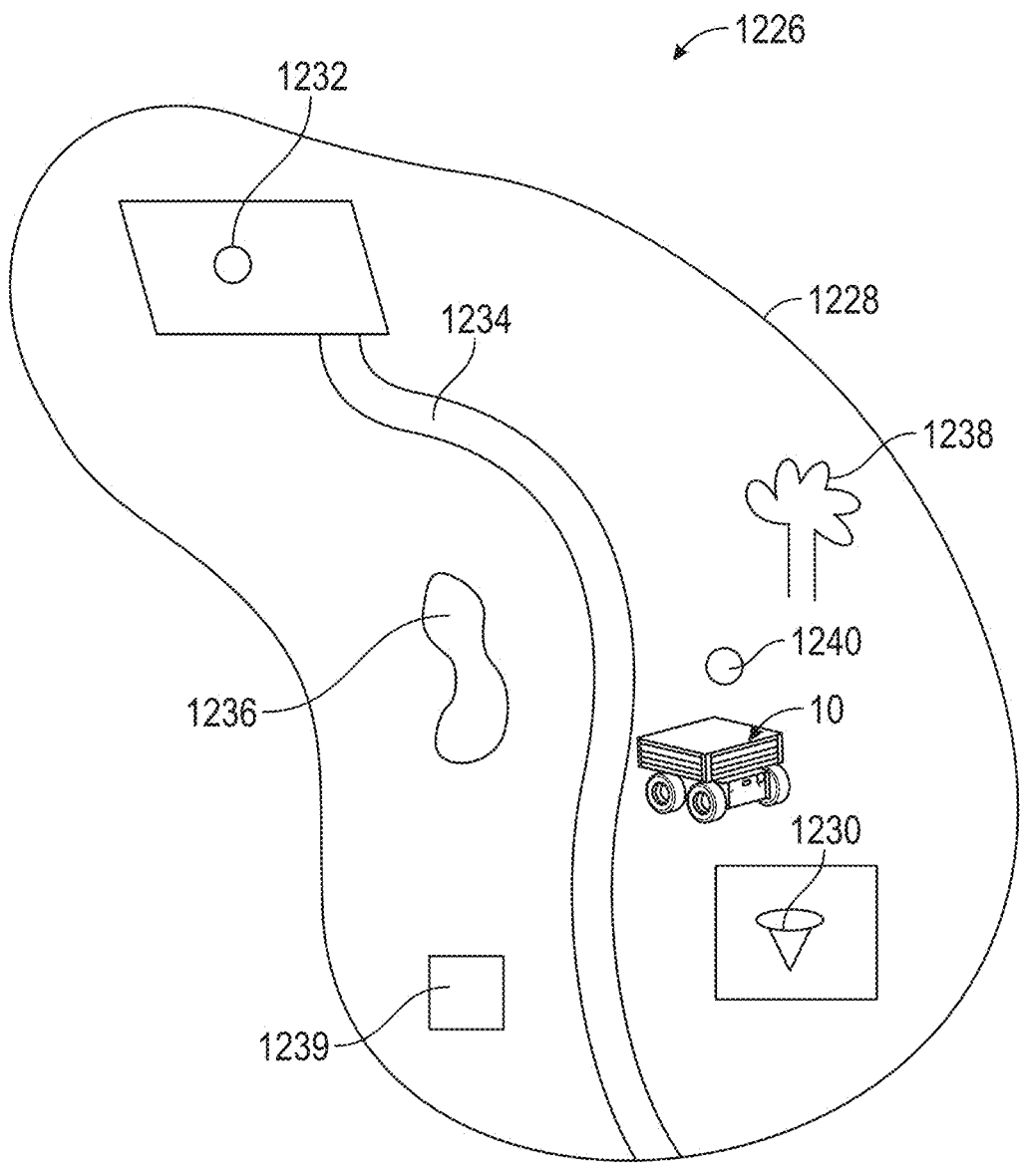
FIG. 44 is layout of a golf course, according to an exemplary embodiment.

As shown in FIG. 44, a site, shown as golf course 1226, includes one or more holes 1228 (e.g., nine holes, eighteen holes, etc.). Each hole 1228 includes one or more tees, shown as tee 1230, a pin, shown as pin 1232, one or more paths, shown as cart path 1234, one or more hazardous areas (e.g., a sand trap, a restricted area, a wooded area, water, etc.), shown as hazardous area 1236, and one or more hazardous objects (e.g., a tree, a player, etc.), shown as hazardous object 1238. The golf course 1226 also includes the AMR 10, a watering system, shown as irrigation system 1239, and a ball, shown as golf ball 1240. The irrigation system 1239 is configured to water grass in the golf course 1226.

Figure 45:
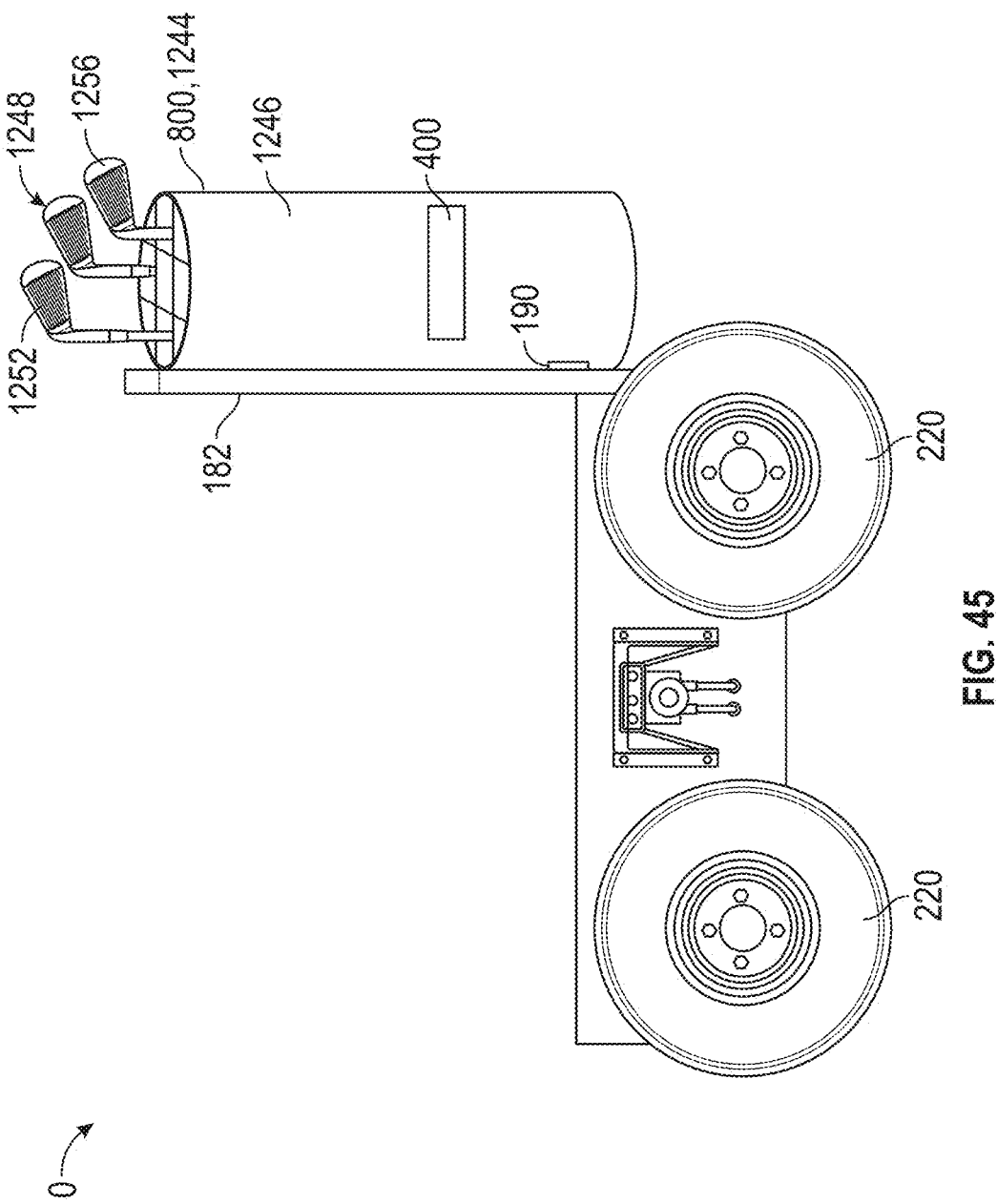
FIG. 45 is a side view of the AMR of FIG. 1 with a club carrier attachment, according to an exemplary embodiment.

As shown in FIG. 45, the attachment 800 includes or is configured as a club carrier, shown as club carrier attachment 1244. The club carrier attachment 1244 is configured to interface with the hitch receiver 190. The club carrier attachment 1244 includes a golf club compartment 1246 configured to receive one or more golf clubs 1248 (e.g., irons, woods, a putter, a driver, etc.) and includes one or more sensor of the sensor system 400. The golf clubs 1248 include a first golf club, shown as putter 1252, and a second golf club, shown as driver 1256. In some embodiments, the golf club compartment 1246 is coupled to the vertical posts 182 of the hoop bar 180. The AMR control system 600 may be configured to determine a distance to the pin 1232 (e.g., from the AMR 10, from the club carrier attachment 1244, from the golf ball 1240, etc.) using the sensor system 400 and recommend a golf club 1248 within the golf club compartment 1246 in accordance with the distance. For example, if the distance from the AMR 10 or the golf ball 1240 to the pin 1232 is less than a first threshold, the AMR control system 600 may recommend the putter 1252. As another example, if the distance from the AMR 10 or the golf ball 1240 to the pin 1232 is greater than a second threshold, the AMR control system 600 may recommend the driver 1256 (e.g., via the user interface 750, via the wireless controller 700, via the operator portal 2020, etc.). In some embodiments, the club carrier attachment 1244 is configured to interface with the frame assembly 100.

Environmental Attachment

Figure 46:
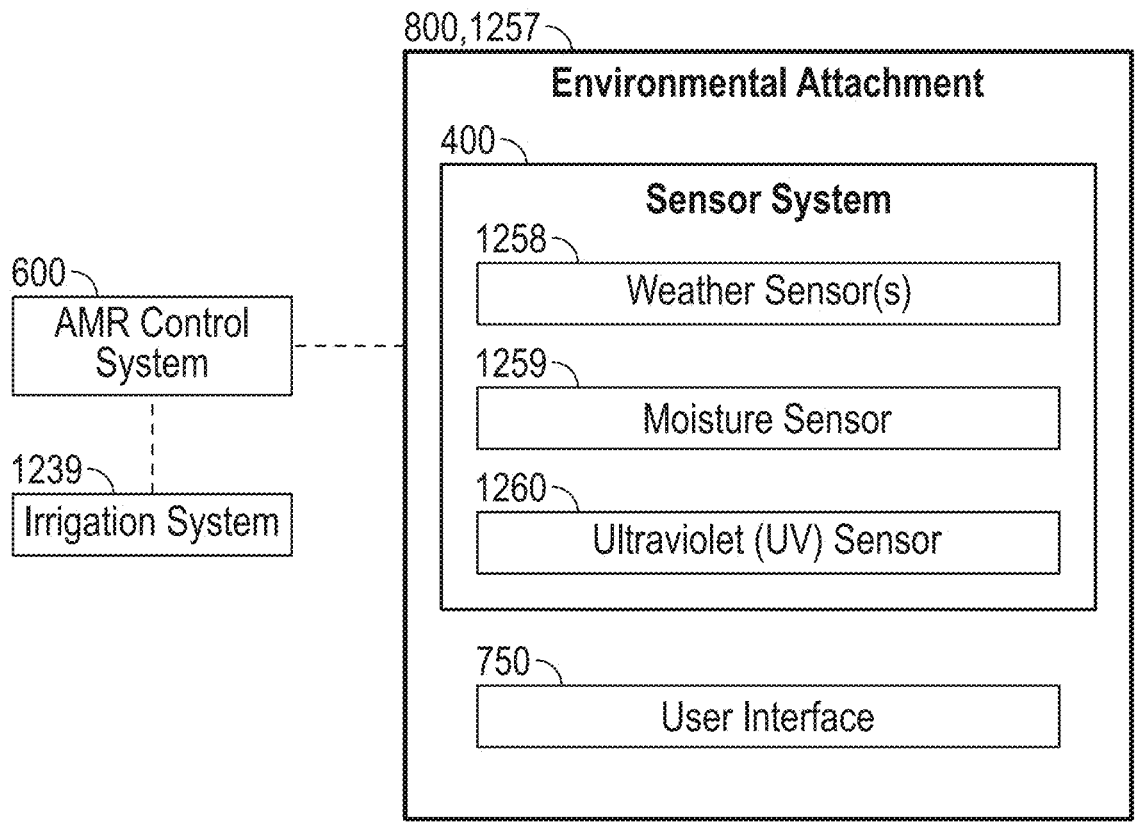
FIG. 46 is a schematic block diagram of an environmental attachment, according to an exemplary embodiment.

As shown in FIG. 46, the attachment 800 includes or is configured as a weather module, shown as environmental attachment 1257. The environmental attachment 1257 is configured to provide real-time conditions on the golf course 1226 to a user (e.g., golfers, maintenance professionals, etc.) and optimize irrigation of the golf course 1226. The environmental attachment 1257 adds one or more sensors to the sensor system 400 and includes the user interface 750. The one or more sensors of the sensor system 400 include one or more weather sensors 1258, a moisture sensor 1259, and an ultraviolet (UV) sensor 1260. The one or more weather sensors 1258 are configured to collect data related to current and predicted weather conditions (e.g., temperature, humidity, wind speed, rainfall, etc.). The moisture sensor 1259 is configured to collect data relating to hydration levels of the grass on the golf course 1226. The UV sensor 1260 is configured to collect data relating to sun exposure levels. The AMR control system 600 (and/or the remote systems 2040) is configured to receive the data from the sensor system 400, analyze grass hydration levels in accordance with the hydration levels of the grass, and optimize and implement irrigation using the irrigation system 1239 (e.g., modify irrigation levels, etc.). For example, if a section of the golf course 1226 has levels of hydration below a first threshold, the AMR control system 600 (and/or the remote systems 2040) is configured to increase the level of irrigation of the irrigation system 1239 (e.g., increase the flow of water to the measured section of the golf course 1226, etc.). The user interface 750 (and/or the operator portal 2020) is configured to display the data from the sensor system 400. In some embodiments, the user interface 750 (and/or the operator portal 2020) also displays data from sensor system 400 of environmental attachments 1257 elsewhere on the golf course 1226. Presenting data from multiple environmental attachments 1257 enables a user to view environmental data from multiple locations (e.g., hydration levels of grass on the next hole of the golf course, rainfall data at each hole of the golf course to verify if and when a user will be rained on during a game, to find a nearest shaded location, etc.).

Waste Collection Attachment

Figure 47:
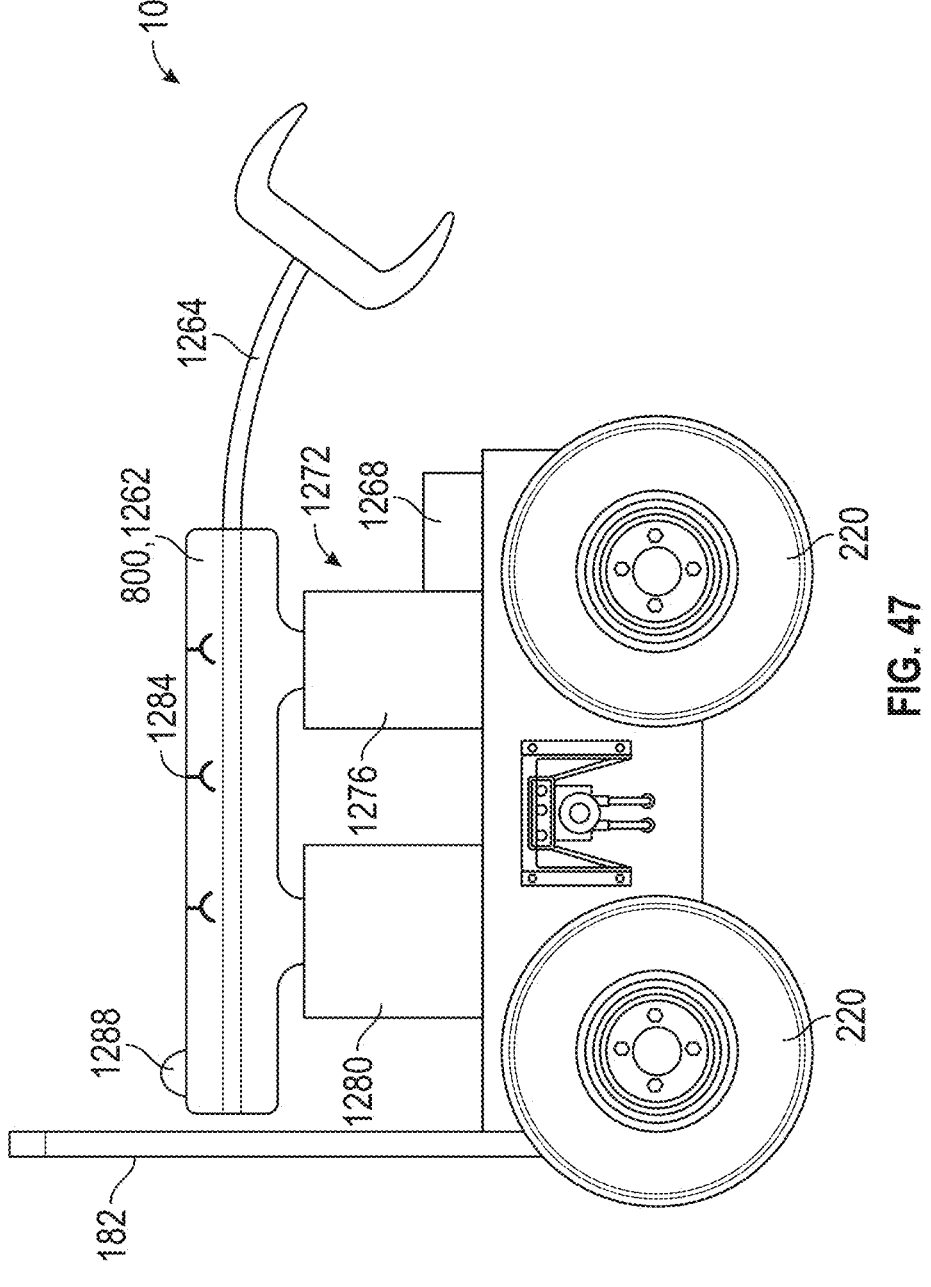
FIG. 47 is a side view of the AMR of FIG. 1 with a waste collection attachment, according to an exemplary embodiment.

As shown in FIG. 47, the attachment 800 includes or is configured as a trash collector, shown as waste collection attachment 1262. The waste collection attachment 1262 is configured to interface with the frame assembly 100. The waste collection attachment 1262 is configured to collect and sort waste. The waste collection attachment 1262 includes a robotic arm, shown as arm 1264, an actuator 1268, and one or more receptacles 1272. The arm 1264 is actuated by the actuator 1268 to collect waste and places the waste into the one or more receptacles 1272. The waste collection attachment 1262 includes a sorter, shown as waste sorter 1284, an alarm, shown as notification system 1288, and the one or more receptacles 1272 include a first receptacle, shown as trash receptacle 1276, and a second receptacle, shown as recycling receptacle 1280. The waste sorter 1284 is configured to sort the waste between the trash receptacle 1276 and the recycling receptacle 1280. When at least one of the receptacles 1272 is full, the notification system 1288 is configured to alert a user. In some embodiments, the notification system 1288 is configured to emit a sound to alert a user. In some embodiments, the notification system 1288 is configured to emit a first sound when the trash receptacle 1276 is full and a second sound when the recycling receptacle 1280 is full. In some embodiments, the notification system 1288 is emit a first light (e.g., strobe pattern, color, etc.) when the trash receptacle 1276 is full and a second light when the recycling receptacle 1280 is full. In some embodiments, the notification system 1288 is configured to transmit a notification to a user device (e.g., to handheld device, the wireless controller 700, the operator device 2030, etc.). In some embodiments, the waste collection attachment 1262 is configured to interface with the hitch receiver 190 (e.g., the waste collection attachment 1262 is installed on a trailer or has a frame with wheels).

Course Mapping Attachment

Figure 48:
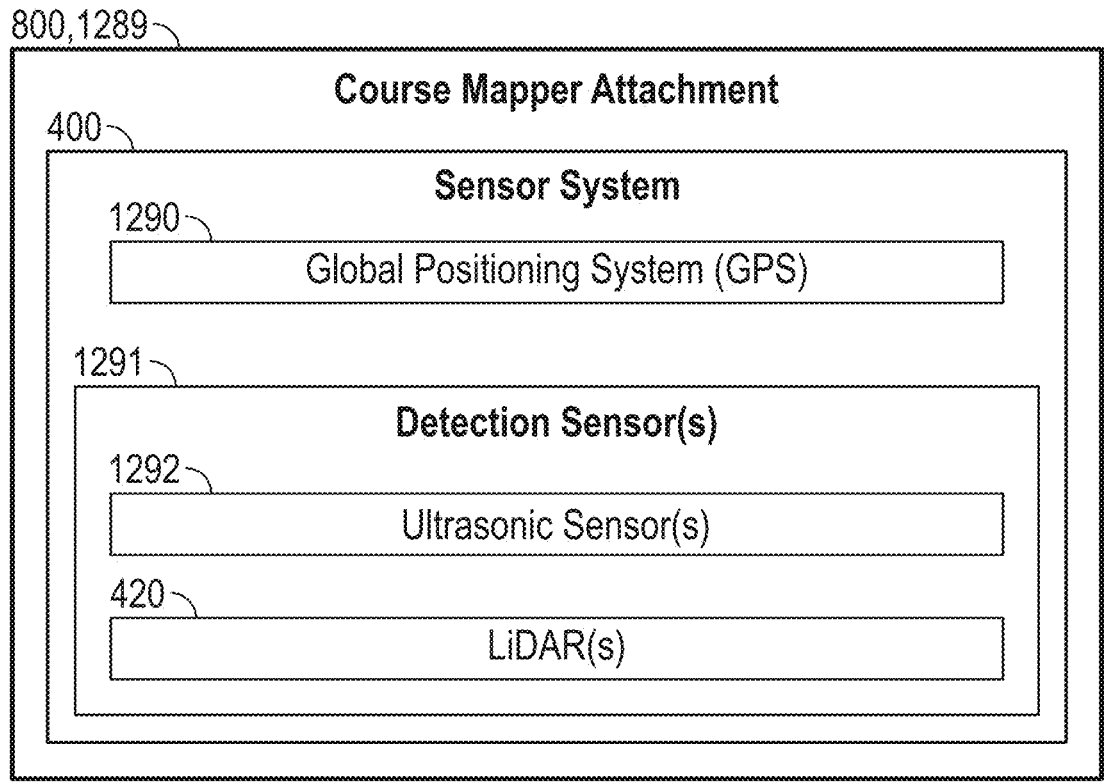
FIG. 48 is a schematic block diagram of a course mapper attachment, according to an exemplary embodiment.

As shown in FIG. 48, the attachment 800 includes or is configured as a course mapper, shown as course mapping attachment 1289. The course mapping attachment 1289 is configured to assists the AMR 10 in navigating the golf course 1226. The course mapping attachment 1289 adds one or more sensors to the sensor system 400. The one or more sensors includes a GPS 1290 and one or more hazard detection sensors, shown as obstacle detection sensors 1291. The GPS 1290 is configured to collect location data (e.g., of the course mapping attachment 1289, of the AMR 10, etc.). The obstacle detection sensors 1291 include one or more ultrasonic sensor 1292 and the LiDAR(s) 420. The obstacle detection sensors 1291 are configured to detect the hazardous objects 1238. The course mapping attachment 1289 is configured to preload maps of the golf course 1226 to the AMR control system 600 including layout information (e.g., greens, fairways, the hazardous areas 1236, the hazardous objects 1238, the cart paths 1234, etc.). The AMR control system 600 is configured to compare the location data from the GPS 1290 to the course map to detect the hazardous areas 1236 and the hazardous objects 1238, and detect hazardous objects 1238 using the data from the obstacle detection sensors 1291. The AMR control system 600 is configured to alter a direction, a speed, and/or an acceleration of the wheels 220 to avoid the hazardous areas 1236 and the hazardous objects 1238. The course mapping attachment 1289 may also be used to generate the maps of the golf course 1226 by detecting objects, hazards, paths, etc. and associating imaging data for such items with the current location of the AMR 10.

Towing Attachment

Figure 49:
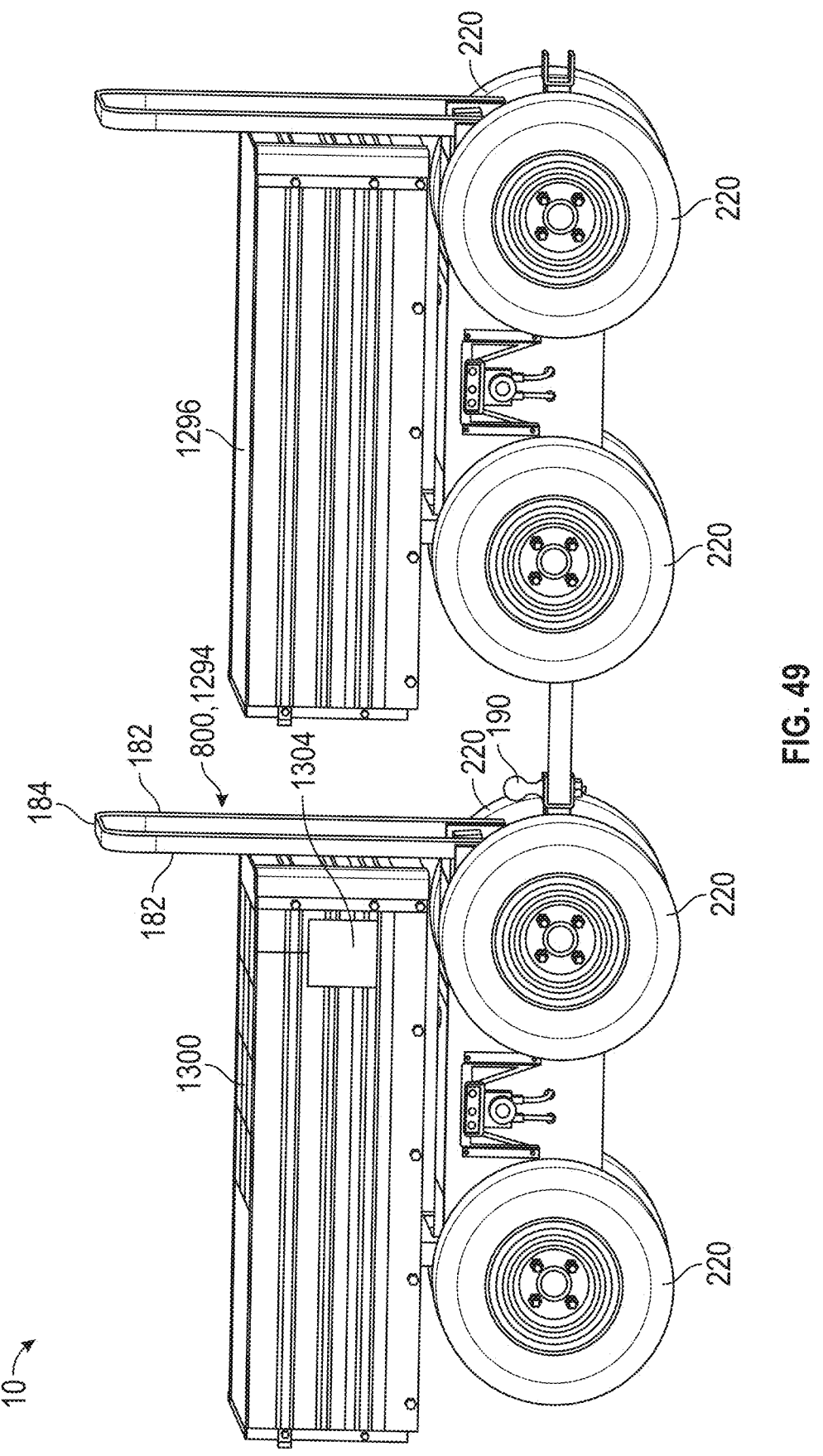
FIG. 49 is a perspective view of the AMR of FIG. 1 with a towing attachment, according to an exemplary embodiment.

As shown in FIG. 49, the attachment 800 includes or is configured as a hauling attachment, shown as towing attachment 1294. The towing attachment 1294 is configured to keep the AMR 10 operational and provide a towing/pickup service (e.g., when towing a second AMR 1296, etc.). The towing attachment 1294 is configured to engage with the frame assembly 100 and the hitch receiver 190. The towing attachment 1294 includes a photovoltaic panel, shown as solar panel 1300, and a charging pad, shown as inductive charging pad 1304. The solar panel 1300 is configured to extend operational times of the AMR 10 during daytime. The inductive charging pad 1304 enables wireless charging when the AMR 10 is docked or towing (e.g., the second AMR 1296, etc.).

Sprayer Attachment

Figure 50:
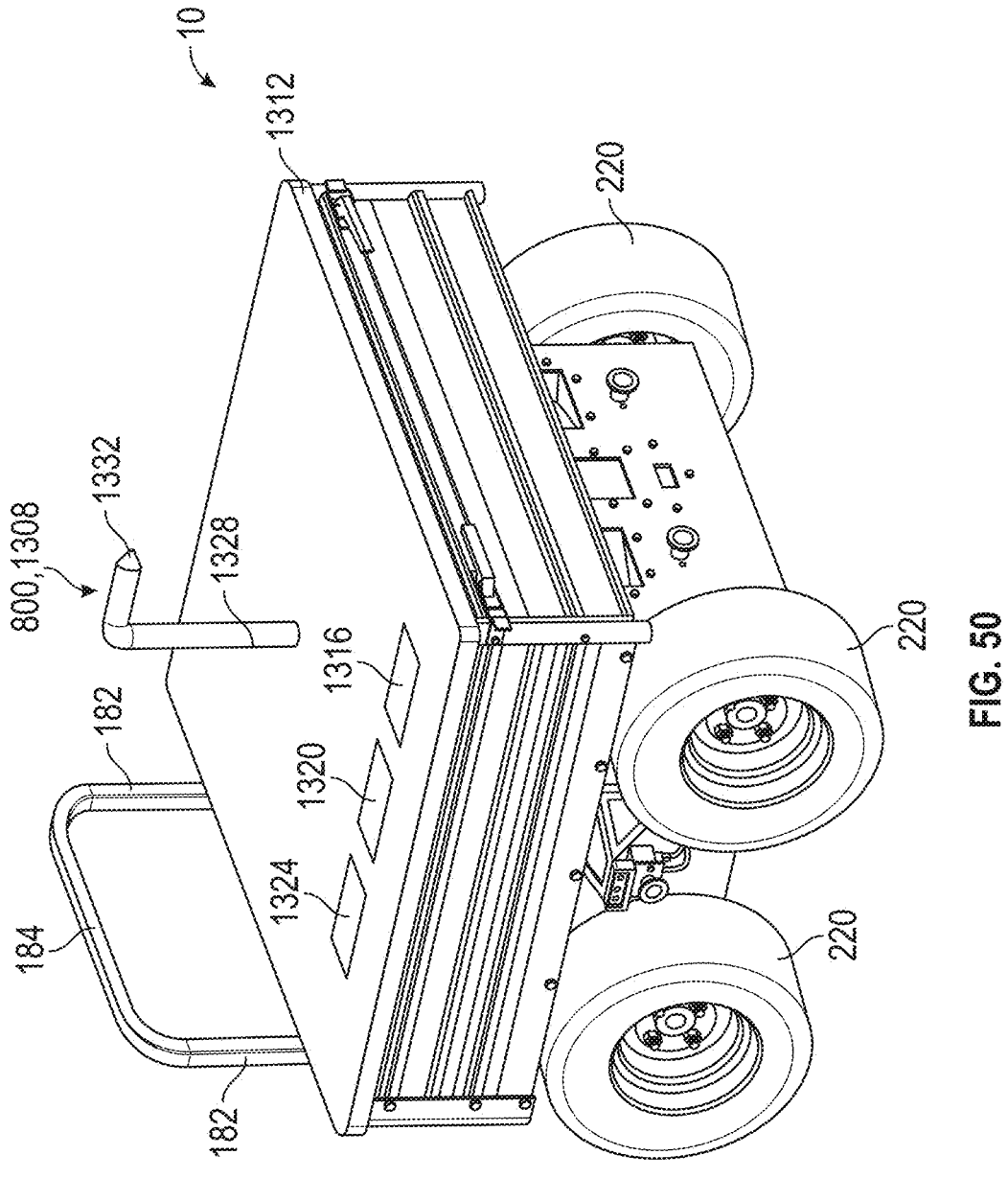
FIG. 50 is a perspective view of the AMR of FIG. 1 with a sprayer attachment, according to an exemplary embodiment.
Figure 51:
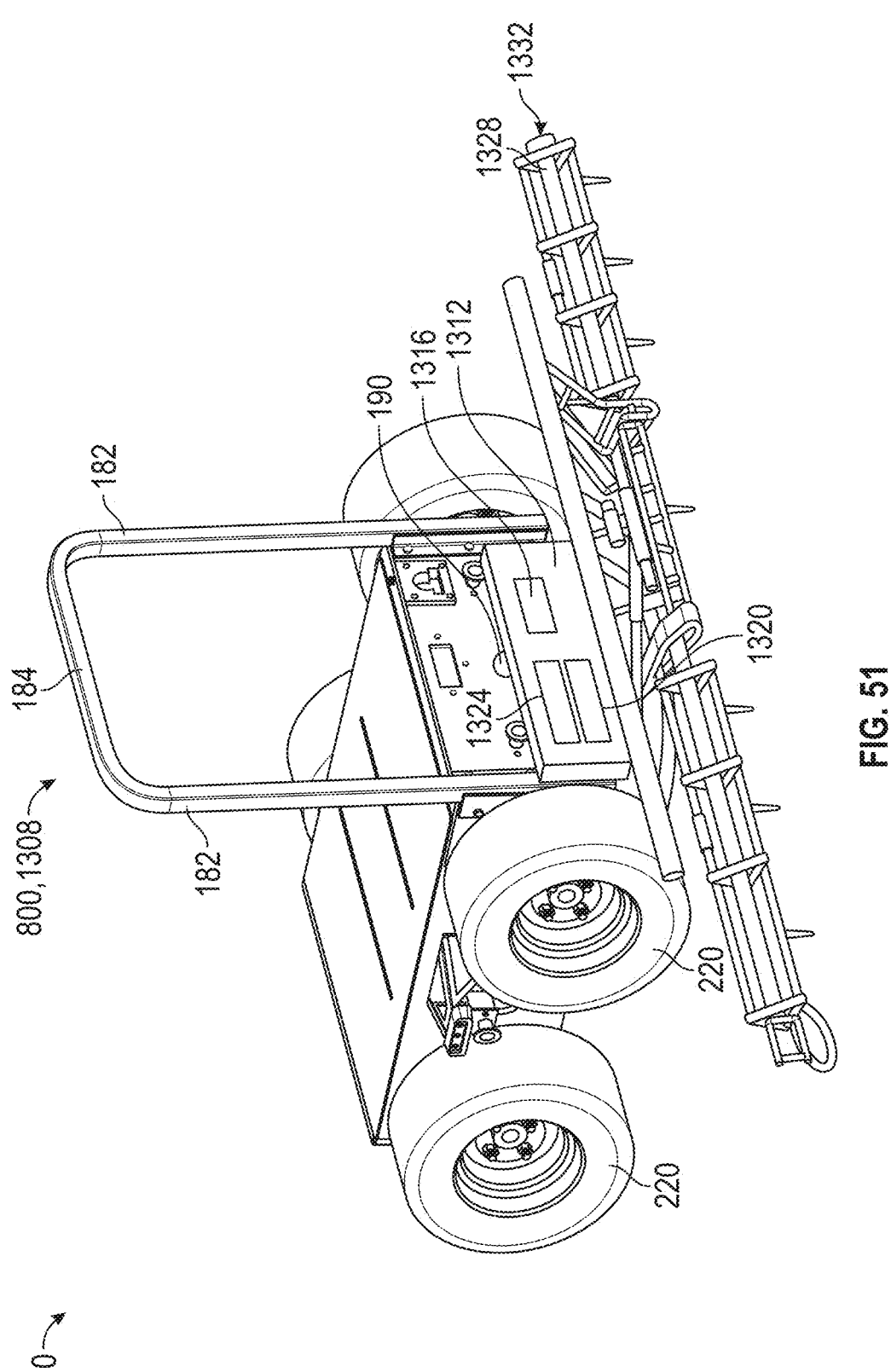
FIG. 51 is a perspective view of the AMR of FIG. 1 with a sprayer attachment, according to another exemplary embodiment.

As shown in FIG. 50, the attachment 800 includes or is configured as an application equipment, shown as sprayer 1308. The sprayer 1308 is configured to apply liquids (e.g., water, fertilizer, pesticides, herbicides, etc.) to the golf course 1226. The sprayer 1308 is configured to engage with the frame assembly 100. The sprayer 1308 includes a holding tank, shown as reservoir 1312, a heating and cooling system, shown as temperature control system 1316, a mixing device, shown as mixer 1320, a pump 1324, an arm, shown as spraying arm 1328, and a dispenser, shown as nozzle 1332. The reservoir 1312 is configured to store the liquid. The temperature control system 1316 is configured to heat or cool the liquid within the reservoir 1312 to a set temperature. The mixer 1320 is configured to mix the liquid. The spraying arm 1328 is configured to receive the liquid, actuate to a desired location (e.g., to direct towards an identified weed, etc.), and the nozzle 1332 is configured to spray the liquid from the spraying arm 1328 to the desired location. In some embodiments, the sprayer 1308 engages with the hitch receiver 190. As shown in FIG. 51, an alternate embodiment of the sprayer 1308 interfaces with the hitch receiver 190. The sprayer 1308 includes a plurality of the nozzles 1332. In some embodiments, the nozzles 1332 are configured to actuate to a desired location (e.g., to point towards the identified weed, etc.). In some embodiments, the sprayer 1308 is configured to spray up to 360 degrees about the AMR 10 (e.g., when the spraying arm 1328 rotates 360 degrees about an axis while spraying the liquid from the nozzles 1332, etc.).

Dew Sweeper Attachment

Figure 52:
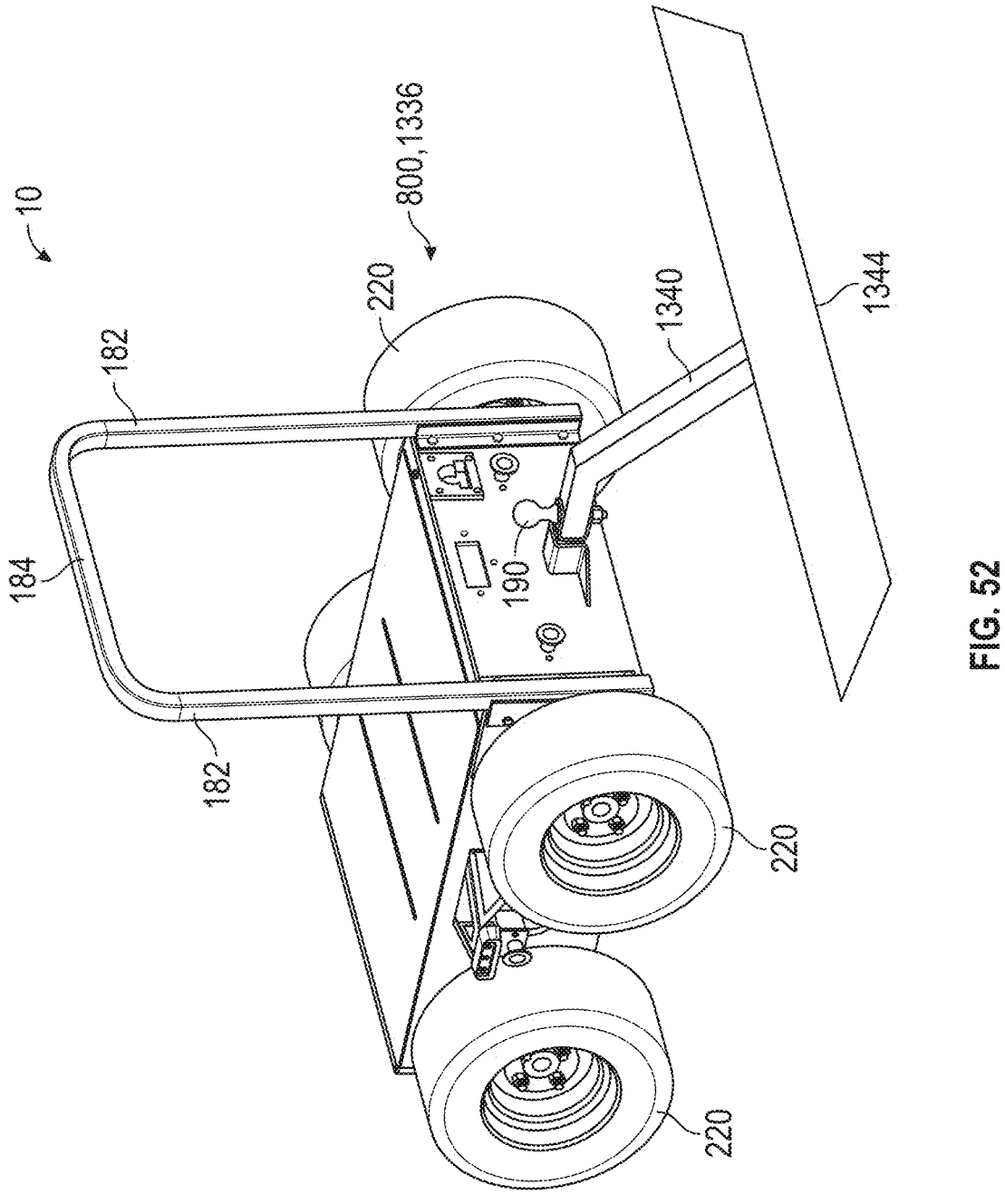
FIG. 52 is a perspective view of the AMR of FIG. 1 with a dew sweeper attachment, according to an exemplary embodiment.

As shown in FIG. 52, the attachment 800 includes or is configured as a sweeper, shown as dew sweeper 1336. The dew sweeper 1336 is configured to remove dew/moisture from the grass of the golf course 1226. The dew sweeper 1336 improves playing conditions by ensuring the grass is dry as opposed to slippery, which may affect the roll of the golf ball 1240. The dew sweeper 1336 also reduces excess moisture, discouraging fungal growth and other turf diseases. The dew sweeper 1336 includes an arm, shown as dew sweeper arm 1340, and a rake, shown as dew sweeper rake 1344. The dew sweeper arm 1340 is configured to interface with the hitch receiver 190. The dew sweeper rake 1344 extends from the dew sweeper arm 1340 and is configured to brush the grass to remove the dew and disperse clippings from the grass.

Entertainment Attachment

Figure 53:
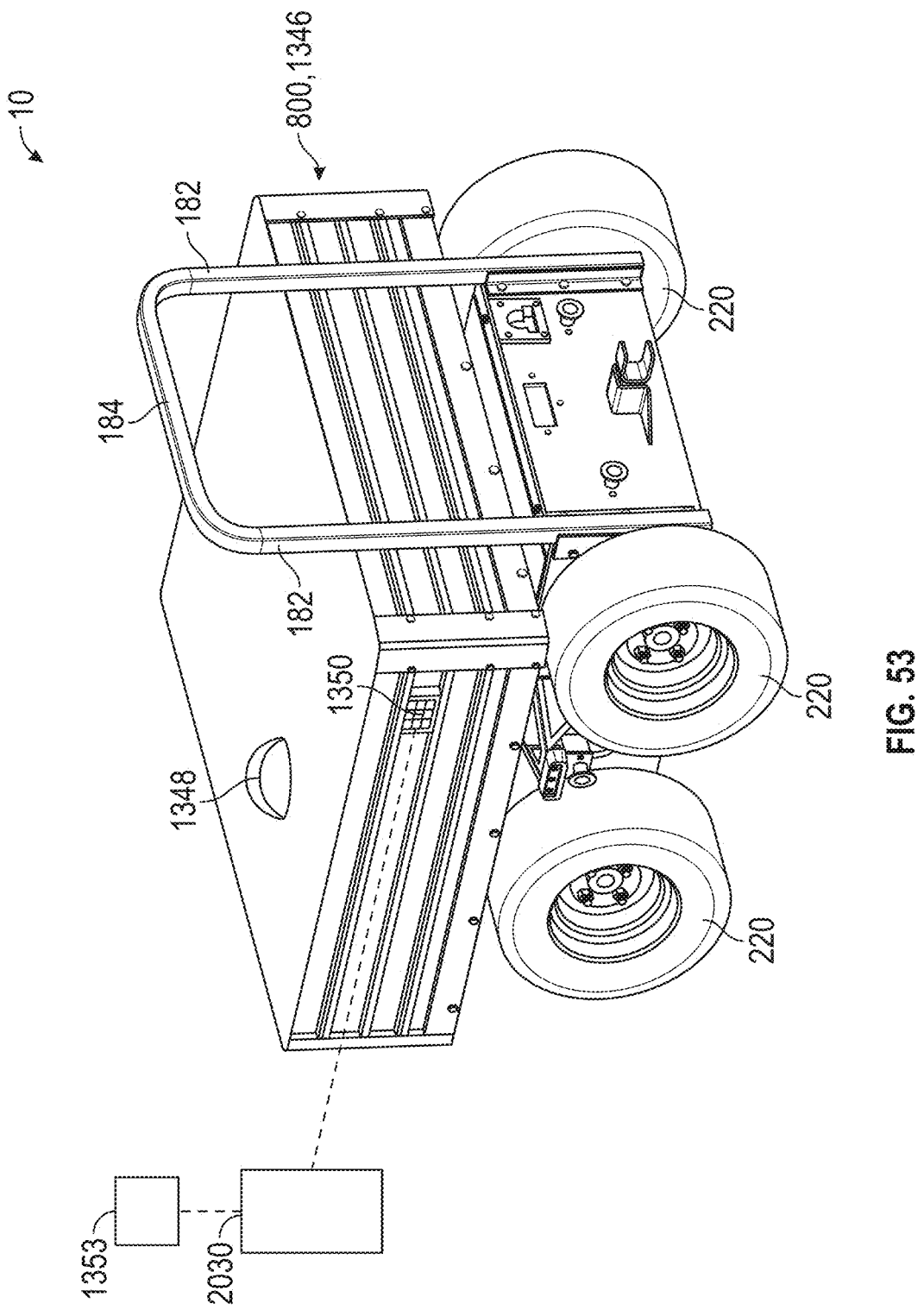
FIG. 53 is a perspective view of the AMR of FIG. 1 with an entertainment attachment, according to an exemplary embodiment.

As shown in FIG. 53, the attachment 800 includes or is configured as an entertainment attachment, shown as entertainment module 1346. The entertainment module 1346 is configured to enhance the experience of the user. The entertainment module 1346 includes a recording device, shown as camera 1348; and noise emitting device, shown as speaker 1350. The camera 1348 is configured to record and broadcast gameplay or views of the golf course 1226. The speaker 1350 is configured to connect to the operator device 2030, and the operator device 2030 is configured to connect to a Wi-Fi hotspot 1353. The Wi-Fi hotspot 1353 enhances user experience by allowing a user to receive service on the operator device 2030 while in areas with low signal levels (e.g., wooded areas, remote areas, etc.). The speaker 1350 is configured to emit audio (e.g., music, sports broadcasting, announcements). In some embodiments, the speaker 1350 is controlled by the operator device 2030 (e.g., to allow the user to customize the audio experience, etc.).

Post Digger Attachment

Figure 54:
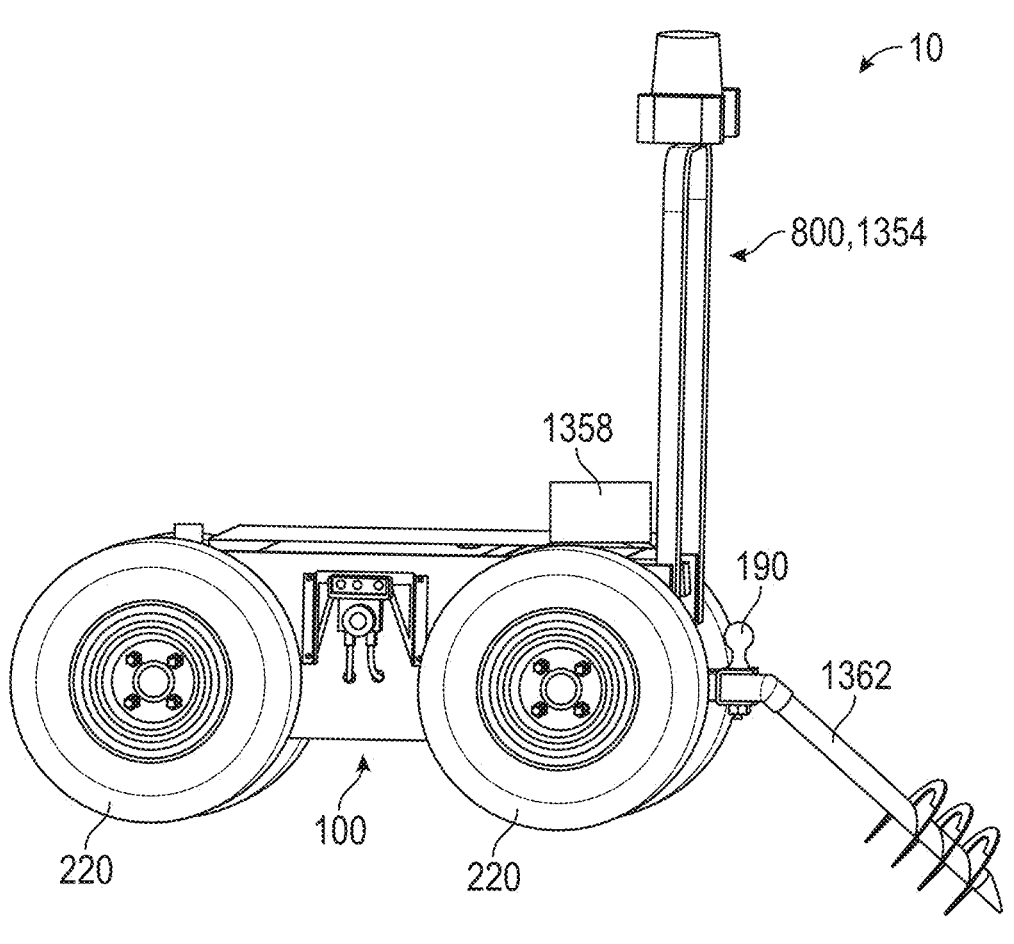
FIG. 54 is a perspective view of the AMR of FIG. 1 with a post digger attachment, according to an exemplary embodiment.

As shown in FIG. 54, the attachment 800 includes or is configured as a digger attachment, shown as a post digger 1354. The post digger 1354 is configured to dig (e.g., for trenches, for posts, etc.). The post digger 1354 includes a digger, shown as auger 1362, and a motor 1358. The motor 1358 is configured to actuate the auger 1362 to dig. The auger 1362 is configured to engage with the hitch receiver 190. The AMR control system 600 is configured to acquire a location where a trench or hole should be dug (e.g., a location where a fence is desired, a location where a fence is being repaired), and control the post digger 1354 to dig a trench or hole at the location.

Bunker Maintenance Attachment

Figure 55:
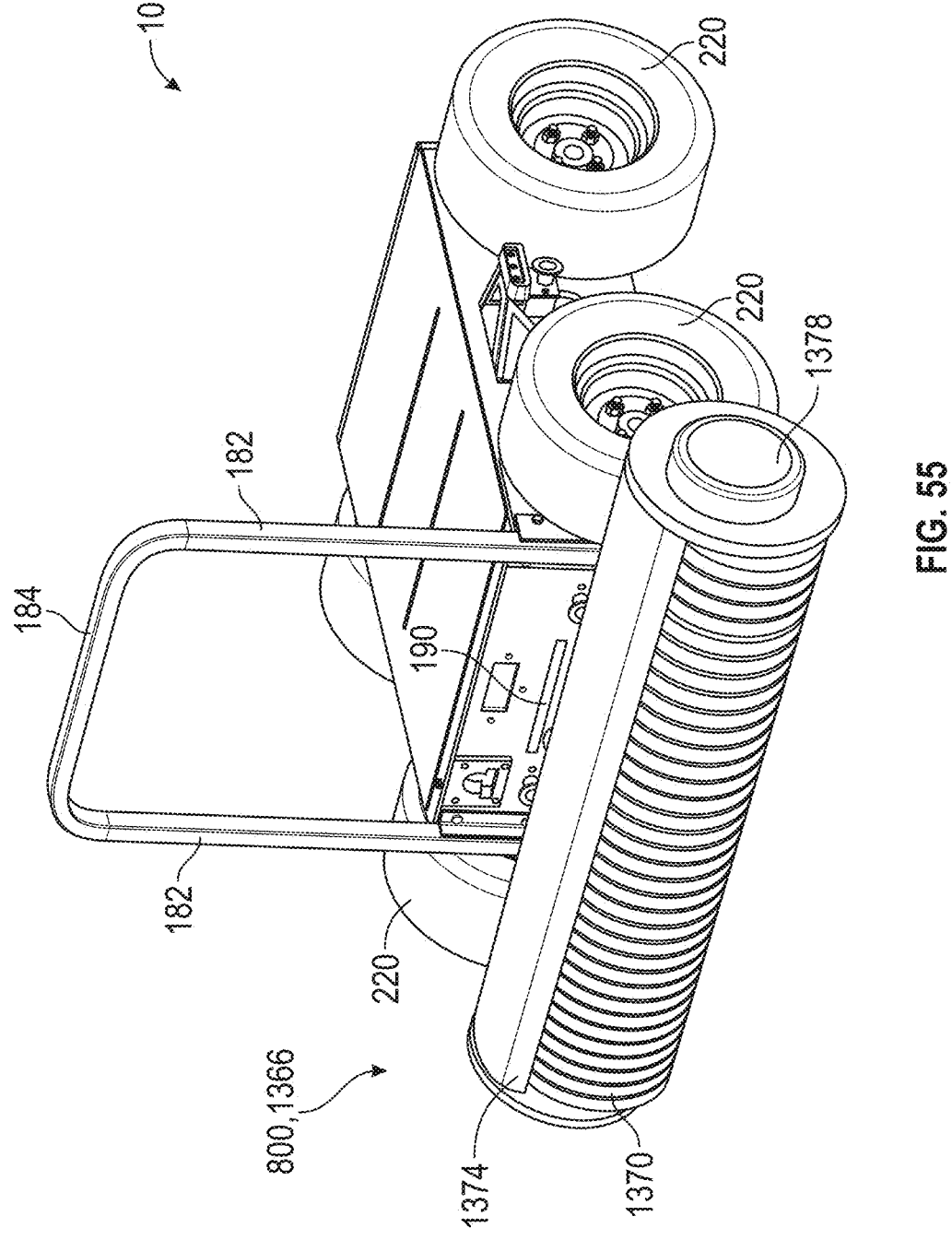
FIG. 55 is a perspective view of the AMR of FIG. 1 with a bunker maintenance attachment, according to an exemplary embodiment.

As shown in FIG. 55, the attachment 800 is an obstacle maintenance attachment, shown as bunker maintenance attachment 1366. The bunker maintenance attachment 1366 is configured to engage with the hitch receiver 190. The bunker maintenance attachment 1366 includes a raker, shown as sand rake 1370, a leveler, shown as sand leveler 1374, and a trimmer, shown as edge trimmer 1378. The sand rake 1370 is configured to rake the sand in a bunker (e.g., hazardous area 1236, etc.), the sand leveler 1374 is configured to level the sand in the bunker to maintain consistent sand depth across the bunker, and the edge trimmer 1378 is configured to maintain a clean edge around the bunker.

Vending Unit Attachment

Figure 56:
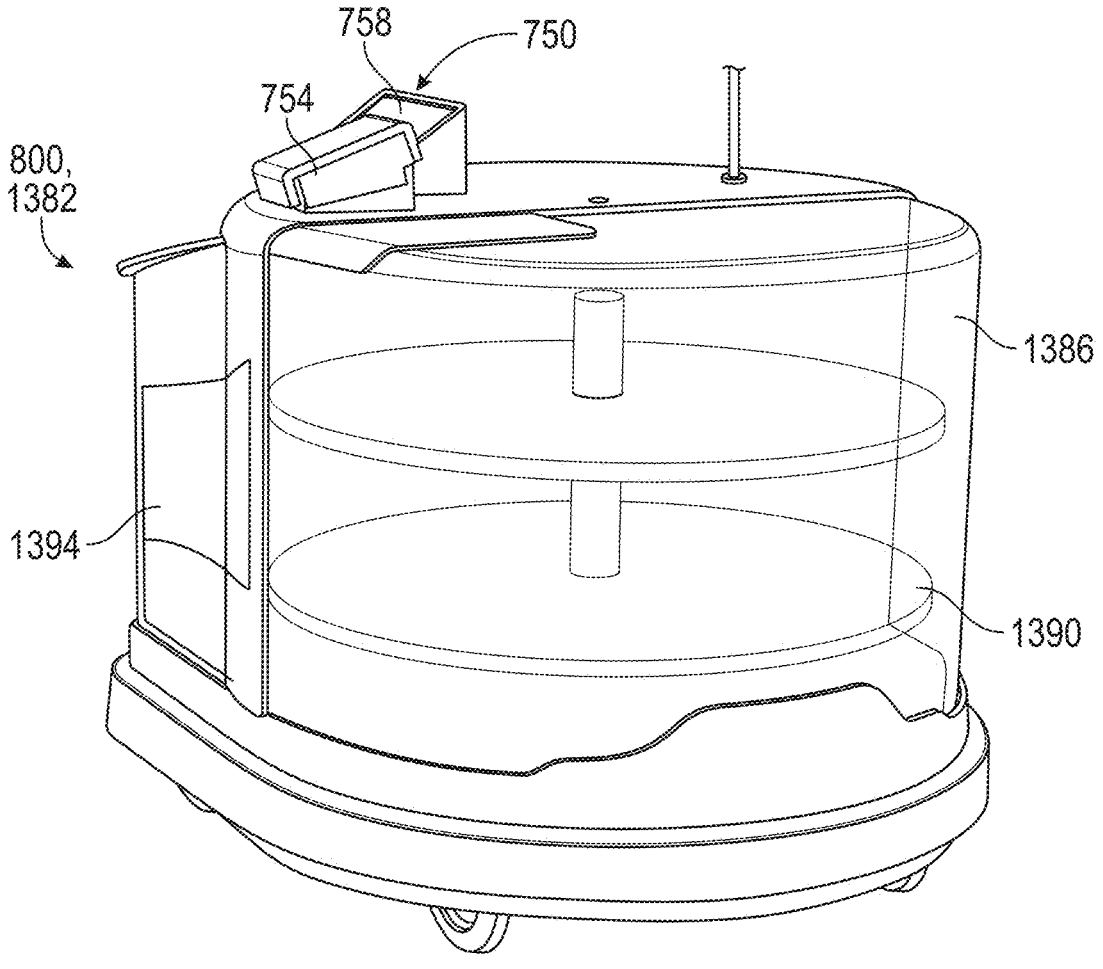
FIG. 56 is a perspective view of a vending unit attachment, according to an exemplary embodiment.
Figure 57:
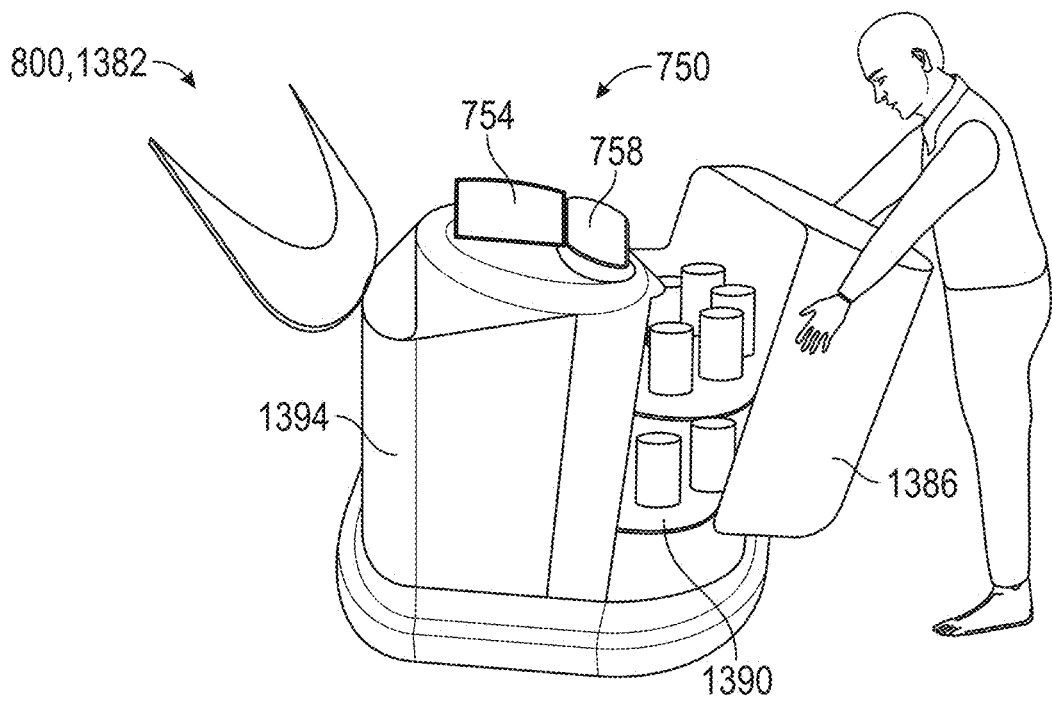
FIG. 57 is a perspective view of the vending unit attachment of FIG. 56, according to an exemplary embodiment.
Figure 58:
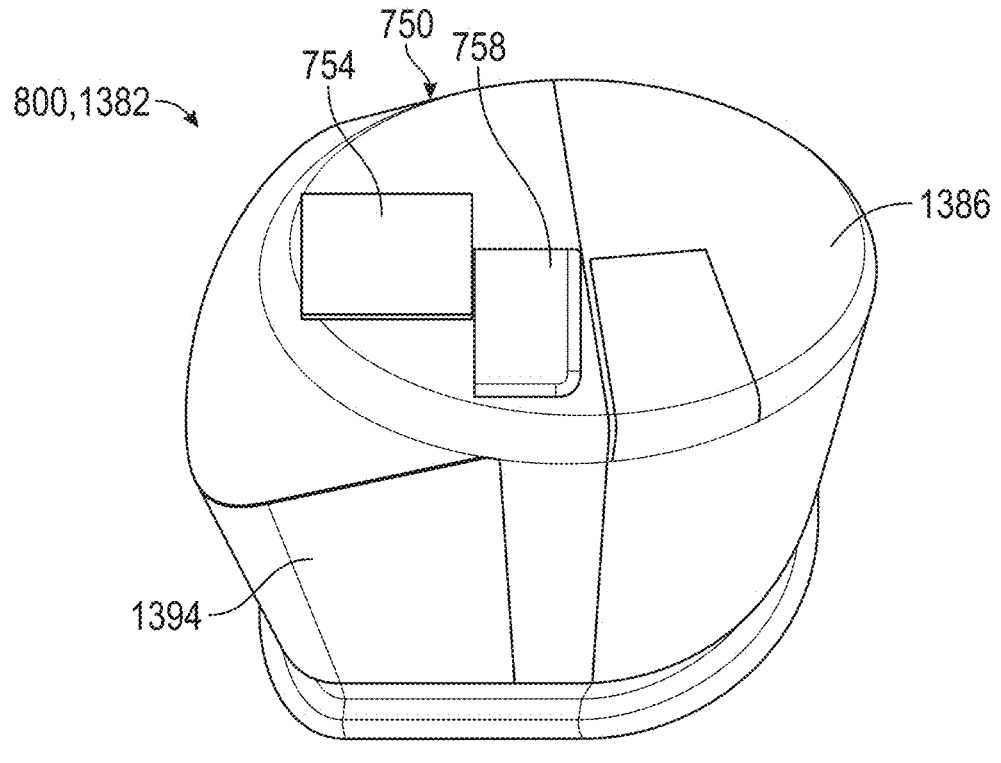
FIG. 58 is a perspective view of the vending unit attachment of FIG. 56, according to an exemplary embodiment.

As shown in FIGS. 56-58, the attachment 800 includes or is configured as a refresher unit, shown as vending unit attachment 1382. The vending unit attachment 1382 may be configured to engage with the hitch receiver 190 to provide products (e.g., beverages, snacks, merchandise, gear, drinks, etc.) to a user. The vending unit attachment 1382 includes a first storage chest, shown as storage chest 1386. The storage chest 1386 includes storage racks, shown as shelving 1390, configured to store refrigerated or heated products. The vending unit attachment 1382 includes a second storage chest, shown as dry storage 1394, configured to store non-temperature controlled products (e.g., snacks, golf balls, golf gloves, etc.). The vending unit attachment 1382 includes the user interface 750. The user interface 750 includes a first user interface 754 and a second user interface, shown as payment interface 758. The first user interface 754 is configured to provide options to the user. For example, the first user interface 754 may provide product options to a user to buy or fill orders to an employee. The payment interface 758 is configured to accept payment from a user (e.g., by card, by mobile payment, by member ID, etc.).

Figure 59:
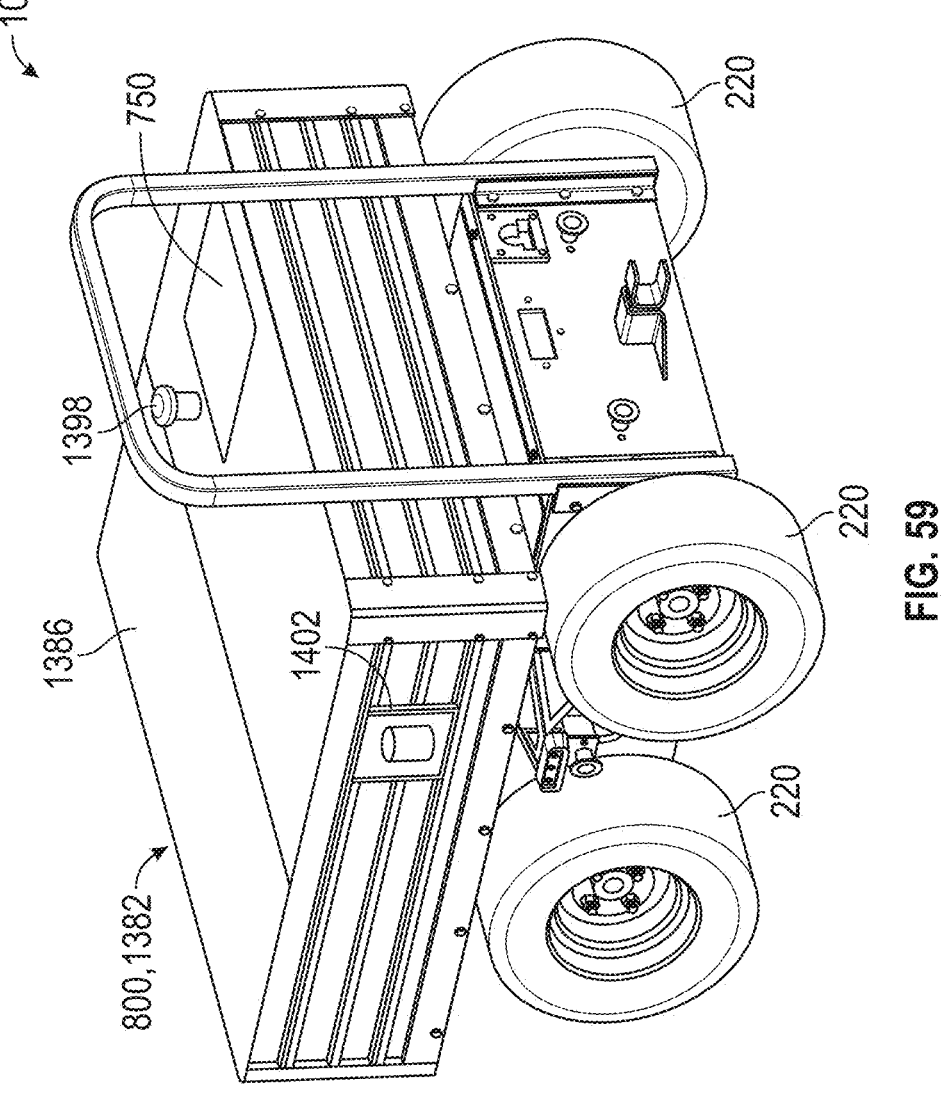
FIG. 59 is a perspective view of the AMR of FIG. 1 with a vending unit attachment, according to another exemplary embodiment.

As shown in FIG. 59, an alternate embodiment of the vending unit attachment 1382 is configured to engage with the frame assembly 100. The vending unit attachment 1382 includes an identification device, shown as camera 1398, configured to identify a user. The vending unit attachment 1382 is configured to open the storage chest 1386 if the correct user is identified. For example, if a user pre-paid for three beverages, the camera 1398 identifies the user and dispenses the beverages to the user. The vending unit attachment 1382 includes a dispenser, shown as hot beverage dispenser 1402. The hot beverage dispenser 1402 is configured to dispense hot beverages (e.g., coffee, tea, etc.) to the user.

Figure 60:
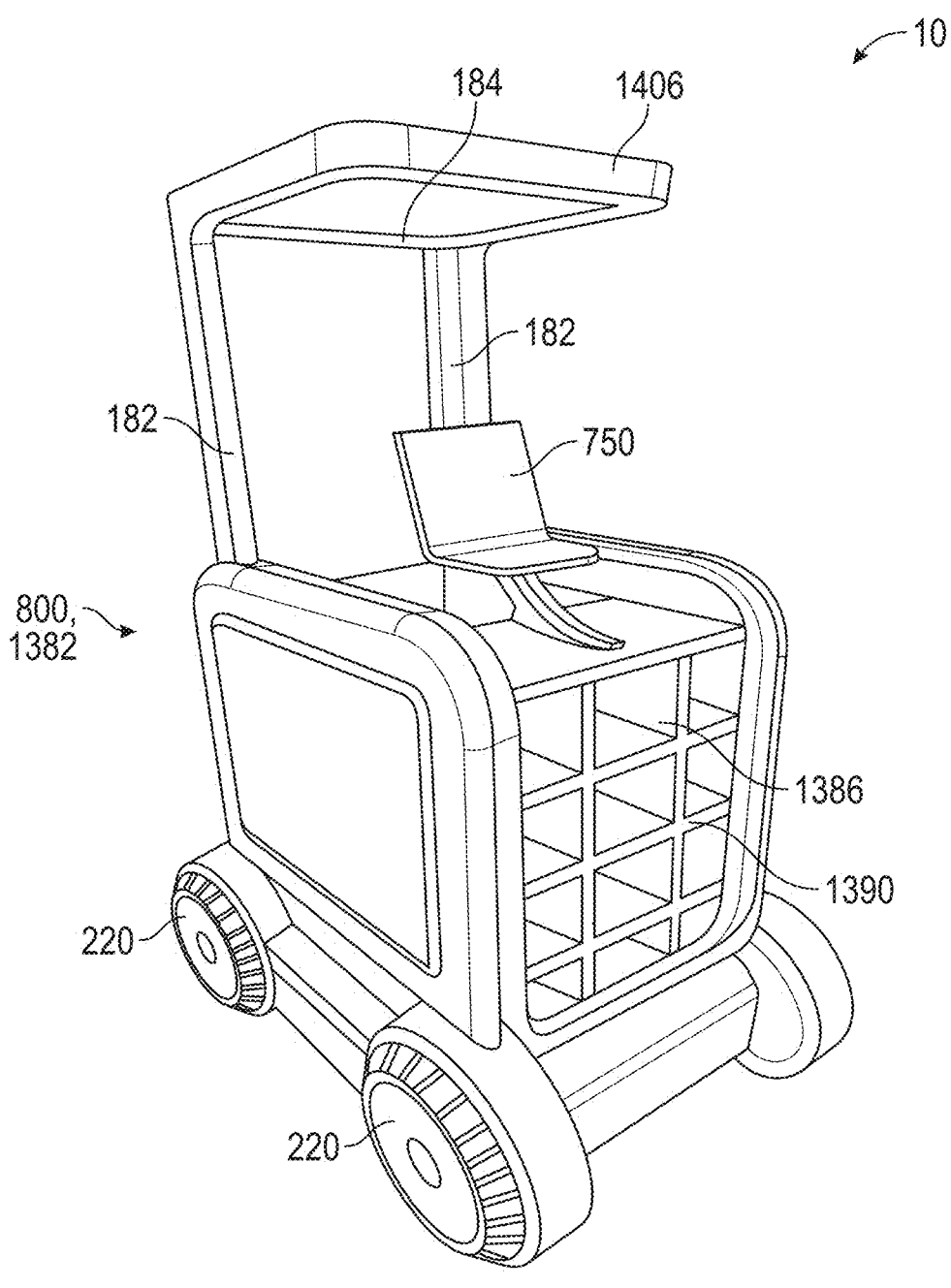
FIG. 60 is a perspective view of the AMR of FIG. 1 with a vending unit attachment, according to another exemplary embodiment.
Figure 61:
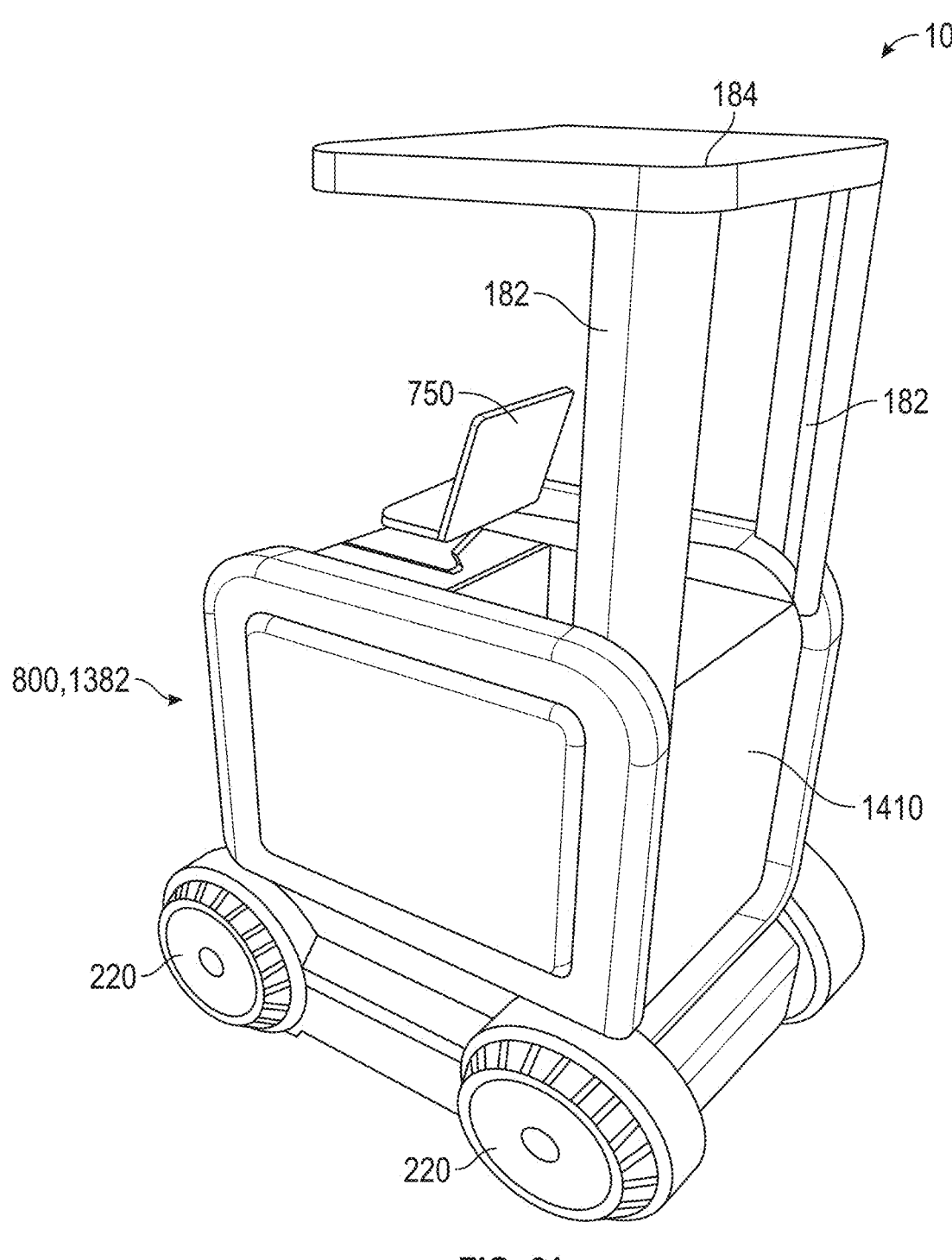
FIG. 61 is another perspective view of the AMR of FIG. 60 with the vending unit attachment, according to an exemplary embodiment.

As shown in FIGS. 60 and 61, an alternate embodiment of the vending unit attachment 1382 is configured to engage with the frame assembly 100. The storage chest 1386 is open to expose the shelving 1390. The vending unit attachment 1382 also includes a shading mechanism, shown as canopy 1406, and a basket, shown as detachable basket 1410. The canopy 1406 extends from the crossbar 184. The canopy 1406 is configured to provide shade to the user interface 750, reducing glare. The detachable basket 1410 is configured to receive products. For example, the shelving 1390 is configured to supply towels to users and the detachable basket 1410 is configured to receive used towels for laundering. In some embodiments, the AMR 10 including the vending unit attachment 1382 is configured to traverse an area, identify users without a product, and approach the user to give the user access to the product.

Method of Implementing Tasks in Accordance with Attachment

Figure 62:
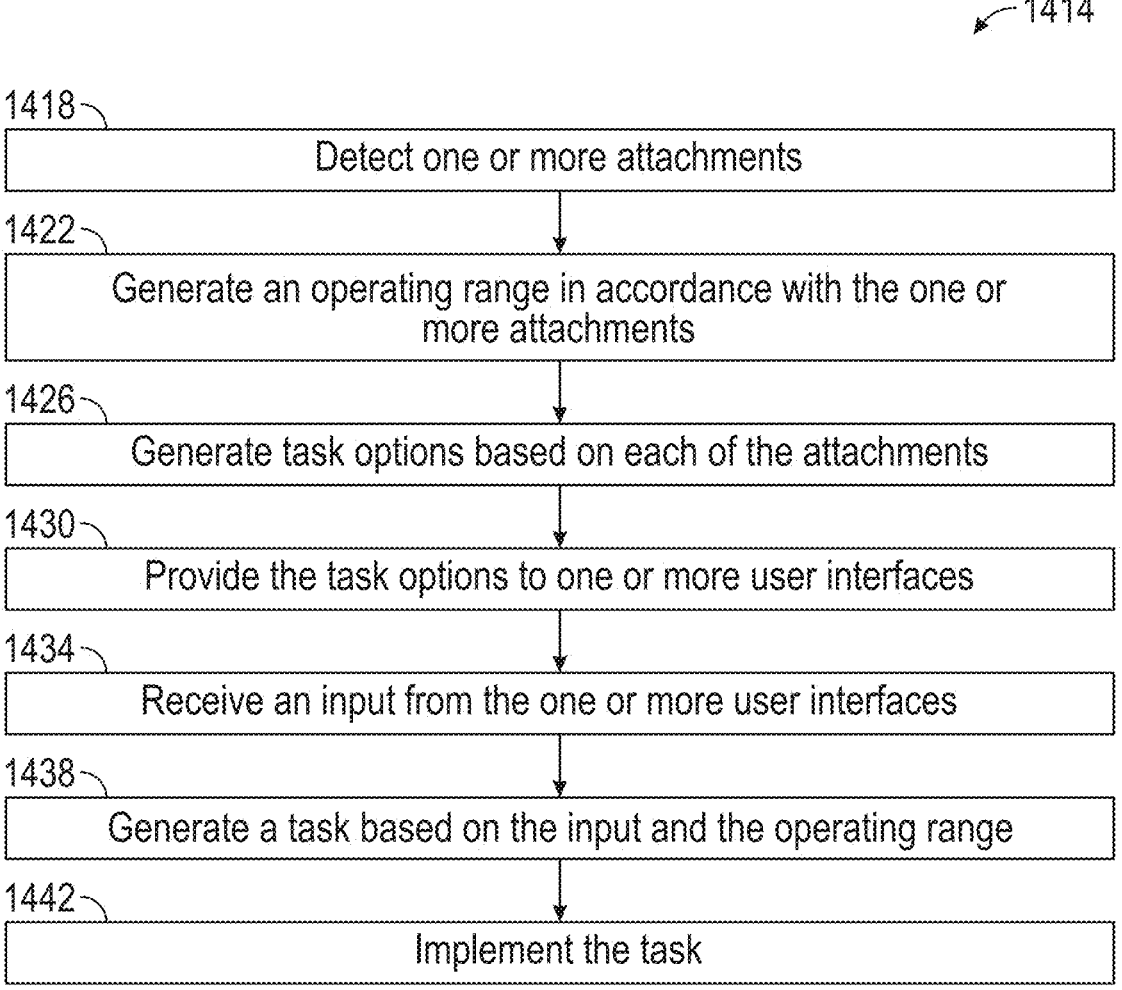
FIG. 62 is a flow diagram of a method for implementing a task based on an attachment, according to an exemplary embodiment.
Figure 63:
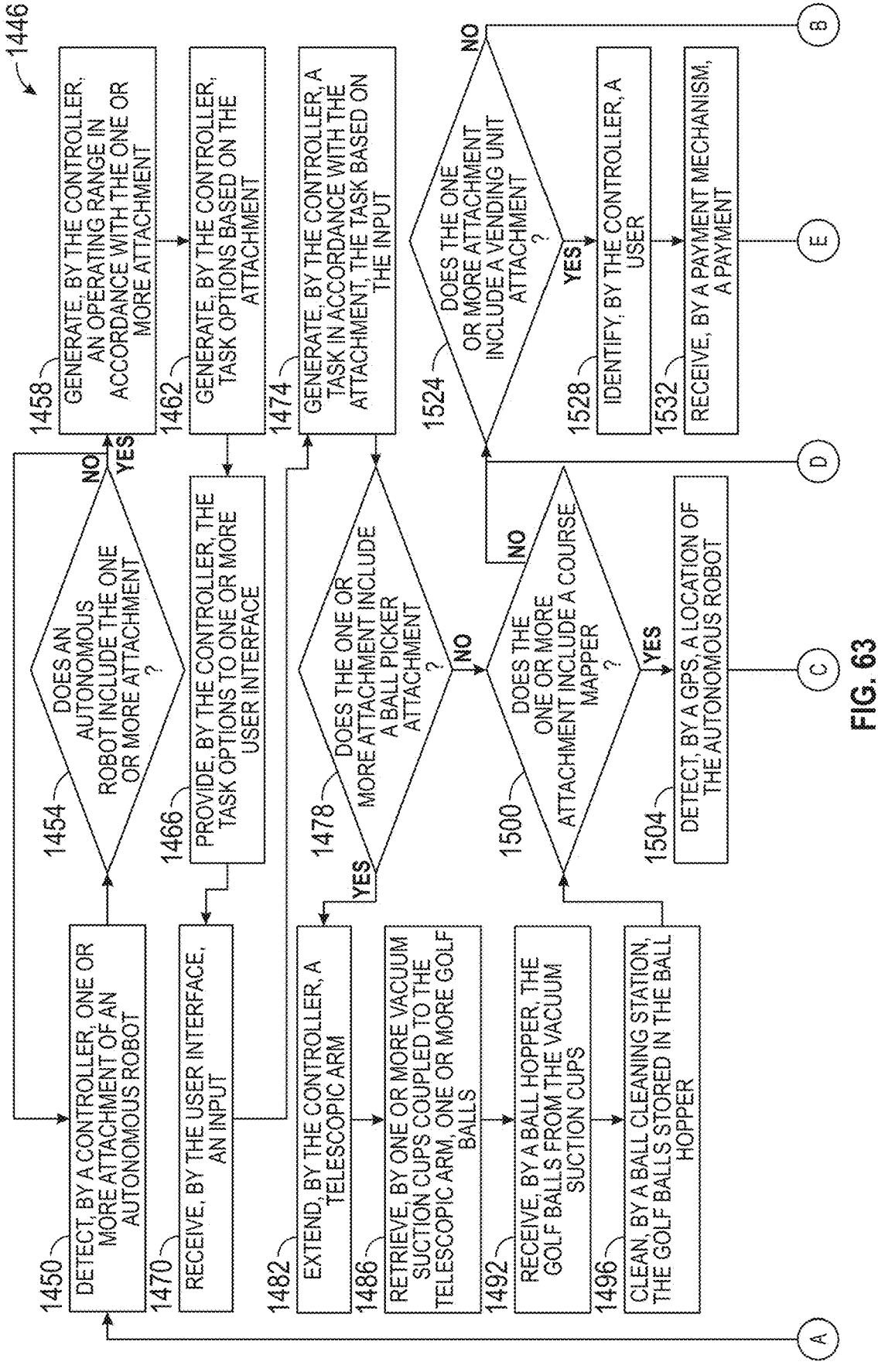
FIG. 63 is a flow diagram of a method for implementing a task based on an attachment, according to an exemplary embodiment.
Figure 63:
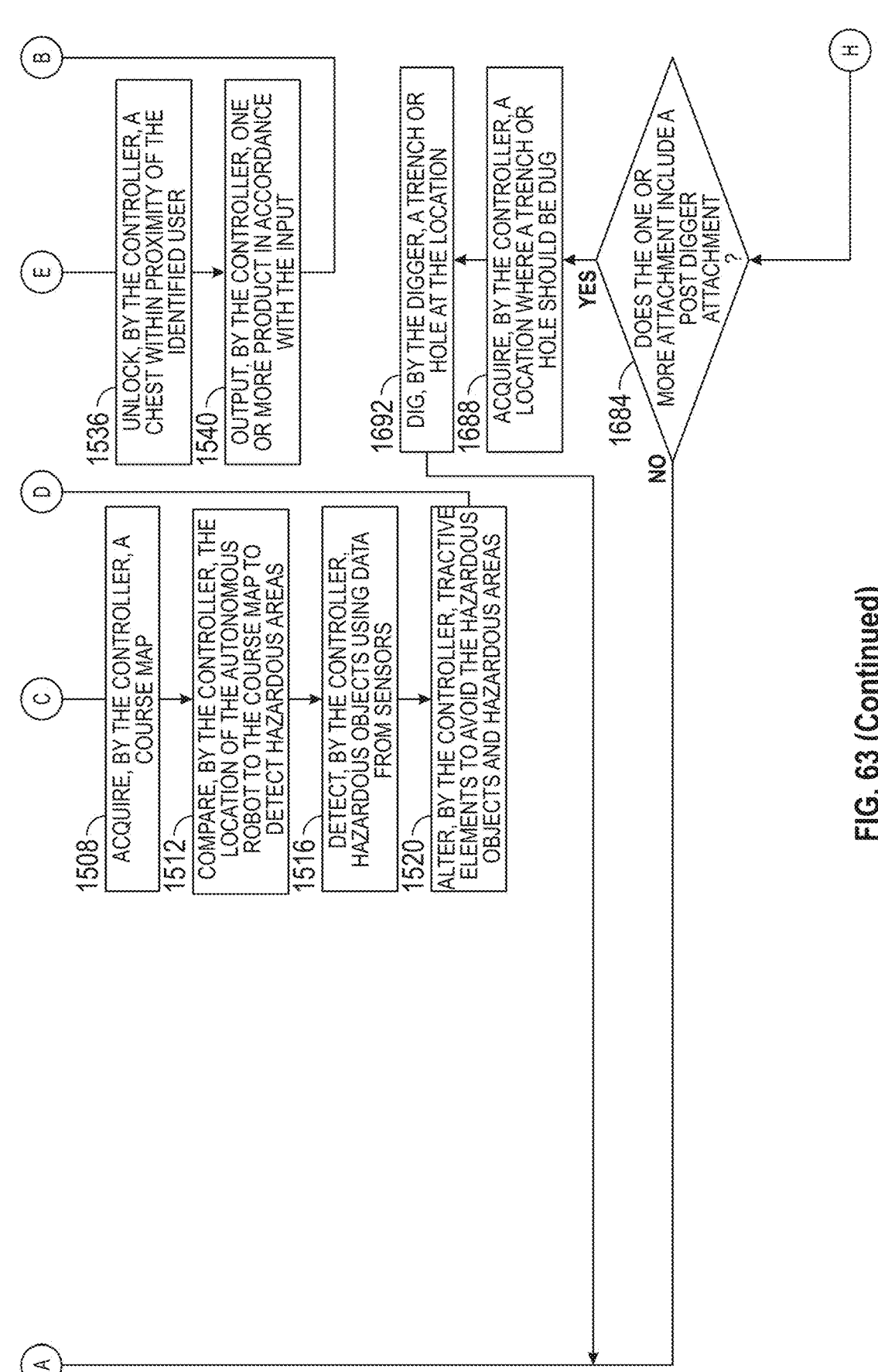
Figure 63:
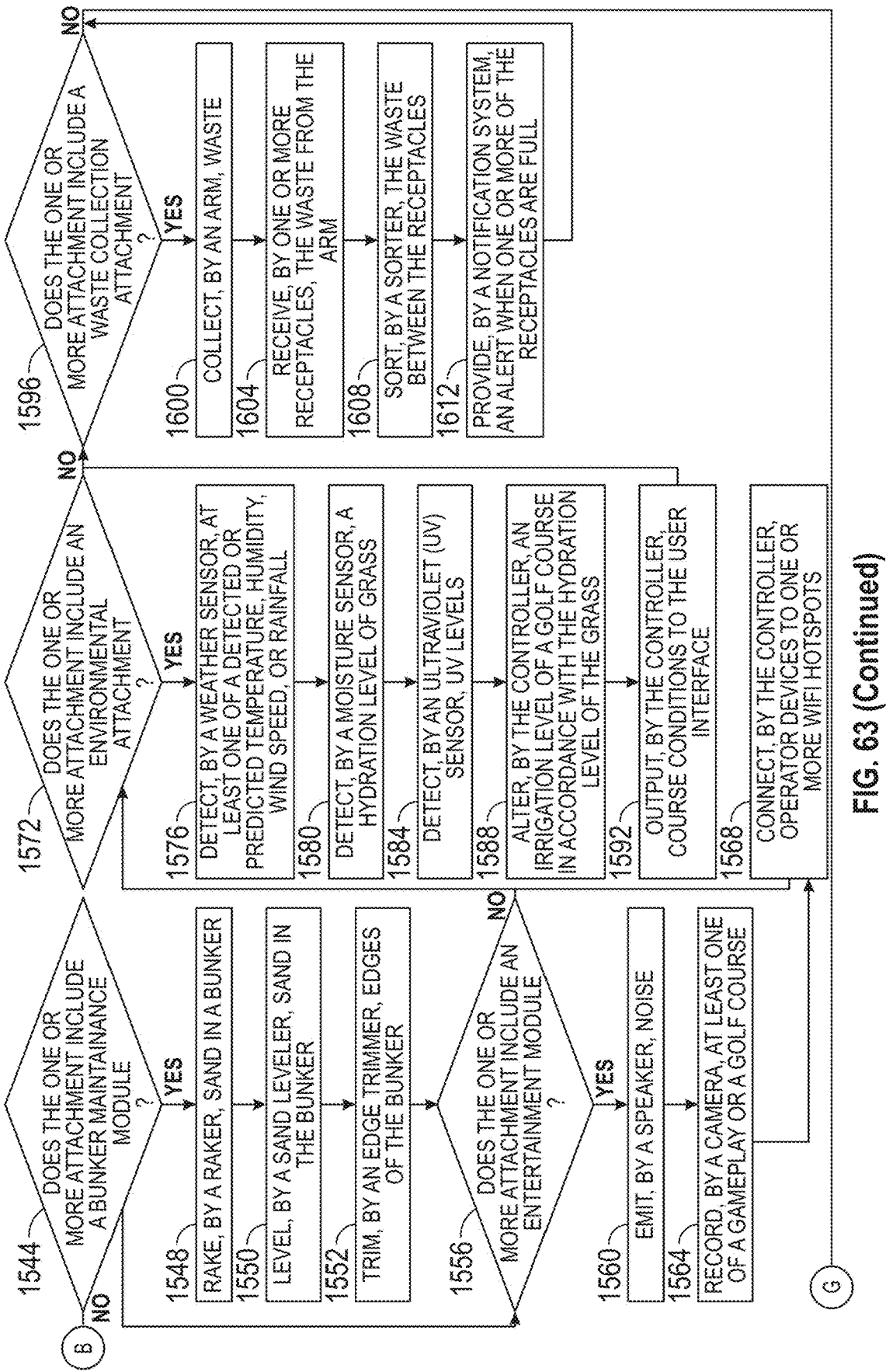
Figure 63:
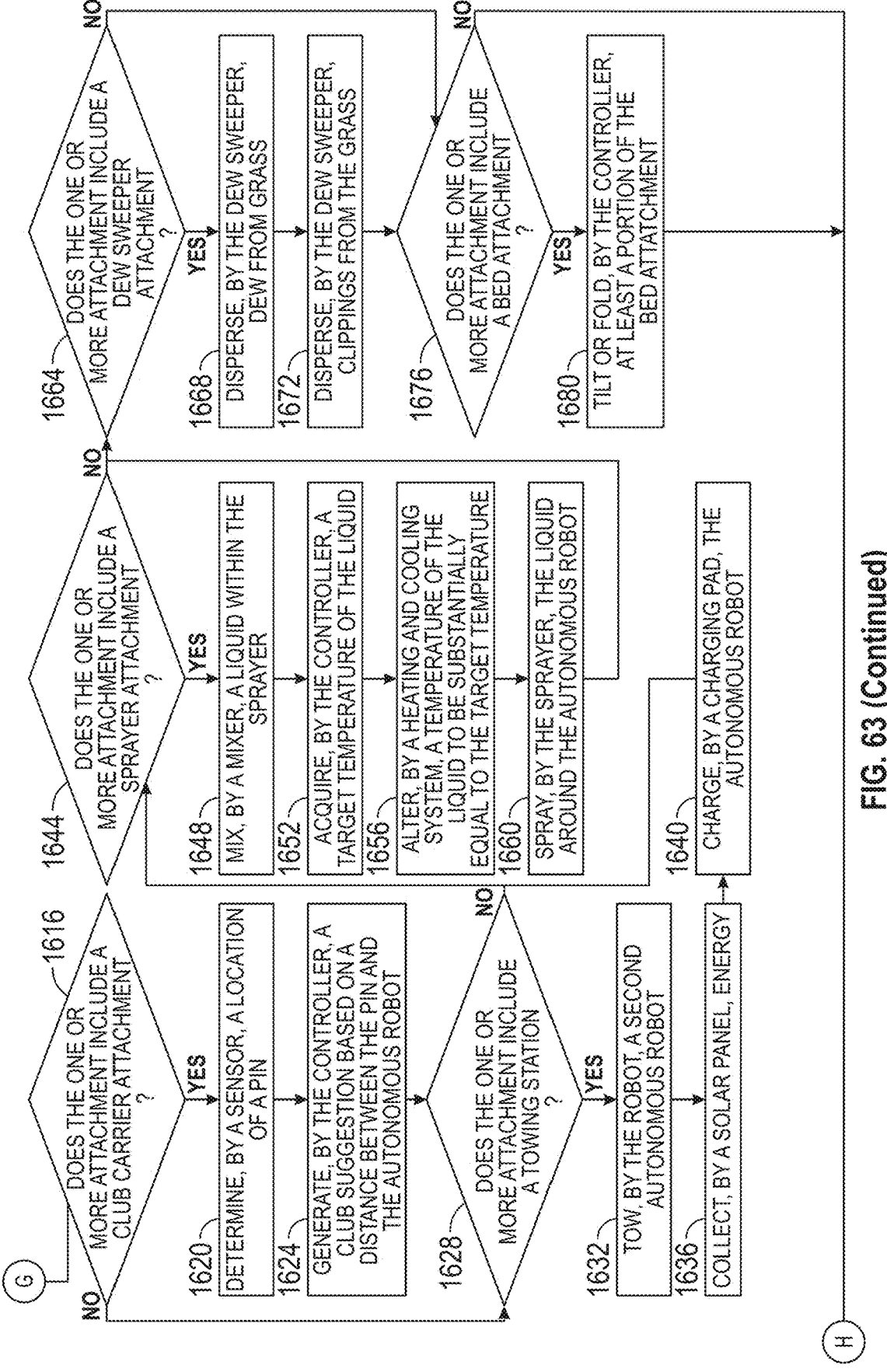

FIGS. 62 and 63 show methods 1414 and 1446 for implementing a task based on the attachment(s) 800 coupled to the AMR 10. The methods 1414 and 1446 may be performed by one or more processing circuits of the AMR control system 600, the wireless controller 700, and/or the remote systems 2040.

As shown in FIG. 62, the method 1414 is a method for implementing a task based on the attachment 800. At step 1418, the one or more processing circuits are configured to detect one or more attachments 800. The one or more processing circuits may detect that the one or more attachments 800 are interfacing with the hitch receiver 190 and/or the frame assembly 100. At step 1422, the one or more processing circuits are configured to generate an operating range in accordance with the one or more attachments 800. The operating range includes one or more of a speed, acceleration, grade climbing capability, or a turn radius. The operating range is generated in accordance with one or more of the center of gravity of the AMR 10, the mass of the AMR 10, the volume of the AMR 10, and/or the products transported by the AMR 10. For example, the bed attachment 900 may increase the center of gravity and increase the mass. Therefore, the grade limits and the speed of the AMR 10 may be reduced to compensate. In another example, the attachment 800 is the vending unit attachment 1382. Therefore, the speed and acceleration may decrease to prevent shaking the products (e.g., beverages).

At step 1426, the one or more processing circuits are configured to generate task options based on each of the attachments 800. The task options include an area, a time frame, and/or tasks associated with the attachment 800. For example, the one or more processing circuits may identify the attachment 800 is the towing attachment 1294, and the task options may include specifically towing a second AMR 1296 or patrolling an area for a broken second AMR 1296 to tow. In another example, the one or more processing circuits may identify the attachment 800 is a sprayer 1308, and the task options may include applying fertilizer, pesticide, or water and to which area. At step 1430, the one or more processing circuits are configured to provide the task options to the one or more user interfaces (e.g., the wireless controller 700, the user interface 750, the operator device 2030, etc.). At step 1434, the one or more processing circuits are configured to receive an input from the one or more the user interfaces. The input is a selection of a respective task option. At step 1438, the one or more processing circuits are configured to generate a task in accordance with the attachment 800 based on the input and the operating range. At step 1442, the one or more processing circuit is configured to implement the task. The tasks will be discussed in depth in method 1446 below.

As shown in FIG. 63, the method 1446 is a method for implementing a task based on the attachment 800. At step 1450, the one or more processing circuits are configured to detect one or more attachments of the AMR 10. At step 1454, the one or more processing circuits are configured to detect if the AMR 10 includes the one or more attachments 800. If the one or more processing circuits does not determine that the AMR 10 includes the one or more attachment 800s, step 1450 is repeated. If the one or more processing circuits detect the one or more attachments 800, the one or more processing circuits are configured continue to step 1458 and generate an operating range in accordance with the one or more attachments 800. At step 1462, the one or more processing circuits are configured to generate task options based on the one or more attachments 800. At step 1466, the one or more processing circuits are configured to provide the task options to one or more user interfaces (e.g., the wireless controller 700, the user interface 750, the operator device 2030, etc.). At step 1470, the one or more processing circuits are configured to receive an input from the one or more the user interfaces. The input is a selection of a respective task option. At step 1474, the one or more processing circuits are configured to generate a task in accordance with the attachment based on the input and the operating range.

At step 1478, the one or more processing circuits is configured to determine if the attachment includes the ball picker attachment 1200. If the one or more processing circuits determines there is a ball picker attachment 1200, the one or more processing circuits are configured to proceed to step 1482. At step 1482 the one or more processing circuits are configured to extend the telescopic arm 1202. At step 1486, the suction cups 1206 are configured to retrieve one or more golf balls. At step 1492, the ball hopper 1208 is configured to receive the golf balls from the suction cups 1206. At step 1496, the ball cleaning station 1212 is configured to clean the golf balls. In some embodiments, such as when the ball picker attachment 1200 interfaces with the hitch receiver 190, step 1482 is omitted, during step 1486, the drum 1224 is configured to rotate and the retrieve the one or more golf balls within the gaps between disks 1222, and at step 1492, the baskets 1225 are configured to receive the golf balls.

At step 1500, the one or more processing circuits are configured to determine if the attachment 800 includes the course mapping attachment 1289. If the one or more processing circuits do not detect the ball picker attachment 1200 at step 1478, the one or more processing circuits are also configured to continue to step 1500. If the attachment 800 does include a course mapping attachment 1289, the method is configured to proceed to step 1504. At step 1504, the GPS 1290 is configured to determine a location of the AMR 10. At step 1508, the one or more processing circuits is configured to acquire a course map. The course map includes layout information (e.g., greens, fairways, hazardous areas 1236, hazardous objects 1238, cart paths 1234, etc.). At step 1512, the one or more processing circuits are configured to compare the location of the AMR 10 to the course map to detect hazardous areas 1236 and hazardous objects 1238. At step 1516, the one or more processing circuits are configured to detect the hazardous objects 1238 using data from the sensor system 400. At step 1520, the one or more processing circuits are configured to alter the wheels 220 (e.g., a direction of the wheels, a speed of the wheels, an acceleration of the wheels, etc.) to avoid the hazardous objects 1238 and the hazardous areas 1236.

At step 1524, the one or more processing circuits are configured to determine if the attachment 800 includes the vending unit attachment 1382. If the attachment 800 does not include the course mapping attachment 1289 at step 1500, the method also proceeds to step 1524. If the one or more processing circuits detect the vending unit attachment 1382, the method is configured to proceed to step 1528. At step 1528, the one or more processing circuits are configured to identify a user (e.g., via the camera 1348, etc.). At step 1532, the payment interface 758 is configured to receive payment from the user (e.g., by card, by mobile payment, etc.) At step 1536, the payment interface 758 is configured to unlock one or more of a storage chest 1386 or a dry storage 1394 within proximity of the identified user. The storage chest 1386 and the dry storage 1394 are opened in accordance with input received by the first user interface 754 (e.g., in accordance with the requested product location, etc.). At step 1540 the one or more processing circuits are configured to output one or more product in accordance with the input. For example, the hot beverage dispenser 1402 may output a tea in accordance with the input from the user interface 750 that hot tea is requested after receiving payment to the payment interface 758. In some embodiments, the identity of the user is linked to a payment account, and the storage chest 1386 and the dry storage 1394 open automatically in accordance with recorded preferences of the user or prepaid products (e.g., the storage chest 1386 and/or the dry storage 1394 open automatically within proximity of a user in in accordance with determining the identity of the user and that the user has an associated payment method saved, etc.).

At step 1544, the one or more processing circuits are configured to determine if the attachment 800 includes the bunker maintenance attachment 1366. If the one or more processing circuits do not include the vending unit attachment 1382 at step 1524, the one or more processing circuits are also configured to continue to step 1544. If the attachment 800 includes the bunker maintenance attachment 1366, the method continues to step 1548. At step 1548, the sand rake 1370 is configured to rake sand of the bunker. At step 1550, the sand leveler 1374 is configured to level the send in the bunker. At step 1552, the edge trimmer 1378 is configured to trim edges of the bunker.

At step 1556, the one or more processing circuits are configured to determine if the attachment 800 includes the entertainment module 1346. If the one or more processing circuits do not include the bunker maintenance attachment 1366 at step 1544, the one or more processing circuits are also configured to continue to step 1556. If the attachment 800 includes the entertainment module 1346, the method continues to step 1560. At step 1560, the speaker 1350 is configured to emit a noise. At step 1564, the camera 1348 is configured to record at least one of a gameplay or a portion of the golf course 1226. At step 1568, the one or more processing circuits are configured to connect the operator device 2030 to the Wi-Fi hotspot 1353.

At step 1572, the one or more processing circuits are configured to determine if the attachment 800 includes the environmental attachment 1257. If the one or more processing circuits do not include the entertainment module 1356 at step 1556, the method is configured to continue to step 1572. If the attachment 800 includes the environmental attachment 1257, the method continues to step 1576. At step 1576, the one or more weather sensor 1258 is configured to detect at least one of a detected or predicted temperature, humidity, wind speed, or rainfall. At step 1580, the one or more moisture sensor 1259 is configured to detect a hydration level of grass. At step 1584, the UV sensor 1260 is configured to detect UV levels. At step 1588, the one or more processing circuits are configured to alter an irrigation level of the one or more holes 1228 in accordance with the hydration levels of the grass. For example, if a section of the golf course 1226 has levels of hydration below a first threshold, the one or more processing circuits are configured to increase the level of irrigation of the irrigation system 1239 (e.g., increase the flow of water to the measured section of the golf course 1226, etc.). At step 1592, the one or more processing circuits are configured to current and predicted output course conditions (e.g., temperature, UV index, rainfall, etc.) to the user interface 750.

At step 1596, the one or more processing circuits are configured to determine if attachment 800 includes the waste collection attachment 1262. If the one or more processing circuits do not include the environmental attachment 1257 at step 1572, the one or more processing circuits are also configured to continue to step 1596. If the one or more processing circuits determine the attachment 800 includes the waste collection attachment 1262, the method continues to step 1600. At step 1600, the arm 1264 is configured to collect waste (e.g., by extending and pinching waste, by telescoping and suctioning waste, etc.). At step 1604, the one or more receptacles 1272 are configured to receive the waste from the arm 1264 (e.g., by the arm dropping the waste within the receptacles 1272, etc.). At step 1608, the waste sorter 1284 is configured to sort the waste between the one or more receptacles 1272 (e.g., between trash and recycling, between paper products and glass products, between lawn products such as leaves and human made waste, etc.). At step 1612 the notification system 1288 is configured to provide an alert when one or more of the one or more receptacles 1272 is full.

At step 1616, the one or more processing circuits are configured to determine if attachment 800 includes a club carrier attachment 1244. If the one or more processing circuits do not include the waste collection attachment 1262 at step 1596, the one or more processing circuits are also configured to continue to step 1616. If the one or more processing circuits determine the attachment 800 includes the club carrier attachment 1244, the method continues to step 1620. At step 1620, the sensor system 400 determines a location of the pin 1232. At step 1624, the one or more processing circuits are configured to generate a club suggestion based on a distance between the pin 1232 and the AMR 10 (e.g., the one or more processing circuits determine a location of the AMR 10 and compare the location of the AMR 10 to the location of the pin 1232 to suggest an appropriate club, etc.). In some embodiments, the one or more processing circuits also compares a preloaded golf course 1226 map that includes hazardous areas 1236 and hazardous objects 1238 with the location of the AMR 10 and the location of the pin 1232 to generate a club suggestion (e.g., the AMR 10 is within a hazardous areas 1236 such as a bunker so a sand wedge is recommended, etc.).

At step 1628, the one or more processing circuits are configured to determine if the attachment 800 includes the towing attachment 1294. If the one or more processing circuits do not include the club carrier attachment 1244 at step 1616, the one or more processing circuits are also configured to continue to step 1628. If the one or more processing circuits determine the attachment 800 includes the towing attachment 1294, the method continues to step 1632. At step 1632, the AMR 10 is configured to tow the second AMR 1296 (e.g., via interfacing with a hitch receiver 190, etc.). At step 1636, the solar panel 1300 is configured to collect energy. At step 1640, the inductive charging pad 1304 is configured to charge the AMR 10.

At step 1644, the one or more processing circuits are configured to determine if the attachment 800 includes a sprayer 1308. If the one or more processing circuits do not include the towing attachment 1294 at step 1628, the one or more processing circuits are also configured to continue to step 1644. If the one or more processing circuits determine the attachment 800 includes the sprayer 1308, the method is configured to continue to step 1648. At step 1648, the mixer 1320 is configured to mix the liquid (e.g., fertilizer, pesticide, etc.) within the sprayer 1308. At step 1652, the one or more processing circuits are configured to acquire a target temperature of the liquid. At step 1656, the temperature control system 1316 is configured to alter a temperature of the liquid to be substantially equal to the target temperature. Altering the temperature includes heating or cooling the liquid. At step 1660, the sprayer 1308 is configured to spray liquid around the AMR 10. Spraying the liquid around the AMR 10 includes actuating the nozzles 1332 and/or the spraying arm 1328 to be directed to a desired location (e.g., towards an identified weed, towards and identified dry patch of grass, towards landscaped flowers, 360 degrees about the AMR 10, etc.).

At step 1664, the one or more processing circuits are configured to determine if the attachment 800 includes a dew sweeper 1336. If the one or more processing circuits do not include the sprayer 1308 at step 1644, the one or more processing circuits are also configured to continue to step 1664. If the one or more processing circuits determine the attachment 800 includes the dew sweeper 1336, the method continues to step 1668. At step 1668, the dew sweeper 1336 is configured to disperse dew from the grass. At step 1672 the dew sweeper 1336 is configured to disperse clippings from the grass.

At step 1676, the one or more processing circuits are configured to determine if the attachment 800 includes a bed attachment (e.g., pivoting bed, rotating bed, etc.). If the one or more processing circuits do not include the dew sweeper 1336 at step 1664, the one or more processing circuits are also configured to continue to step 1676. If the one or more processing circuits determine the attachment 800 includes the bed attachment, the one or more processing circuits continue to step 1680. At step 1680, the one or more processing circuits are configured to tilt or fold at least a portion of the bed attachment.

At step 1684, the one or more processing circuits are configured to determine if the attachment 800 includes a post digger 1354. If the one or more processing circuits do not include the bed attachment at step 1676, the one or more processing circuits are also configured to continue to step 1684. If the one or more processing circuits determine the one or more processing circuits include a post digger 1354, the one or more processing circuits continue to step 1688. At step 1688, the one or more processing circuits are configured to acquire a location where a trench or hole should be dug (e.g., a location where a fence is desired, a location where a fence is being repaired. At step 1692, the post digger 1354 is configured to dig a trench or hole at the location.

Fleet Monitoring and Control System

Figure 64:
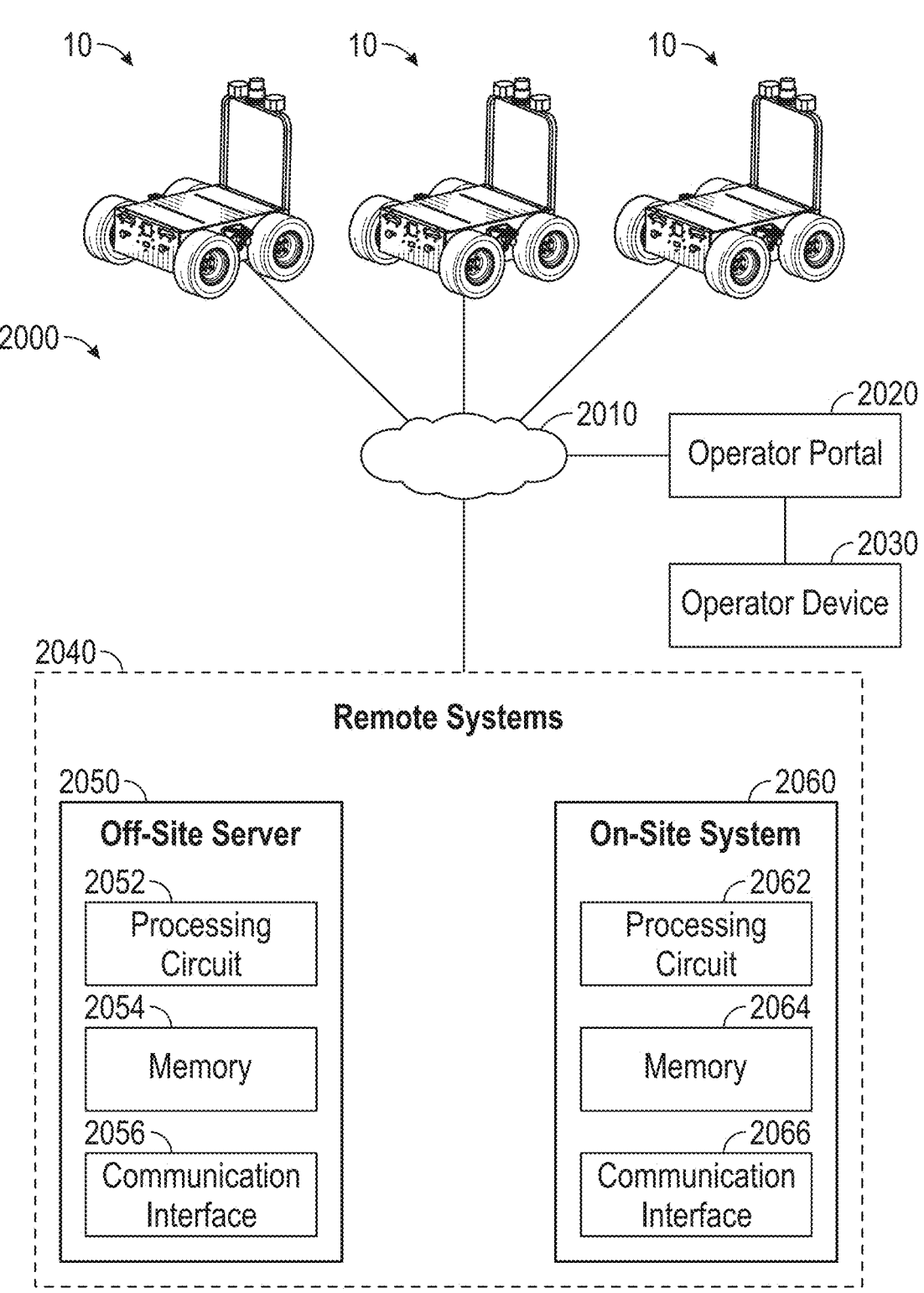
FIG. 64 is a schematic block diagram of a fleet monitoring and control system including a plurality of the AMRs of FIG. 1, according to an exemplary embodiment.

As shown in FIG. 64, a site monitoring and control system, shown as fleet monitoring and control system 2000, includes one or more AMRs 10; an operator interface, shown as operator portal 2020, positioned remote or separate from the AMRs 10; an external or remote user device, shown as operator device 2030, positioned remote or separate from the AMRs 10; and one or more external processing systems, shown as remote systems 2040, positioned remote or separate from the AMRs 10. The AMRs 10, the operator portal 2020, and the remote systems 2040 communicate via one or more communications protocols (e.g., Bluetooth, Wi-Fi, cellular, radio, through the Internet, etc.) through a network, shown as communications network 2010. In some embodiments, the fleet monitoring and control system 2000 does not includes the operator portal 2020 and/or the operator device 2030.

The operator portal 2020 may be configured to facilitate operator access to dashboards including the data and/or information available at the remote systems 2040, etc. to manage and operate the site (e.g., golf course) such as for advanced scheduling purposes, for task/mission management, for remote control, to monitor locations of the AMRs 10, etc. The operator portal 2020 may also be configured to facilitate operator implementation of configurations and/or parameters for the AMRs 10 and/or the site (e.g., setting speed limits, setting geofences, etc.). As shown in FIG. 64, the operator portal 2020 is accessible via the operator device 2030. The operator device 2030 may be or include a computer, laptop, smartphone, tablet, or the like. The operator portal 2020 and the operator device 2030 may communicate via one or more communications protocols (e.g., Bluetooth, Wi-Fi, cellular, radio, through the Internet, wired connection, etc.) through a network (e.g., a CAN bus, the communications network 2010, etc.). The operator device 2030 includes a display (e.g., a screen, etc.) configured to display one or more graphical user interfaces ("GUIs") of the operator portal 2020.

As shown in FIG. 64, the remote systems 2040 include a first remote system, shown as off-site server 2050, and a second remote system, shown as on-site system 2060 (e.g., in a clubhouse of a golf course, on the golf course, etc.). In some embodiments, the remote systems 2040 include only one of the off-site server 2050 or the on-site system 2060. As shown in FIG. 64, (a) the off-site server 2050 includes a processing circuit 2052, a memory 2054, and a communications interface 2056 and (b) the on-site system 2060 includes a processing circuit 2062, a memory 2064, and a communications interface 2066.

According to an exemplary embodiment, the remote systems 2040 (e.g., the off-site server 2050 and/or the on-site system 2060) are configured to communicate with the AMRs 10 via the communications network 2010. By way of example, the remote systems 2040 may receive various data from the AMRs 10. The remote systems 2040 may be configured to perform back-end processing of the data. The remote systems 2040 may be configured to monitor various GPS information and/or real-time kinematics ("RTK") information (e.g., position/location, speed, direction of travel, geofence related information, etc.) regarding the AMRs 10. The remote systems 2040 may be configured to transmit information, data, commands, and/or instructions to the AMRs 10. By way of example, the remote systems 2040 may be configured to transmit GPS data and/or RTK data based on the GPS information and/or RTK information to the AMRs 10 (e.g., which the AMR control system 600 may use to make control decisions). By way of another example, the remote systems 2040 may send commands or instructions to the AMRs 10 to implement.

According to an exemplary embodiment, the remote systems 2040 (e.g., the off-site server 2050 and/or the on-site system 2060) are configured to communicate with the operator portal 2020 via the communications network 2010. By way of example, the operator portal 2020 may facilitate (a) accessing the remote systems 2040 to access data regarding the AMRs 10 and/or (b) configuring or setting operating parameters for the AMRs 10 (e.g., geofences, speed limits, times of use, permitted operators, task assignment, etc.). Such operating parameters may be propagated to the AMRs 10 by the remote systems 2040 (e.g., as updates to settings) and/or used for real time control of the AMRs 10 by the remote systems 2040.

Remote Control

According to an exemplary embodiment, the AMR control system 600 includes one or more modes of operation in which to operate the AMR 10 including an autonomous mode, a semi-autonomous mode (e.g., an augmented manual mode), and/or a manual mode. The semi-autonomous mode allows an operator to provide manual input to the AMR 10 while the AMR 10 operates autonomously (e.g., mostly autonomously). An operator may control the operation of the AMR 10 locally or remotely (e.g., via the wireless controller 700, the operator device 2030, and/or the remote systems 2040).

In the autonomous mode, the AMR 10 is configured to autonomously operate (e.g., complete tasks, drive, etc.) without direct operator control input. For example, the AMR control system 600 and/or the remote systems 2040 may include programmed tasks for the AMR 10 to perform and the AMR 10 may operate autonomously to complete these tasks. In the manual mode, the operator fully controls (e.g., almost fully controls) the operation of the AMR 10. For example, the operator may assume control of the AMR 10 to perform a task by controlling the operation of the AMR 10 via the wireless controller 700 and/or the operator device 2030.

In the semi-autonomous mode, the AMR 10 is configured to receive inputs (e.g., control inputs) from an operator. For example, the operator may provide a task to the AMR 10 (e.g., via the input devices of the wireless controller 700) while the AMR 10 is otherwise operating autonomously. In the semi-autonomous mode, the AMR control system 600 is configured to monitor and modify the operations of the AMR 10 based on data acquired by the sensor system 400.

In some implementations, the semi-autonomous mode accounts for any mode of the AMR 10 where responsive to a user input, the AMR control system 600 monitors the one of more signals from the sensor system 400 (e.g., regarding the environment, the AMR 10, other AMRs 10 in the environment) and may modify the user input based on the one or more signals. For example, in the semi-autonomous mode, an AMR 10 may detect the terrain the vehicle is operating on and change the operation parameters of the vehicle accordingly (e.g., limit speed if operating on sensitive terrain), which can protect the vehicle and the terrain, as described in more detail herein.

In some implementations, the semi-autonomous mode accounts for any mode of the AMR 10 where most autonomous features are maintained responsive to manual control. For example, this allows an operator to provide manual control for a high complexity part of a task while relying on autonomous features to perform lower complexity parts of the task.

The AMR control system 600 is configured to modify the mode of operation of the AMR 10 and the mode of operation may be modified locally or remotely (e.g., via the wireless controller 700, the operator portal 2020, the operator device 2030, and/or the remote systems 2040) at any time (e.g., while the AMR 10 operates, while the AMR 10 is powered off, while the AMR 10 is idling, etc.) providing flexibility for vehicle operation. The operation mode of the AMR 10 may be switched continuously, switched automatically (e.g., at regularly intervals), or kept on the same mode of operation. An operator may select between the modes of operation based on factors such as environment (e.g., terrain, surface), state of the AMR 10 (e.g., load, attachments), task to be performed by the AMR 10, etc. Mode switching may be performed via the input devices of the wireless controller 700, which may be easily accessible to the operator.

The AMR control system 600 is configured to provide an indication of the mode of operation the AMR 10 is operating in via indicators (e.g., visual, auditory) installed on the AMR 10, the wireless controller 700, and/or the operator device 2030. For example, the beacon light 510, coupled to the frame assembly 100, may provide a visual indicator (e.g., color) to a surrounding environment (e.g., proximate personnel, golfers, etc.) of the active mode (e.g., the mode of operation the AMR 10 is operating in). In another example, the wireless controller 700 may include visual indicator displaying and/or an auditory indicator (e.g., a speaker) announcing the active mode of the AMR 10 to a user following a user input (e.g., the user engaging an input device of the wireless controller 700).

The AMR control system 600 is configured to acquire an input providing operating instructions for the AMR 10 from an operator. Specifically, the operator may provide a command (e.g., a task, direction, etc.) for the AMR 10, and the input may originate locally or remotely (e.g., via the wireless controller 700, the operator device 2030, and/or the remote systems 2040). The wireless controller 700, the operator device 2030, and/or the remote systems 2040 may send one or more signals (e.g., via the Wi-Fi antenna 460, the communications interface 606, etc.) based on the command from the user relating to the operation of the AMR 10.

Additionally, the AMR control system 600 may acquire one or more signals from the sensor system 400 regarding the operation of the AMR 10 and/or the location thereof. The AMR control system 600 may receive the one or more signals from one or more sensors of the AMR 10, about an environment, and/or on other AMRs 10. The one or more signals may include position data (e.g., GPS data, etc.), proximity detection data (e.g., obstacle detection, etc.), visual data (e.g., from a camera, etc.), vehicle data (e.g., operation state, load, etc.), etc. The AMR control system 600 is configured to monitor (e.g., continuously, at regular intervals) the one or more signals from the sensor system 400.

The AMR control system 600 may modify the user input according to the one or more signals from the sensor system 400 and provide the modified input (e.g., instructions) to the AMR 10. For example, the AMR control system 600 may detect one or more impediments, based on the one or more signals from the sensor system 400, including restricted areas (e.g., geofences, out-of-bounds areas, etc.), unstable terrain (e.g., wet, muddy, ice, etc.), obstacles (e.g., roadblocks, persons, animals, rocks, etc.), and/or complex situations (e.g., unfamiliar scenarios, challenges the AMR 10 is not programmed to handle, etc.). Following the detection of the one or more impediments, the AMR control system 600 may modify the user input to avoid the one or more impediments, limit the operation of the AMR 10, and/or halt the operation of the AMR 10. Following the detection of one or more impediments, the AMR control system 600 may notify an operator (e.g., via the Wi-Fi antenna 460, the communications interface 606, etc.) of the one or more impediments, and the operator may assess the situation and take manual control of the AMR 10 (e.g., via the wireless controller 700, the operator device 2030, etc.).

Referring now to FIG. 65, a block diagram for a method 2100 for an AMR operating in semi-autonomous mode is shown, according to an exemplary embodiment. One or more AMRs may be operating on a terrain (e.g., a golf course). The method 2100 may be executed by a first processing circuit located on the AMR (e.g., the AMR control system 600) and/or a second processing circuit located remote from the AMR (e.g., the remote systems 2040).

At step 2110, the one or more processing circuits are configured to receive instructions based on an input from an operator via a remote control (e.g., the input devices of the wireless controller 700). For example, a command from the operator may be to increase the speed of the AMR 10 by engaging the speed input 712 of the wireless controller 700.

At step 2120, the one or more processing circuits are configured to acquire environment data from one or more sensors (e.g., of the sensor system 400). For example, the environment data may include obstacles, restricted areas, unstable terrain, hazards, etc.

At step 2130, the one or more processing circuits are configured to acquire vehicle data from one or more sensors (e.g., of the sensor system 400). For example, the vehicle data may include a position (e.g., a GPS position) of the AMR 10, attachments 800 coupled to the AMR 10, a trajectory of the AMR 10 (e.g., speed, direction, acceleration, etc.), etc.

At step 2140, the one or more processing circuits are configured to modify the instructions from the operator based on the environment data and the vehicle signals. For example, the AMR 10 may be aware of an attachment 800 to the AMR 10 and may limit the vehicle operations (e.g., the speed, acceleration, turning capability, drivable terrain) to ensure stable operation of the AMR 10. In another example, the one or more environment sensors may detect an obstacle in the path of the AMR 10 and the AMR 10 may alter its course to avoid the obstacle to prevent damage to the AMR 10 and the environment. In another example, while operating on sensitive terrain (e.g., turf), the AMR 10 may limit the vehicle operations (e.g., turning radius, turning rate, speed, etc.) to prevent damage to the sensitive terrain.

At step 2150, the one or more processing circuits are configured to control the AMR 10 according to the modified instructions. The AMR 10 performs the instructions received from the user while engaging in the vehicle and environmental awareness as described in step 2140.

Referring now to FIG. 66, a block diagram for a method 2200 for the AMR 10 changing operating modes is shown, according to an exemplary embodiment. One or more AMRs may be operating on a terrain (e.g., a golf course). The method 2200 may be executed by a first processing circuit located on the AMR 10 and/or a second processing circuit located remote from the AMR 10.

At step 2210, the one or more processing circuits are configured to receive a task including a destination from an operator and/or from an automated task assignment system (e.g., the remote systems 2040). For example, an operator may direct an AMR 10 to collect a golf ball from a fairway, deliver sand to a sand trap, deliver food to a golfer, etc. At step 2220, the one or more processing circuits are configured to control the AMR 10 to autonomously drive to the destination.

At step 2230, the one or more processing circuits are configured to notify the operator following the AMR reaching the destination or to notify the operator when an impediment cannot be passed on a route to the destination (e.g., via the remote controller 700, the operator device 2030, etc.). For example, the impediment may include any obstacle sensed (e.g., one or more signals received) from the one or more environment and/or vehicle sensors of the sensor system 400 including a hazard, a restricted area, a geofence, an unstable environment, a complex situation, etc.

At step 2240, the one or more processing circuits are configured to provide an operator with manual control of the AMR 10. For example, following the destination reached or an impediment is found, the one or more processing circuits may automatically notify the operator (e.g., via the Wi-Fi antenna 460, the communications interface 606, etc.) and may prevent the AMR 10 from operating (e.g., fully operating). While waiting for manual input from an operator, the AMR 10 may navigate to a stable area of the terrain (e.g., out of the way of other AMRs 10, persons, etc.). The operator may then provide manual input to the AMR 10 (e.g., via the remote controller 700, the operator device 2030, etc.) including assessing the impediment and providing instructions to the AMR 10 accordingly or providing the next task to the AMR 10 following the AMR reaching the destination.

Mission Management

As shown in FIG. 10, the attachment 800 is communicatively coupled to the power system 300 via the attachment interface 360. The attachment interface 360 may be configured to receive data from the attachment 800 and transmit the data to the AMR control system 600. The data may include information regarding the attachment 800. In some embodiments, the data includes an identifier of the attachment 800. For example, each attachment 800 may have a type (e.g., sprayer, dump bed, vending unit, etc.) with have a unique identifier that is transmitted to the AMR control system 600. The data may include other information regarding the attachment 800 (e.g., weight, dimensions, contents, fragility, etc.). In some embodiments, the attachment 800 is a single attachment with a single identifier. In other embodiments, the attachment 800 is multiple attachments 800 with a single identifier. In other embodiments, the attachment 800 is multiple attachments 800 with multiple identifiers.

As shown in FIGS. 10 and 64, upon receiving the data, the AMR control system 600 may be configured to determine a type of the attachment 800 based on the identifier. In some embodiments, memory 604 may be configured to store association data between identifiers and attachment 800 types. In alternate embodiments, the AMR 10 may be configured to transmit the identifier to the remote systems 2040, and receive association data from the remote systems 2040. The association data may include default settings (e.g., constraints, rules) corresponding to the type of the attachment 800. The settings may adjust or otherwise determine operations of the AMR 10. For example, the settings may include a default speed, default drive settings (e.g., on grass, on a cart path), or other default operations of the AMR 10. The AMR control system 600 and/or the remote systems 2040 may be configured to determine specific settings associated with attachment 800 based on other data associated with the attachment 800. By way of example, a default speed may be based on a weight of the attachment 800. As another example, the drive settings and/or route settings may be based on the contents of the attachment 800.

The AMR control system 600 may be configured to identify (e.g., determine) and/or receive (e.g., from the remote systems 2040) one or more tasks that the attachment 800 is configured to (e.g., capable of, available to, etc.) complete. The one or more tasks may be based on the identifier, or other association data between the identifier and the attachment 800. The tasks may correspond to the type of the attachment 800. By way of example, if the attachment 800 is a food and beverage delivery device, a first task may be delivering food and a second task may be to deliver drinks. By way of another example, if the attachment 800 is a dump bed, a first task may be to deliver materials to a location without dumping and a second task may be to deliver materials and dump the materials.

In some instances, the AMR 10 may be available to complete all of the tasks, and/or a subset of the tasks. In some embodiments, the task(s) assigned (e.g., that the AMR 10 is available to complete) may be based on a user input to the AMR 10. The user input may be made by any of the operator device 2030, the wireless controller 700, and/or the user interface 750. By way of example, a list of the one or more tasks may be displayed on the operator device 2030, wireless controller 700, and/or user interface 750, and a user can select one or more tasks from the list for the AMR 10 to be available to complete.

The AMR 10 may receive one or more requests (e.g., from operator device 2030, wireless controller 700, and/or user interface 750) to complete a task at a destination. The destination corresponding to the task may be based on a location of the device (e.g., operator device 2030, wireless controller 700, and/or user interface 750), or a location specified in the request. By way of example, the task may be located at the location of the device when the request is sent. By way of another example, the task may be located at a location specified by the device that is different than the location of the device. This may allow the user to place a request to be completed at a location of the user at a future time.

In some embodiments, the destination corresponds to a completion time associated with the task. The AMR control system 600 may be configured to determine (e.g., estimate, calculate) a time that the task will take to complete. The AMR control system 600 may estimate a location of the user at the estimated time of completion. By way of example, if the user is at a first location, the AMR control system 600 may estimate that at the time of completion of the task, the user will be at a second location. The AMR 10 may set the destination of the request at the second location so that the task is completed at the location of the user. This may allow the AMR 10 to meet the user for tasks that involve deliveries and/or other tasks to be completed at the location of the user.

The AMR 10 may be configured to allow multiple attachments 800 to be installed (e.g., coupled on) the AMR 10. The AMR control system 600, the operator device 2030, the wireless controller 700, and/or user interface 750 may be configured to determine which attachment 800 is the primary attachment, and which attachment(s) 800 are secondary attachments. The determination may be based on the tasks associated with the attachments 800. By way of example, a primary attachment may involve tasks that must be completed at a specific location (e.g., deliveries). By way of another example, a secondary attachment may involve tasks that can be done in more general locations (e.g., spraying, raking, mowing).

In some embodiments, the AMR 10 is configured to complete one or more secondary (e.g., additional) tasks while moving to the destination. The secondary tasks may be done by a first attachment 800 or a second attachment 800 of the AMR 10. By way of example, the secondary tasks may include using a raking attachment to rake a driving surface of the route from the current location of the AMR 10 to the destination. By way of another example, the secondary tasks may include using a spraying attachment to spray grass along the route. Secondary tasks may be completed such that they do not interrupt (e.g., disable, delay) completion of the task (e.g., primary task). The AMR 10 may determine a route for the primary tasks based on the secondary task(s). By way of example, if the primary task (e.g., to be completed by the primary attachment) is to be completed at a destination, the route may include driving on grass so that the grass along the route can be sprayed/raked/mowed by the secondary attachment(s) 800.

Figure 67:
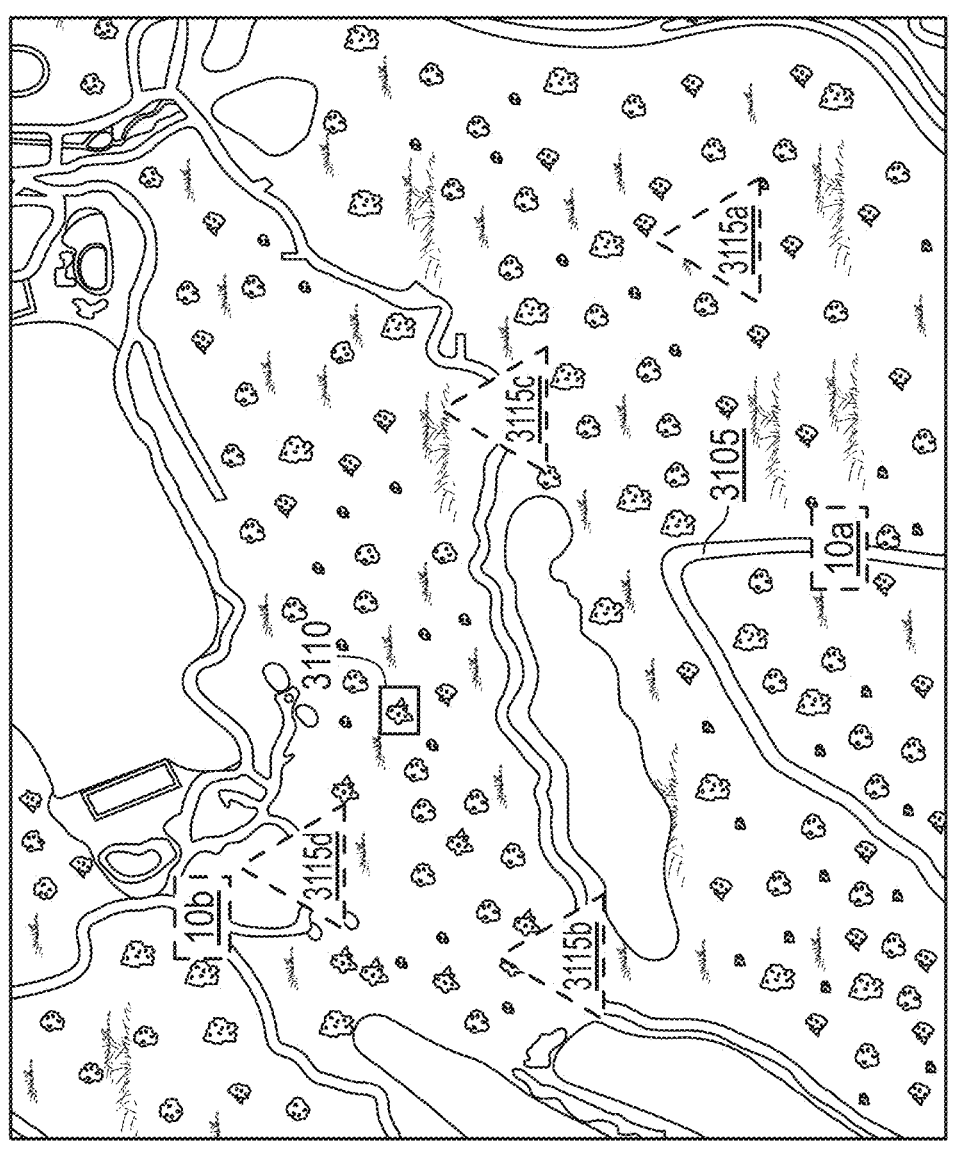
FIG. 67 is a map of a terrain configured to be a driving surface for the AMR of FIG. 1, according to an exemplary embodiment.

As shown in FIG. 67, depicted is a map 3100 of a terrain (e.g., golf course) for tasks to be completed on. The map 3100 includes a plurality of AMRs 10, shown as AMR 10a and 10b. The AMR 10a and the AMR 10b, generally referred to as AMRs 10, although shown to be disposed on a cart path 3105 (e.g., road, designated driving surface), the AMRs 10 can be at any location on the map 3100. The AMRs 10 may be configured to communicate with other AMRs 10 directly (e.g., via the AMR control system 600), or configured to communicate indirectly (e.g., via the operator device 2030, the wireless controller 700, the user interface 750, the remote systems 2040, etc.). By way of example, the AMR 10a may be configured to transmit an instruction to AMR 10b to complete a respective task responsive to the distance between the AMR 10a and the respective task being greater than the distance between the AMR 10b and the respective task. By way of another example, the AMR 10a may be configured to transmit an instruction to AMR 10b to complete a respective task responsive to a drive time to the respective task being greater for AMR 10a than AMR 10b.

The map 3100 may be stored at the AMR control system 600 (e.g., in memory 604), or may be stored at the remote systems 2040 (e.g., in memory 2054 and/or memory 2064). In some embodiments, the map 3100 for each AMR 10 may be based on a type of the attachment(s) 800 of the AMR 10. By way of example, a first AMR 10 may have an attachment 800 that has default drive settings that allow the AMR 10 to only be driven on the cart path 3105. The map 3100 of the first AMR 10 may not include terrain features 3110 that are off of (e.g., outside of, external to) the cart path 3105, since the AMR 10 will not interact with the terrain features 3110. This may allow for less memory to be allocated for the map 3100 for AMRs 10 that do not need all of the potential features of the map 3100.

For each AMR 10, the map 3100 may include other AMRs 10 that have an attachment 800 of the same type. By way of example, if AMR 10a has an attachment 800 of the same type as AMR 10b, the map 3100 of AMR 10a may include AMR 10b. By way of another example, if AMR 10a has an attachment 800 of a different type than AMR 10b, the map 3100 of AMR 10a may not include AMR 10b. This may allow for tasks 3115 to be assigned to AMRs 10 that have an attachment 800 capable of completing the tasks 3115.

The map 3100 is shown to include a plurality of tasks 3115. The tasks 3115 may correspond to a request to be completed at a specific location on the map 3100. In some embodiments, the location of a task 3115 may be based on a location of a request made for the task 3115 to be completed. By way of example, the location of the task 3115a may be at the same location of where a user device requested for task 3115a to be completed. In other embodiments, the location of a task 3115 may be based on information included in the request. By way of example, the location of the task 3115b may be at a different location than where a user device requested that task 3115b be completed, if the request specified a different location than the location of the user device.

As tasks 3115 are added or otherwise requested, the tasks 3115 are assigned to be completed by the AMRs 10. In some embodiments, the tasks 3115 are assigned based on a proximity of the task 3115 to the AMR 10. By way of example, AMR 10a is closer to tasks 3115a, 3115b, and 3115c than AMR 10b. AMR 10b is closer to task 3115d than AMR 10a. Therefore, AMR 10a may be assigned to tasks 3115a, 3115b, and 3115c, while AMR 10b may be assigned to task 3115d. In other embodiments, the tasks 3115 are assigned to AMRs 10 based on an optimal (e.g., most efficient) distribution of work between available AMRs 10. By way of example, the number of tasks 3115 may be evenly distributed between AMR 10a and 10b such that each AMR 10 is assigned the same number of tasks. By way of another example, the AMR 10 may be configured to estimate or otherwise determine an amount of time corresponding to the completion (e.g., execution) of each task 3115, and the tasks 3115 may be distributed between AMR 10a and 10b based on the estimated completion times.

In some embodiments, the tasks 3115 are assigned to the AMRs 10 based on terrain conditions associated with the map 3100. If the driving settings (e.g., default driving settings) of the AMR 10 do not allow the AMR 10 to drive to the task 3115, the task 3115 may not be assigned to be completed by the AMR 10. By way of example, if the default driving settings of AMR 10a do not allow AMR 10a to drive on grass, and task 3115a is located on grass, task 3115a may not be assigned to AMR 10a even if AMR 10a is closest in proximity. If AMR 10b is configured to drive on grass, AMR 10b may be assigned task 3115a even if AMR 10b is not closest in proximity.

The AMR 10 and/or the remote systems 2040 may be configured to determine a route from a current location of the AMR 10 to a location of each assigned task 3115. In some embodiments, the route may be based on proximity from the current location of the AMR 10 to the tasks 3115. By way of example, if the AMR 10a is assigned to the tasks 3115a, 3115b, and 3115c, the AMR 10a may travel to the task 3115a first because it is the closest task 3115 in proximity. The route may be adjusted based on terrain conditions (e.g., the terrain features 3110) of the map 3100. The terrain features 3110 may include trees, shrubs, rocks, people, the AMRs 10, or any other obstacle that may obstruct or otherwise restrict driving of an AMR. The terrain features 3110 may include geofences or other non-tangible barriers of areas of the map 3100 (e.g., golf hole 3200). The route may be adjusted to avoid the terrain features 3110. By way of example, the route may be adjusted such that the tasks are completed in a different order that avoids the terrain features 3110. By way of another example, the route may be lengthened such that a path can be taken that avoids the terrain feature 3110.

Figure 68:
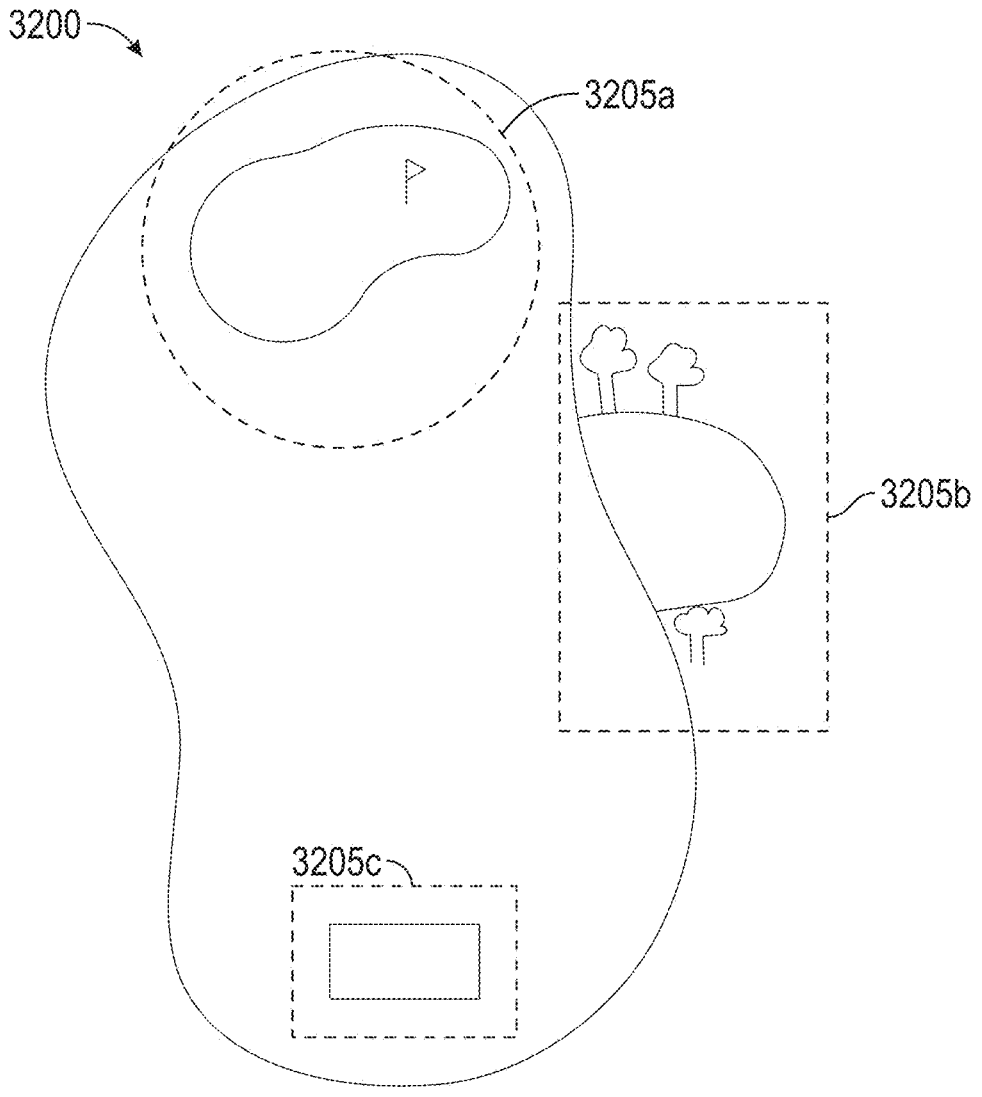
FIG. 68 is a map of a golf hole including geofences in designated areas of the golf hole, according to an exemplary embodiment.

As shown in FIG. 68, the golf hole 3200 is shown to include a plurality of geofences corresponding to different areas of the golf hole 3200. The golf hole 3200 includes a green area geofence 3205a that is placed around the green of the golf hole 3200. The golf hole 3200 includes a rough area geofence 3205b that is placed in a rough area (e.g., area outside of the fairway) of the golf hole 3200. The golf hole 3200 may include a tee box geofence 3205c that is placed in a tee box of the golf hole 3200. The green area geofence 3205a, the rough area geofence 3205b, and the tee box geofence 3205c are exemplary geofences, and other geofences may be placed on the golf hole 3200.

The drive settings of the AMR 10 may restrict the AMR 10 from travelling within one or more geofences. This may prevent the AMR 10 from driving in an area of frequent use (e.g., in the tee box), prevent the AMR 10 from damaging designated surfaces of the terrain (e.g., the green area, the teebox, etc.), and/or prevent the contents of the AMR 10 (e.g., contents of the attachment 800) from being damaged while travelling along the route. By way of example, the AMR 10 may not be allowed to drive within the tee box geofence 3205c since players are frequently interacting with the area inside of the tee box geofence 3205c. By way of another example, the AMR 10 may not be allowed to drive within the green area geofence 3205a since the grass within the green area is easily damageable. By way of yet another example, the AMR 10 may not be allowed to drive within the rough area geofence 3205b since the rough area may cause rattling (e.g., shaking, movement) within the attachment 800, causing the contents of the attachment 800 to be damaged.

Figure 69:
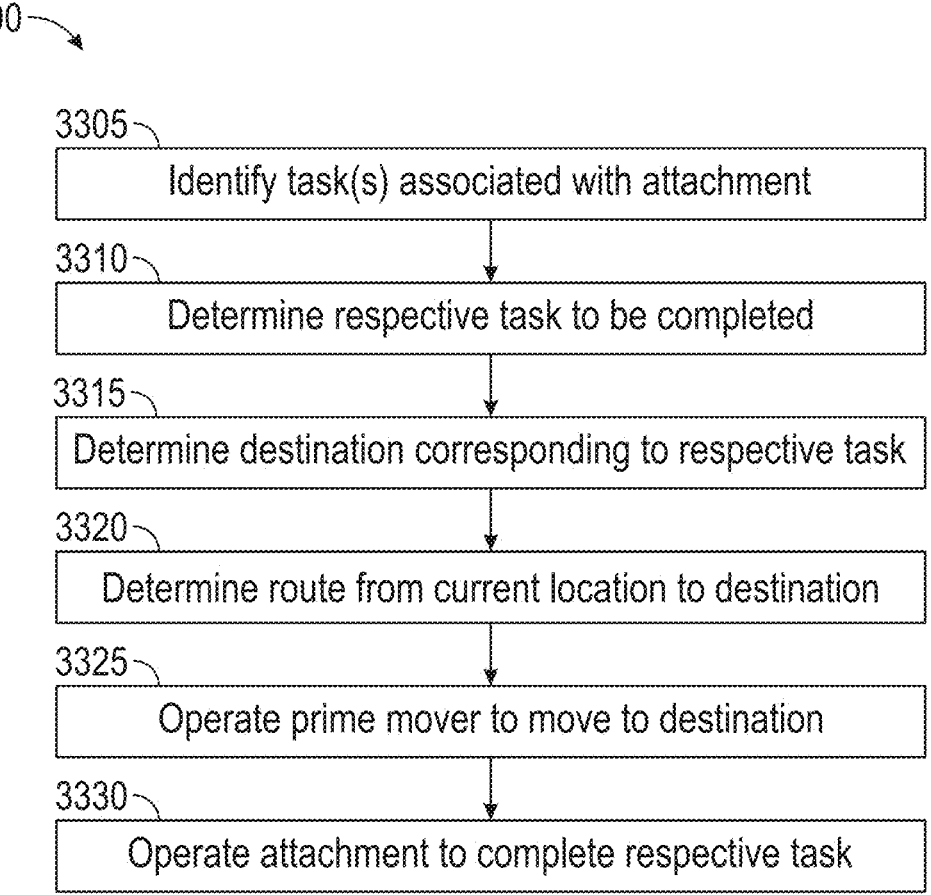
FIG. 69 is a method for assigning and completing a task for the AMR of FIG. 1, according to an exemplary embodiment.

As shown in FIG. 69, depicted is a method 3300 for assigning and completing a task for an AMR 10. At step 3305, one or more processing circuits (e.g., the AMR control system 600, the remote systems 2040, etc.) are configured to identify one or more tasks associated with an attachment 800 of the AMR 10. The one or more tasks may be based on an identifier, or other association data transmitted between the AMR 10 and the attachment 800. The one or more tasks may correspond to the type of the attachment 800. By way of example, if the attachment 800 is a food delivery device, a first task may be delivering food, and a second task may be to deliver drinks. By way of another example, if the attachment 800 is a dump bed, a first task may be to deliver materials to a location without dumping, and a second task may be to deliver materials and dump the materials.

At step 3310, the one or more processing circuits are configured to determine a respective task of the one or more tasks to be completed by the AMR 10. In some embodiments, the respective task assigned (e.g., that the AMR 10 is available to complete) may be based on a user input to the AMR 10. The user input may be made by any of the operator device 2030, the wireless controller 700, and/or the user interface 750. By way of example, a list of the one or more tasks may be displayed on at least one of the operator device 2030, wireless controller 700, and/or user interface 750, and a user can select one or more tasks from the list for the AMR 10 to be available to complete.

At step 3315, the one or more processing circuits are configured to determine a destination corresponding to the respective task. The destination corresponding to the respective task may be based on a location of the device (e.g., operator device 2030, wireless controller 700, and/or user interface 750), or a location specified in a request of the respective task. By way of example, the task may be located at the location of the device when the request is sent. By way of another example, the task may be located at a location specified by the device that is different than the location of the device. The destination may correspond to a completion time associated with the task. The one or more processing circuits may be configured to determine (e.g., estimate, calculate) a time that the task will take to complete. The one or more processing circuits may estimate a location of the user at the estimated time of completion. By way of example, if the user is at a first location, the one or more processing circuits may estimate that at the time of completion of the task, the user will be at a second location. The one or more processing circuits may set the destination of the request at the second location so that the task is completed at the location of the user. This may allow the AMR 10 to meet the user for tasks that involve deliveries and/or other tasks to be completed at the location of the user.

At step 3320, the one or more processing circuits are configured to determine a route from the current location of the AMR 10 to the destination. In some embodiments, the route may be based on a shortest path from the current location of the AMR 10 to the destination. The route may be adjusted based on the default drive settings and/or terrain conditions associated with the AMR 10 and the attachment 800. By way of example, the route may be adjusted to avoid trees, rocks, and other physical obstacles that may obstruct the driving capabilities of the AMR 10. By way of another example, the route may be adjusted to avoid geofences that the AMR 10 is restricted from driving within.

At step 3325, the one or more processing circuits are configured to operate the prime mover to move the AMR 10 to the destination. The prime mover (e.g., hub motors 210, steering actuators 240, driveline 200, motor controllers 230, and/or tractive elements 220) may be operated to move the AMR 10 to the destination along the determined route. The AMR 10 may identify additional (e.g., new, unknown) terrain features 3110 that were not known to the AMR 10. Based on the additional terrain features 3110, the route may be adjusted in real time by the AMR 10. The additional terrain features 3110 may be identified by the sensors of the sensor system 400. At step 3330, the one or more processing circuits are configured to operate the attachment 800 to complete the respective task. The completion of the respective task may be automatically confirmed by the AMR 10, or may require user authorization (e.g., via the user interface 750, the operator portal 2020, the operator device 2030, and/or the remote systems 2040).

As shown in FIG. 70, depicted is a method 3400 for assigning and completing a task for an AMR 10. At step 3405, one or more processing circuits (e.g., the AMR control system 600, the remote systems 2040, etc.) are configured to receive one or more requests corresponding to one or more tasks to be completed by the AMR 10. The AMR 10 may receive one or more requests (e.g., from operator device 2030, wireless controller 700, and/or user interface 750) to complete a task. The requests may be from a single device, or a plurality of devices at a plurality of locations.

At step 3410, the one or more processing circuits are configured to determine destination(s) corresponding to the request(s). The destination corresponding to each task may be based on a location of the device (e.g., operator device 2030, wireless controller 700, and/or user interface 750) that makes the request, or a location specified in the request. By way of example, the destination may be located at the location of the device when the request is sent. By way of another example, the task may be located at a location specified by the device that is different than the location of the device.

At step 3415, the one or more processing circuits are configured to determine a route from a current location of the AMR 10 to the destination(s) of each task. In some embodiments, the route may be based on the shortest route between the AMR 10 and each of the tasks. In other embodiments, the route may be based on a desired ending location of the AMR 10, and the order of tasks to complete may be configured to allow the AMR 10 to complete the final (e.g., last) task at a closest position to the desired ending location. In other embodiments, the route may be based on a timestamp of each of the requests, and the order of the tasks may be based on the timestamps. By way of example, if a first task has a first timestamp that is before a second timestamp of a second task, the AMR 10 may complete the first task before the second task.

At step 3420, the one or more processing circuits are configured to determine the required terrain conditions corresponding to the task(s) and/or the attachments 800. In some embodiments, the required terrain conditions may be based on the default drive settings of the AMR 10 and/or the attachment 800. By way of example, the default drive settings may not allow the AMR 10 to drive within specific geofences or areas of the driving terrain. In other embodiments, the required terrain conditions may be based on the task(s). By way of example, if the task involves interacting with grass, the required terrain conditions may include driving on grass rather than a different type of surface (e.g., concrete). In other embodiments, the terrain conditions may be based on characteristics of the driving surface. By way of example, the terrain conditions may include any of a moisture level of, damage to, the geofence barriers, or an object (e.g., tree, rock, other obstruction) on the driving surface.

At step 3425, the one or more processing circuits are configured to determine whether the determined route meets the required terrain conditions. At step 3430, if the route does not meet the required terrain conditions, the one or more processing circuits are configured to adjust the route to comply with (e.g., meet) the terrain conditions. In some embodiments, the route is updated to complete tasks in a different order, thereby changing the overall route. In other embodiments, adjustments are made to the route to complete the tasks in the same order, while still avoiding terrain features that do not comply with the terrain conditions.

At step 3435, the one or more processing circuits are configured to determine time(s) associated with completing each task. The time that each task may take to complete may be based on travel time along the route to the destination, and/or the time that the task takes to complete once the AMR 10 arrives at the destination. In embodiments that include multiple tasks to be complete, the completion time for each task may include the completion time for a set of tasks that are to be completed before the task. By way of example, if a first task is to be completed before a second task, the completion time of the second task may include the completion time of the first task.

At step 3440, the one or more processing circuits are configured to determine whether the completion time(s) are above a threshold. In some embodiments, there may be a single threshold for all tasks. In other embodiments, the threshold may be based on a task type. The threshold may be based on an amount of time corresponding to a shift in the destination. By way of example, if a user requests a delivery, the threshold may correspond to an average time for the user to move to a different location after placing the request. The threshold may be based on historic task completion data and/or may be based on characteristics of the user placing the request (e.g., pace of play data).

At step 3445, if the time(s) is/are above the threshold, the one or more processing circuits are configured to estimate the position(s) of requestor(s) at the time(s). The estimated position(s) of the requestor(s) may be based on an estimate of the location of the requestor(s) at the time associated with the completion of the task. By way of example, if a completion time is above the threshold, the one or more processing circuits may estimate where the requestor will be at the completion time. In some embodiments, the estimate is based on historical user data (e.g., pace of play data). In other embodiments, the position may be estimated based on a tracked location of the user device used to make the request or a vehicle (e.g., a golf cart) associated therewith. The one or more processing circuits may receive live location data of the user device and can estimate the position of the requestor based on the live location data.

At step 3450, the one or more processing circuits are configured to adjust the route to meet the requestor(s) at the estimated positions(s). This may allow for the AMR 10 to meet requestor(s) at a location where they are going to be, rather than going to a location where the user was at the time of making the request. Additional adjustments to the route may be necessary to comply with terrain conditions, or other constraints (e.g., restrictions) placed on the AMR 10. At step 3455, the one or more processing circuits are configured to operate the prime mover to move to the destination(s) of the task(s). The prime mover (e.g., hub motors 210, steering actuators 240, driveline 200, motor controllers 230, and/or tractive elements 220) may be operated to move the AMR 10 to the destination along the determined route. The AMR 10 may identify additional (e.g., new, unknown) terrain features that were not known to the AMR 10. Based on the additional terrain features, the route may be adjusted in real time by the AMR 10. The additional terrain features may be identified by the sensors of the sensor system 400.

Terrain and Vehicle Aware Control

Robots are increasingly utilized in applications where navigation and adaptable performance are critical. However, conventional robots often lack the ability to dynamically adjust their operation based on the characteristics of the terrain, leading to issues such as excessive turf damage, reduced traction, or instability on uneven or slippery surfaces. Additionally, when attachments or loads are introduced, traditional systems fail to account for changes in weight distribution or center of gravity. The AMR 10 and the fleet monitoring and control system 2000 address these challenges by integrating terrain-awareness capabilities, mapping systems, and adaptive control mechanisms, enabling the AMR 10 to operate effectively across diverse environments while minimizing environmental impact and ensuring stability. By dynamically adjusting drive parameters based on real-time terrain data, attachment configurations, load, and/or robot operating mode, the AMR 10 and the fleet monitoring and control system 2000 enhance operational versatility, reduces wear on surfaces, and supports stable and efficient use of robotic systems.

Figure 71:
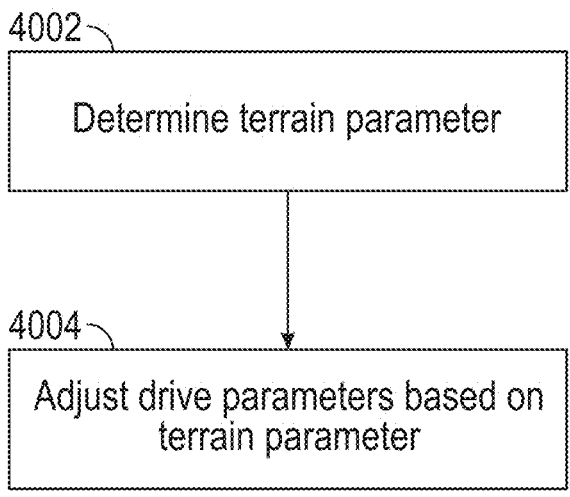
FIG. 71 is a method for adjusting drive parameters of the AMR of FIG. 1, according to an exemplary embodiment.

As shown in FIG. 71, a method 4000 is directed to a method for adjusting drive parameters of the AMR 10. At step 4002, one or more processing circuits (e.g., the AMR control system 600, the remote systems 2040, etc.) are configured to determine a terrain parameter for an AMR (e.g., the AMR 10). The one or more processing circuits include at least one of a first processing circuit located on the AMR or a second processing circuit located remote from the AMR. The one or more processing circuits are configured to determine the terrain parameter at a current location of the AMR (e.g., on a golf course). The current location of the AMR can be determined using a GPS system (e.g., via the GPS antenna 450, GPS camera 440, etc.). The terrain parameter includes at least one of a surface type or a terrain moisture characteristic. Examples of surface types include grass (e.g., fairways, greens, or roughs), sand (e.g., bunkers), dirt (e.g., paths or off-course areas), asphalt or concrete (e.g., cart paths or paved areas), and gravel. Terrain moisture characteristics can include dry areas with little to no moisture (e.g., maintained fairways during dry conditions), wet areas such as recently watered grass or regions with residual rainfall, saturated areas like waterlogged regions prone to slippage or turf damage, and frozen areas with hard surfaces due to sub-freezing temperatures. Combinations of the terrain parameters can also be determined, such as grass with high moisture levels (e.g., recently watered fairway), sand with medium dryness (e.g., partially compacted bunker), and asphalt with no moisture (e.g., dry cart path). The combined terrain parameters allow the AMR to adapt its operation dynamically based on the terrain.

At step 4004, the one or more processing circuits are configured to adjust drive parameters of the AMR. The drive parameters of the AMR are adjusted based on the terrain parameters. In some embodiments, the one or more processing circuits are configured to adjust a skid-steer operation. The drive parameters are configured to include at least one of a speed (e.g., of one or more hub motors 210), a torque output (e.g., of one or more of the hub motors 210), a turning radius (e.g., provided through the skid-steer operation), or a wheel slip control (e.g., of one or more of the hub motors 210). The drive parameter adjustments ensure the AMR operates efficiently across varying terrain types, such as wet grass, sand, or cart paths, while maintaining stability and minimizing disruption or damage to sensitive surfaces.

In some embodiments, the adjusting of the drive parameters of the AMR includes adjusting at least a turn radius of the skid-steer operation based at least on the terrain parameter. For example, when the terrain parameter indicates that the AMR is located on a tee box, fairway, or green, the turn radius is increased to minimize turf damage and ensure smoother navigation on sensitive grass surfaces. The adjustment causes the AMR to perform wider, gentler turns in these areas, reducing the stress on the turf caused by tight skid-steer movements. By dynamically modifying the turn radius in response to terrain parameters and conditions, the one or more processing circuits are configured to ensure continued operation of the AMR while preserving areas on the golf course.

The one or more processing circuits may be configured to adjust torque distribution between the plurality of hub motors 210 based on the identified terrain. For example, when the AMR operates on wet or slippery terrain, the processing circuits may be configured to vary torque to one or more of the hub motors 210 to enhance traction and prevent slippage. On uneven or sloped terrain, the torque distribution can be adjusted to stabilize the AMR and improve maneuverability by compensating for varying resistance across the wheels. In some embodiments, adjusting torque distribution among drive wheels includes transitioning a front motor of the hub motors 210 from speed control to torque control.

In some embodiments, the AMR includes a plurality of tractive elements configured to provide mobility and traction across various terrains. The tractive elements can include wheels, rubber tracks, or other ground-engaging components configured to support movement over surfaces such as grass, sand, or asphalt. Each of the plurality of hub motors 210 is coupled to one of the plurality of tractive elements. For example, hub motors 210 coupled to wheels are configured to enable speed and torque control for maneuvering on golf course fairways. Hub motors 210 coupled to rubber tracks are configured to provide traction on soft or uneven surfaces, such as sand bunkers or waterlogged terrain. The hub motors 210 configured to drive the tractive elements can provide skid-steer operation.

According to some embodiments, the AMR includes sensors (e.g., the sensor system 400) configured to acquire terrain data. Terrain data include moisture data, elevation data, surface roughness data, weather data (e.g., humidity, temperature, rainfall, etc.), and traction data. The AMR sensors may include sensors or functionality from the sensor system 400 (e.g., the stereo cameras 410, the LiDAR 420, the GPS camera 440, the GPS antenna 450, the Wi-Fi antenna 460, etc.). The AMR sensors can include a soil moisture sensor, an elevation sensor, a surface roughness sensor, or a traction sensor. The soil moisture sensor is configured to measure the water content in the terrain to identify areas that are dry, wet, or saturated. The soil moisture sensor is configured to analyze heat signatures and determine moisture levels (e.g., dry soil emits more heat than wet soil). The elevation sensor is configured to detect variations in a terrain height (e.g., slopes or uneven surfaces). The surface roughness sensor is configured to evaluate a texture of the terrain to differentiate between smooth and coarse surfaces. The traction sensor is configured to monitor wheel slippage or resistance to assess a current level of grip.

According to some embodiments, the one or more processing circuits are configured to determine the terrain parameter based on the terrain data. The terrain parameters (e.g., surface type) can be determined/detected via the one or more processing circuits using machine learning models to classify images from cameras or patterns identified by LiDAR. For example, the one or more processing circuits may be configured to conduct color recognition via the sensors to differentiate between green grass, brown dirt, or white sand. The one or more processing circuits may be configured to, via the data acquired from the traction sensor, conduct traction analysis to detect slippage or wheel resistance for different surfaces (e.g., grass vs. sand). The one or more processing circuits may be configured to determine the terrain moisture characteristic via the soil moisture sensors that measure water content in the soil.

In some embodiments, the AMR sensors are configured to facilitate detecting obstacles (e.g., golf carts, maintenance equipment, trees, fallen tree branches, etc.) on the golf course. The AMR sensors (e.g., cameras) are configured to capture visual data for obstacle detection through image processing or machine learning algorithms. The AMR sensors (e.g., LiDAR sensors) are configured to identify objects based on their shape and proximity to the AMR.

According to some embodiments, the one or more processing circuits are configured to acquire the terrain moisture characteristic from at least one of a weather service, the AMR sensors (e.g., sensor system 400), or external sensors (e.g., on the golf course). For example, the one or more processing circuits are configured to retrieve real-time weather data, such as rainfall history or humidity levels, from a weather service (e.g., external weather service) to predict moisture conditions on a golf course. The AMR sensors (e.g., soil moisture sensors or infrared sensors) are configured to provide localized, real-time measurements of the water content in the terrain, thereby enhancing terrain moisture assessment. The external sensors (e.g., distributed throughout the golf course), such as stationary moisture detectors or weather monitoring systems, can transmit (e.g., via the remote systems 2040) data to the AMR, enabling the one or more processing circuits to acquire the terrain moisture characteristics.

Figure 72:
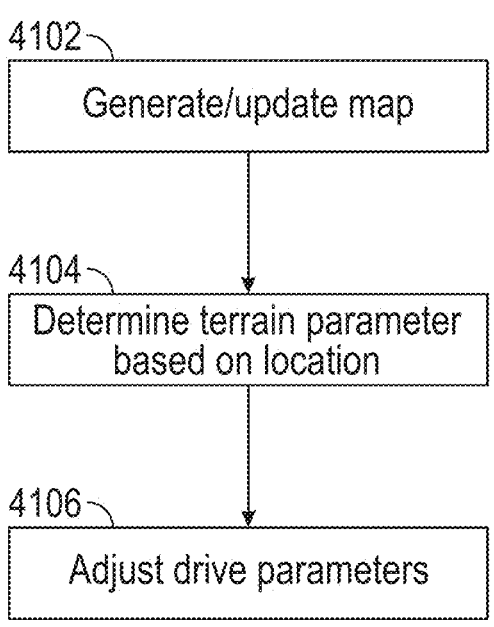
FIG. 72 is a method for adjusting drive parameters of the AMR of FIG. 1, according to another exemplary embodiment.

As shown in FIG. 72, a method 4100 is directed to a method for adjusting drive parameters of the AMR 10 based on location. At step 4102, one or more processing circuits (e.g., the AMR control system 600, the remote systems 2040, etc.) are configured to store a map associated with a golf course. The map may include pre-defined areas such as tee boxes, fairways, greens, bunkers, cart paths, and roughs, along with their respective terrain types. The map is configured to store and display terrain data, such as elevation profiles, moisture distribution data (e.g., terrain moisture characteristic), temperature data, and humidity data. The map is configured to be dynamically updated based on real-time data (e.g., based on data from weather services, based on data acquired by sensors of the AMRs 10 (e.g., sensor system 400, soil moisture sensor, elevation sensor) as the AMRs 10 driving around, external sensors, etc.). The one or more processing circuits are configured to incorporate obstacle locations into the map.

At step 4104, the terrain parameter is configured to be determined based on the current location of the AMR on the map. For example, if the AMR is located on a green, the one or more processing circuits may reference pre-defined (e.g., stored) terrain parameters for greens and/or the real-time data of the location of the AMR. In another example, the map may indicate that the AMR is on a slope or incline based on elevation profile data stored within the map, allowing the one or more processing circuits to reference pre-defined (e.g., stored) terrain parameters for sloped surfaces. Real-time updates to the map from elevation sensors on the AMR can refine terrain parameters of a sloped surface (e.g., steepness or direction).

At step 4106, the one or more processing circuits are configured to adjust the drive parameters of the AMR. For example, if the one or more processing circuits determine that the AMR is on grass based on the location thereof on the map, the one or more processing circuits can reduce the speed and increase the turning radius to prevent turf damage. If the terrain parameter identifies a wet surface, the one or more processing circuits may switch from speed control to torque control in the hub motors to minimize slippage and maintain traction. When operating the terrain parameter identifies a sloped area (e.g., an inclined fairway), the one or more processing circuits may redistribute torque between the hub motors 210 to ensure stability and prevent tipping while navigating the terrain. While method 4000 and method 4100 have been described separately, it should be understood that method 4000 and method 4100 may be used in combination (i.e., determining terrain parameters using the sensor system 400 of the AMR 10 and based on the current location of the AMR 10 relative to pre-stored terrain parameters on a map).

According to some embodiments, the one or more processing circuits are configured to identify a portion of the golf course that is prone to high water retention based on (a) the elevation profiles and (b) at least one of real-time terrain moisture data or historical rainfall information. For example, the one or more processing circuits can detect low-lying areas or depressions in the elevation profiles where water is likely to accumulate after rainfall or irrigation. The low-lying areas or depressions can be cross-referenced with real-time moisture data acquired from soil moisture sensors on the AMR or from stationary sensors (e.g., external sensors) distributed across the golf course. Historical rainfall data (e.g., from a connected weather service) can be incorporated to predict regions that tend to retain water during specific times of the year or under certain weather patterns. In some embodiments, the AMR can detect and flag portions that are prone to high water retention on the golf course map. This capability allows operators to take proactive measures, such as improving drainage, aerating the soil, or restricting robot operations in those areas to prevent turf damage and maintain optimal course conditions.

In response to identifying a portion of the golf course that is prone to high water retention, the one or more processing circuits can update the map associated with the golf course with a geofenced boundary around the identified high-water-retention area, preventing the AMR from entering until the area is resolved (e.g., sufficiently dry, redesigned by course personnel). In some embodiments, the one or more processing circuits are configured to adjust the drive parameters of the AMR to avoid the identified high-water-retention area, including adjusting an AMR navigation path and restricting skid-steer operations in the high-water-retention area to minimize turf damage and slippage.

Figure 73:
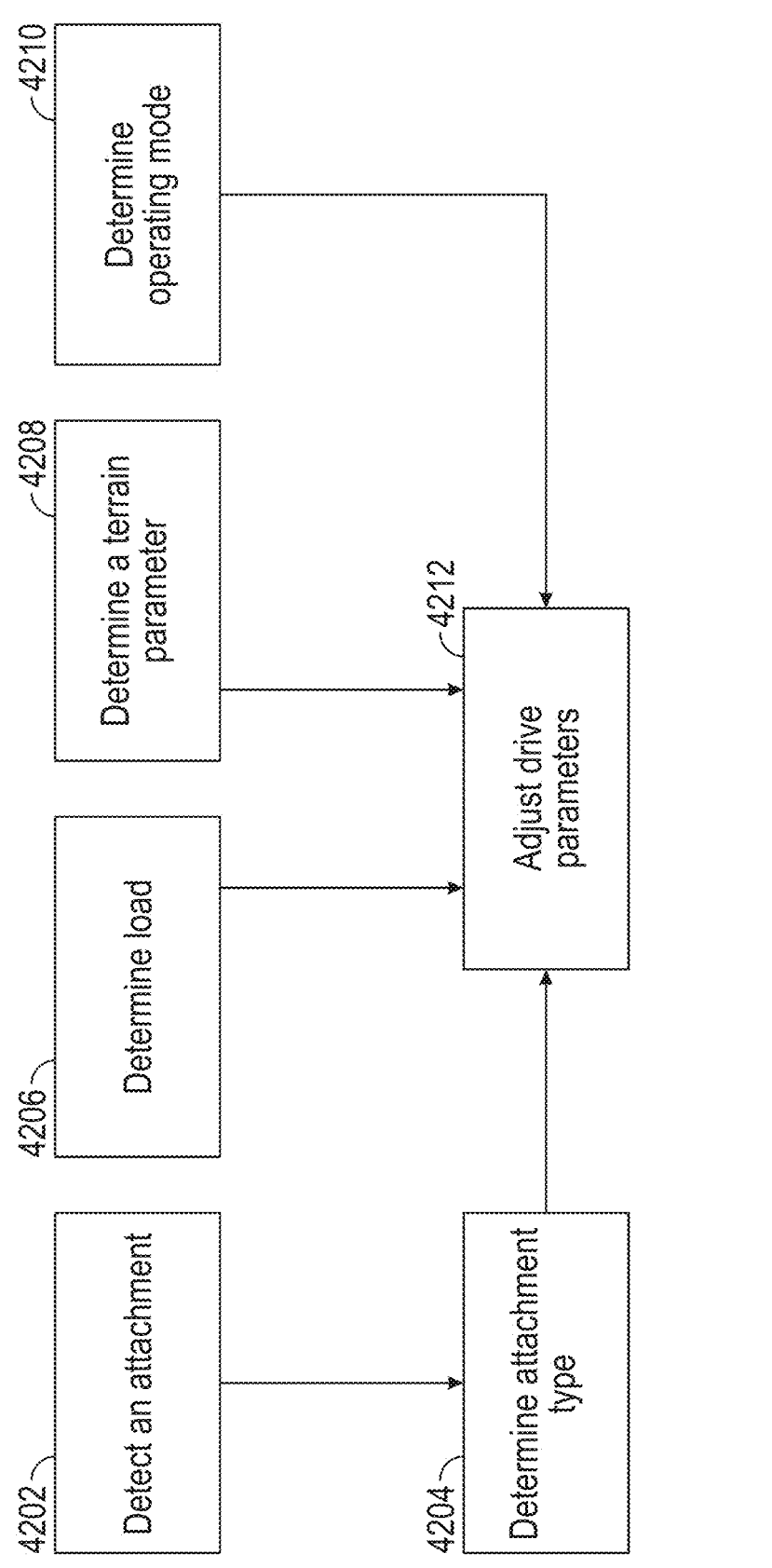
FIG. 73 is a method for adjusting drive parameters of the AMR of FIG. 1, according to another exemplary embodiment.

As shown in FIG. 73, a method 4200 is directed to a method for dynamically adjusting the drive parameters of the AMR 10 based on a plurality of factors. For example, the method 4200 considers a type of attachment(s) (e.g., the attachments 800) connected to the AMR 10, a load being carried by the AMR 10, a terrain characteristic at a current location of the AMR 10 (e.g., determined using method 4000 and/or method 4100), and an operating mode of the AMR 10 (e.g., autonomous mode, remote control, local control, etc.). The drive parameters, such as speed, torque distribution, turning radius, and skid-steer operation, may be adjusted based on a combination of the inputs to adapt to changing conditions and operational requirements. The method 4200 can incorporate aspects of previously described methods, such as method 4000 (e.g., using sensors to detect terrain characteristics and environmental conditions) and method 4100 (e.g., generating and referencing a golf course map for location-based adjustments).

At step 4202, one or more processing circuits (e.g., the AMR control system 600, the remote systems 2040, etc.) are configured to detect (e.g., via an attachment coupling interface, the attachment interface 360, a connector cable, etc.) presence of one or more attachments (e.g., the attachments 800). At step 4204, the one or more processing circuits are configured to determine a type of the attachment (e.g., pivoting bed attachment, rotating bed attachment, sprayer attachment, club carrier attachment, vending unit attachment, ball picker attachment, etc.; based on an ID associated with the attachment detected; etc.). The one or more processing circuits may be configured to store a weight (e.g., mass) of the attachment, and calculate/determine a center of gravity of the attachment with the AMR. In some embodiments, the one or more processing circuits are configured to determine the attachment type based a built-in identifier on or communicated by the attachment, such as a RFID tag, a barcode, or a predefined attachment profile.

At step 4206, the one or more processing circuits are configured to determine a load that the AMR is carrying. The AMR may include a load sensor (e.g., mass/weight sensor, etc.). The load sensor can be integrated into the chassis. In some embodiments, the one or more processing circuits may determine the load based on the attachment type. This step ensures that the one or more processing circuits recognize how the added weight or distributed mass impacts the AMR's performance, such as acceleration limits, grade climbing capability, or turning radius, allowing the one or more processing circuits to make necessary adjustments for enhanced operation and efficiency.

At step 4208, the one or more processing circuits are configured to determine a terrain parameter. The terrain parameter can be determined based on any of the methods disclosed herein, including method 4000 at step 4002 and method 4100 at step 4104.

At step 4210, the one or more processing circuits are configured to determine a mode of operation (e.g., autonomous operation, local operator-controlled, remote operator-controlled, etc.). For example, the one or more processing circuits are configured to detect autonomous operation when no operator control signals are detected and/or when an autonomous mode is selected (e.g., via the autonomy mode input 706). In local operator-controlled mode, the one or more processing circuits may be configured to detect physical interaction via onboard controls (e.g., steering device, the user interface 750, the wireless controller 700, etc.), indicating that the operator is directly controlling the AMR and/or when a local operator-controlled mode is selected (e.g., via the rider mode input 710). In the remote operator-controlled mode, the one or more processing circuits are is configured to detect signals or commands received via a wireless communication system (e.g., the wireless controller 700, the operator device 2030, etc.) and/or when a remote operator-controlled mode is selected (e.g., via the remote mode input 708).

At step 4212, the one or more processing circuits are configured to adjust the drive parameters based on the attachment type, the load, the terrain parameter, and/or the operating mode. The adjustment of the drive parameters can be based on any single factor, such as the terrain parameter alone (e.g., wet grass requiring reduced speed), or a combination of factors, such as the attachment type and load (e.g., a hauling bed with a heavy load prompting reduced acceleration and grade climbing capability). In some embodiments, the one or more processing circuits are configured to adjust drive parameters based on two or more factors simultaneously, such as the terrain parameter and operating mode (e.g., autonomous operation on a slope prompting increased torque distribution to prevent slippage). For example, if the terrain is wet and the AMR is carrying a heavy load, the one or more processing circuits may be configured to reduce speed, increase torque distribution to maintain traction, and adjust turning radius to avoid slippage or tipping.

In some embodiments, the one or more processing circuits are configured to calculate a center of gravity based on a combined mass distribution that includes the AMR, at least one attachment, and any load associated with the AMR (e.g., including load of the attachment). For example, when a hauling bed attachment is connected and loaded with heavy materials, the combined mass distribution may shift the center of gravity upward and toward the rear of the AMR. The one or more processing circuits may be configured to dynamically compute an adjusted center of gravity using data from sensors (e.g., load sensors, accelerometers, or gyroscopic sensors integrated into the sensor system 400). Based on the adjusted center of gravity, the one or more processing circuits may be configured to adjusts drive parameters. For example, the AMR may reduce its operational speed, limit tight turning maneuvers by increasing the turning radius, or redistribute torque among the hub motors 210 to maintain balance while navigating slopes or uneven terrain. In some implementations, if the attachment is a liquid-carrying beverage dispenser, the AMR may lower acceleration and restrict operations on steep inclines to prevent spillage and maintain safe operation.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the AMR 10 and the systems and components thereof (e.g., the frame assembly 100, the driveline 200, the power system 300, the sensor system 400, the light system 500, the AMR control system 600, the wireless controller 700, the user interface 750, the attachments 800, etc.) and the fleet monitoring and control system 2000 (e.g., the remote systems 2040, the operator portal 2020, etc.) as shown in the various exemplary embodiments is illustrative only. Additionally, any element disclosed in one embodiment may be incorporated or utilized with any other embodiment disclosed herein.

The invention claimed is:

1. A mobile robot comprising:
a chassis;
a tractive element coupled to the chassis;
a driveline coupled to the chassis and configured to drive the tractive element to propel the mobile robot;
a control system communicably coupled to the driveline;
a battery supported by the chassis;
an attachment power interface coupled to the chassis and the battery;
a platform assembly removably coupled to the chassis, the platform assembly defining an occupant riding area; and
a controller removably coupled to the platform assembly and communicably coupled to the control system, the controller configured to:
receive an input from a user of the controller, and transmit the input to the control system;
wherein the control system is configured to operate the driveline based on the input; and
wherein the platform assembly includes an electrical connector configured to engage with the attachment power interface to facilitate power transfer from the battery to the platform assembly to charge the controller.

2. The mobile robot of claim 1, wherein the platform assembly is bolted to the chassis.

3. The mobile robot of claim 1, further comprising a hitch receiver coupled to the chassis, wherein the platform assembly includes a protrusion configured to slidably engage with the hitch receiver to releasably couple the platform assembly to the chassis.

4. The mobile robot of claim 1, wherein the platform assembly includes:
a platform coupled to a top of the chassis;
a first panel extending along a first longitudinal edge of the platform,
a second panel extending along a second longitudinal edge of the platform, the second panel positioned opposite the first panel;
a handle coupled to and extending outward from the platform,
wherein the first panel, the second panel, and the platform define a bed area including the occupant riding area.

5. The mobile robot of claim 1, wherein:
the controller includes a display; and
the control system is configured to:
acquire a plurality of signals regarding operation of the mobile robot; and
transmit the plurality of signals to the controller.

6. The mobile robot of claim 5, wherein the controller is configured to:
receive the plurality of signals from the control system;

generate a graphical user interface for display on the display based on the plurality of signals; and transmit the input provided thereto by the user to the control system, the input associated with an action.

7. The mobile robot of claim 6, wherein the input includes a command to at least one of increase a speed of the driveline, decrease a speed of the driveline, or steer the driveline.

8. The mobile robot of claim 6, further comprising a camera coupled to the chassis and communicably coupled to the control system.

9. The mobile robot of claim 8, wherein the control system is configured to transmit an image or video to the controller, and wherein the graphical user interface provides the image or video.

10. The mobile robot of claim 1, wherein the controller facilitates entering the mobile robot into a plurality of modes, the plurality of modes including a remote operation mode, a rider mode, and an autonomy mode.

11. A mobile robot comprising:

a chassis;

a tractive element coupled to the chassis;

a driveline coupled to the chassis and configured to drive the tractive element to propel the mobile robot;

a control system communicably coupled to the driveline;

a platform assembly removably coupled to the chassis, the platform assembly defining an occupant riding area;

a hitch receiver coupled to the chassis, wherein the platform assembly includes a protrusion configured to slidably engage with the hitch receiver to releasably couple the platform assembly to the chassis;

a battery supported by the chassis, wherein the hitch receiver and the protrusion facilitate power transfer from the battery to the platform assembly to charge the controller; and a controller removably coupled to the platform assembly and communicably coupled to the control system, the controller configured to:

receive an input from a user of the controller; and transmit the input to the control system;

wherein the control system is configured to operate the driveline based on the input.

12. A mobile robot comprising:

a chassis;

a tractive element coupled to the chassis;

a driveline coupled to the chassis and configured to drive the tractive element to propel the mobile robot;

a control system communicably coupled to the driveline;

a platform assembly removably coupled to the chassis and defining an occupant riding area, the platform assembly including:

a platform;

a frame assembly coupled to and extending from the platform; and a controller mount coupled to the frame assembly; and a controller removably coupled to the platform assembly and communicably coupled to the control system, the controller configured to:

receive an input from a user of the controller; and transmit the input to the control system;

wherein the controller mount is configured to removably couple the controller to the platform assembly.

13. The mobile robot of claim 12, further comprising a bed coupled to the chassis, wherein the frame assembly is coupled to the platform and the bed.

14. The mobile robot of claim 12, further comprising:

a battery supported by the chassis; and electrically wiring extending through at least one of the platform or the frame assembly to the controller mount, the electrically wiring configured to receive power from the battery.

15. A mobile robot comprising:

a chassis;

a tractive element coupled to the chassis;

a driveline coupled to the chassis and configured to drive the tractive element to propel the mobile robot;

a battery supported by the chassis;

an attachment power interface coupled to the chassis and the battery;

a hitch receiver coupled to the chassis;

a platform assembly coupled to the chassis and defining a user riding area, the platform assembly comprising:

a platform;

a frame assembly coupled to and extending from the platform;

a controller mount coupled to the frame assembly, the controller mount configured to removably couple a controller to the platform assembly;

a protrusion coupled to the platform and configured to slidably engage with the hitch receiver to releasably couple the platform assembly to the chassis; and an electrical connector configured to engage with the attachment power interface to facilitate power transfer from the battery to the platform assembly;

the controller removably coupled to the platform assembly, the controller configured to:

receive an input from a user of the controller, and control the driveline based on the input;

a control system communicably coupled to the driveline, the control system configured to:

acquire a plurality of signals regarding operation of the mobile robot, transmit the plurality of signals to the controller, receive the input from the controller, and implement an action associated with the input.

16. The mobile robot of claim 15, wherein the attachment power interface is positioned on the hitch receiver and the electrical connector is positioned on the protrusion such that the hitch receiver and the protrusion facilitate power transfer from the battery to the platform assembly to charge the controller.

\* \* \* \* \*